(12) United States Patent
Kudo et al.

(10) Patent No.: US 10,564,754 B2
(45) Date of Patent: Feb. 18, 2020

(54) DISPLAY DEVICE

(71) Applicant: Japan Display Inc., Tokyo (JP)

(72) Inventors: Michita Kudo, Tokyo (JP); Yasuyuki Teranishi, Tokyo (JP); Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/026,654

(22) Filed: Jul. 3, 2018

(65) Prior Publication Data

US 2019/0018529 A1    Jan. 17, 2019

(30) Foreign Application Priority Data

Jul. 12, 2017 (JP) ................................ 2017-136362
Jan. 15, 2018 (JP) ................................ 2018-004054

(51) Int. Cl.
*G06F 3/044* (2006.01)
*G06F 3/041* (2006.01)
*G09G 3/36* (2006.01)

(52) U.S. Cl.
CPC ............ *G06F 3/0412* (2013.01); *G06F 3/044* (2013.01); *G06F 3/0416* (2013.01); *G09G 3/3648* (2013.01)

(58) Field of Classification Search
CPC ............................................. G06F 3/044–047
See application file for complete search history.

(56) References Cited

U.S. PATENT DOCUMENTS

| 9,244,578 | B2* | 1/2016 | Liu ........................... G06F 3/01 |
| 10,180,761 | B2* | 1/2019 | Watanabe ............... G06F 3/044 |
| 2010/0182273 | A1 | 7/2010 | Noguchi et al. | |
| 2015/0160760 | A1* | 6/2015 | Sato ........................ G06F 3/044 |
| | | | 345/174 |
| 2017/0131811 | A1* | 5/2017 | Watanabe ............... G06F 3/044 |
| 2019/0050097 | A1* | 2/2019 | Mugiraneza ............ G06F 3/044 |
| 2019/0114002 | A1* | 4/2019 | Mugiraneza ........ G02F 1/13338 |

FOREIGN PATENT DOCUMENTS

| JP | 2009-244958 A | 10/2009 | |
| WO | WO-2017170224 A1 * | 10/2017 | ............ G06F 3/044 |

* cited by examiner

*Primary Examiner* — Michael Pervan
(74) *Attorney, Agent, or Firm* — K&L Gates LLP

(57) ABSTRACT

A display device includes a display panel, a housing, a second electrode, and a driver. The display panel includes a substrate and a plurality of first electrodes arrayed in a display region of the substrate. The housing has at least a pair of walls facing each other in planar view and is provided with the display panel between the pair of walls. The second electrode is provided to the housing and positioned on the outer side than the display region in planar view and forms capacitance between the second electrode and the first electrodes. The driver supplies a drive signal to the second electrode.

17 Claims, 29 Drawing Sheets

FIG.12
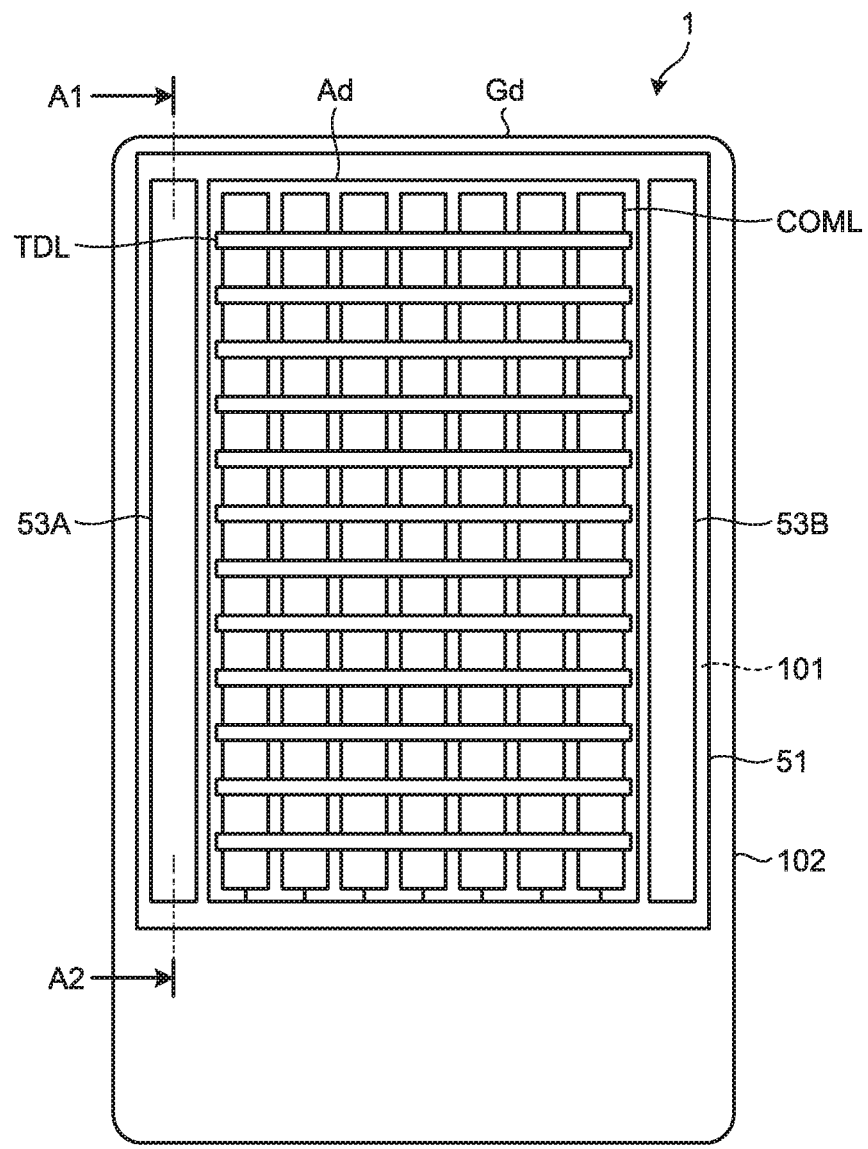
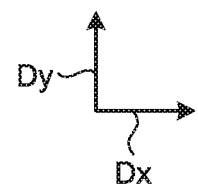

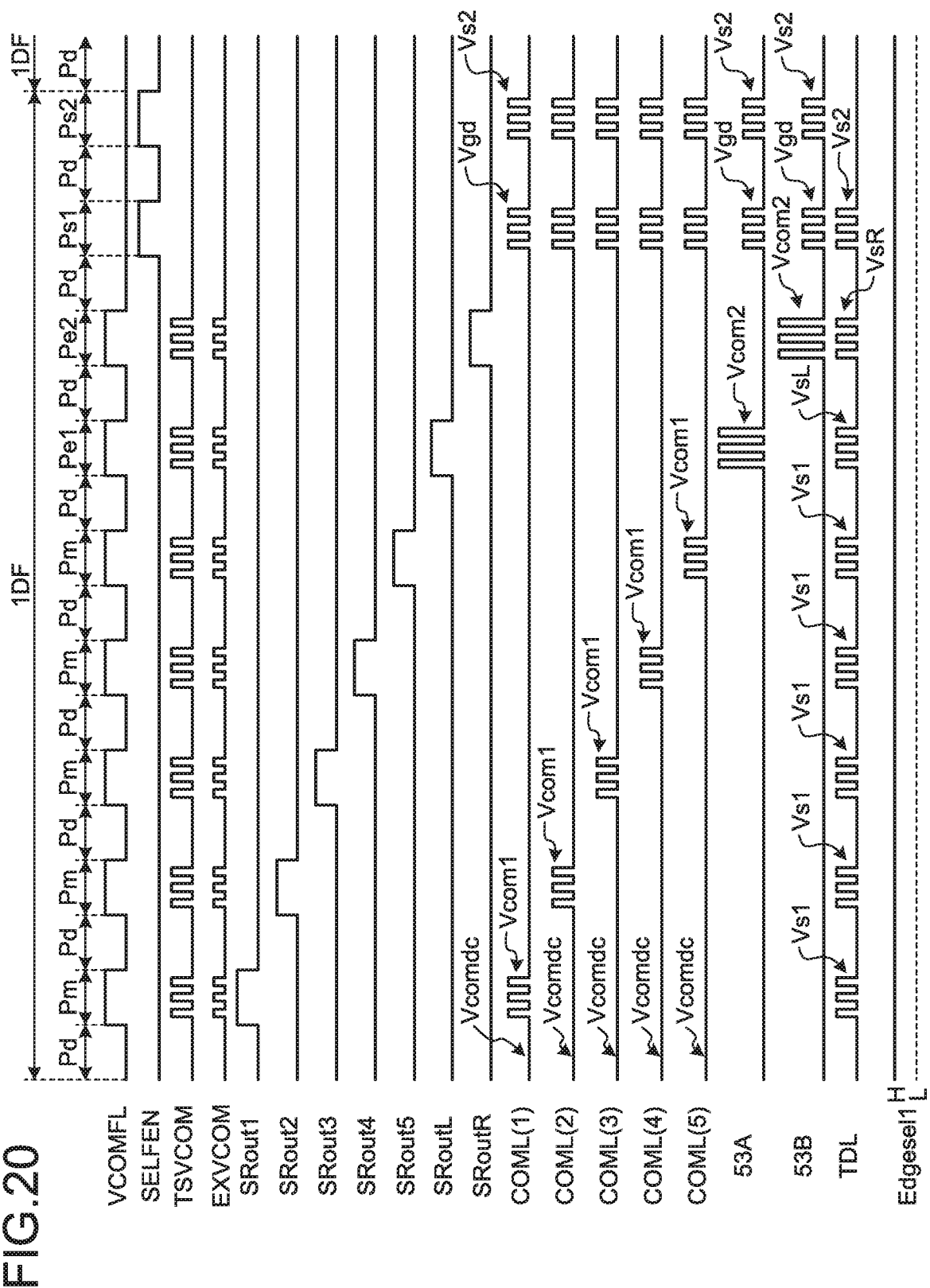

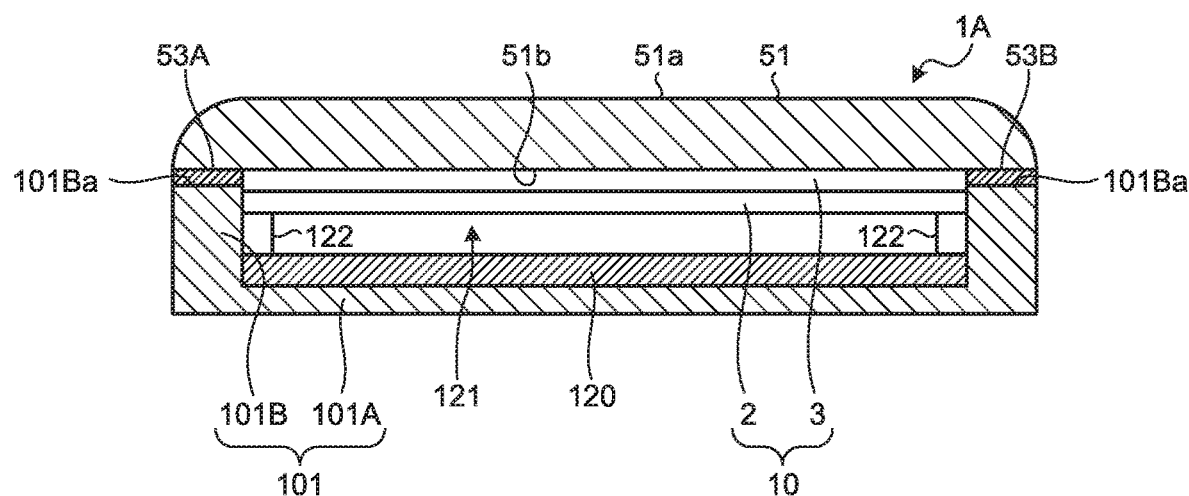
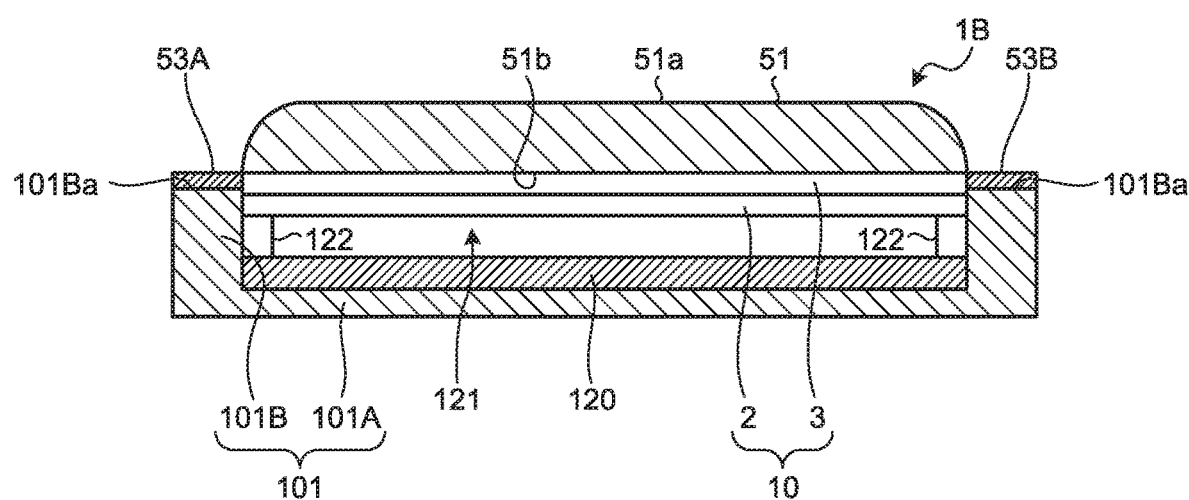

FIG.36
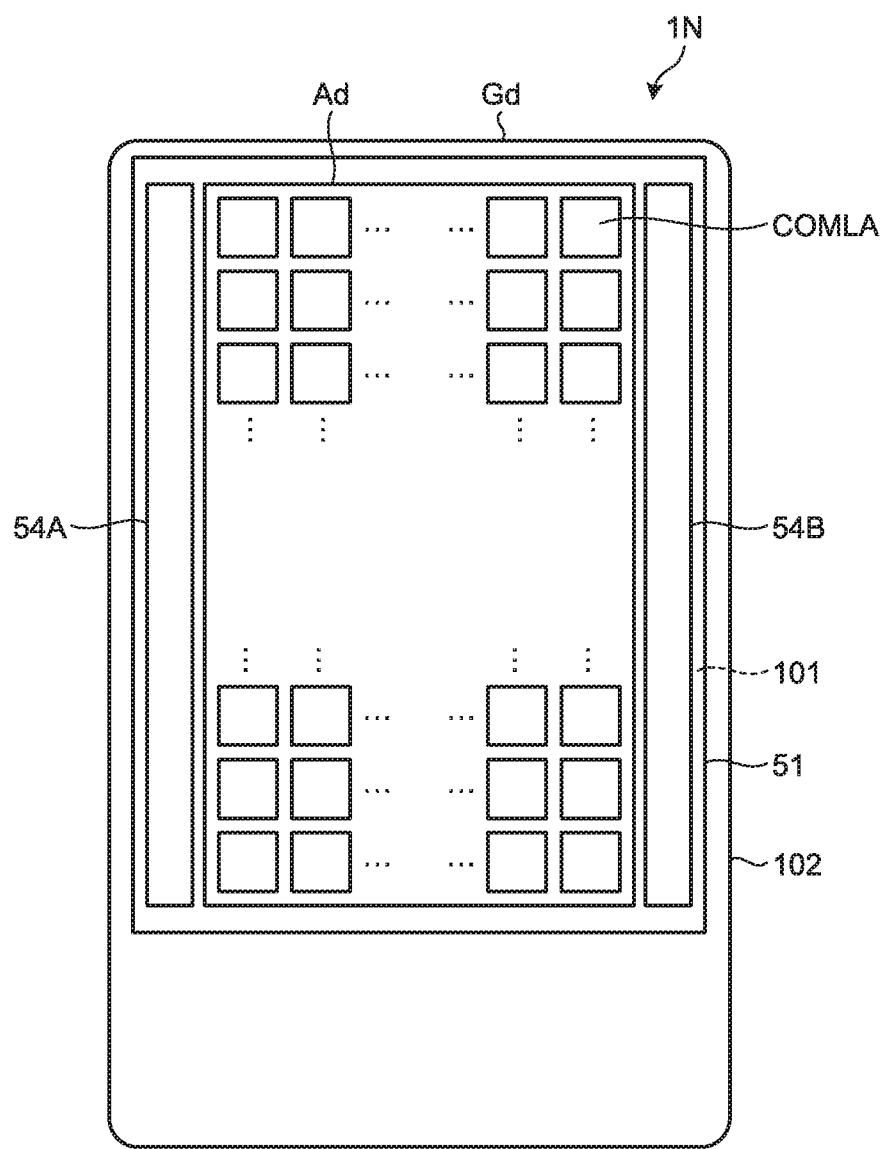
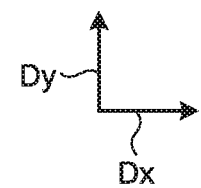

DISPLAY DEVICE

CROSS-REFERENCE TO RELATED APPLICATIONS

This application claims priority from Japanese Application No. 2017-136362, filed on Jul. 12, 2017 and Japanese Application No. 2018-004054, filed on Jan. 15, 2018, the contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function (refer to Japanese Patent Application Laid-open Publication No. 2009-244958 (JP-A-2009-244958)). Display devices with a touch detection function include a button having an input function in a peripheral region positioned around a display region. Widely known are techniques for integrating such an input button with the peripheral region of touch panels and display devices. The display device with a touch sensor described in JP-A-2009-244958 includes detection electrodes for a sensor in a frame region of a TFT substrate.

The peripheral region of the substrate, however, may possibly be provided with wiring coupled to electrodes, a drive circuit, and other components. If the detection electrodes for a sensor are provided to the peripheral region, the width of the frame region may possibly increase. If the detection electrodes for a sensor are provided to a cover substrate having a narrow frame, the area of the detection electrodes for a sensor may possibly be so small as to degrade the detection performance. A housing to which the substrate is fixed may possibly degrade the detection performance.

SUMMARY

A display device according to one embodiment of the present disclosure includes a display panel including a substrate and a plurality of first electrodes arrayed in a display region of the substrate, a housing having at least a pair of walls facing each other in planar view and provided with the display panel between the pair of walls, a second electrode provided to the housing, positioned on an outer side than the display region in planar view, and configured to form capacitance between the second electrode and the first electrodes, and a driver configured to supply a drive signal to the second electrode.

BRIEF DESCRIPTION OF THE DRAWINGS

FIG. 12 is a plan view schematically illustrating the display device according to the first embodiment;

FIG. 20 is a timing waveform chart of an exemplary operation performed by the display device according to the first embodiment;

FIG. 21 is a sectional view of a schematic sectional structure of the display device according to a first modification of the first embodiment;

FIG. 22 is a sectional view of a schematic sectional structure of the display device according to a second modification of the first embodiment;

FIG. 36 is a plan view schematically illustrating the display device according to the third embodiment;

DETAILED DESCRIPTION

Figure 1:
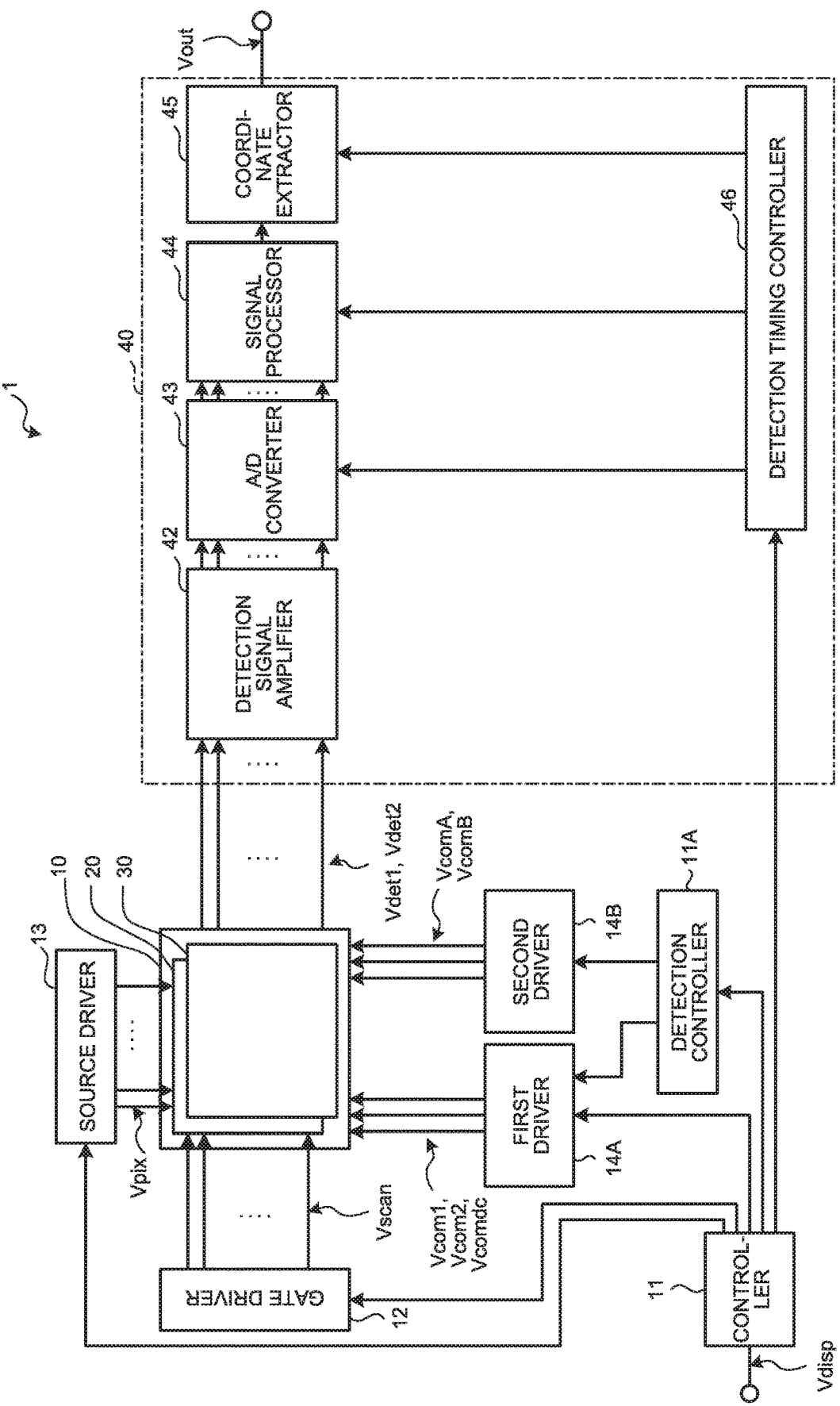
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an exemplary configuration of a display device according to a first embodiment of the present disclosure. As illustrated in FIG. 1, a display device 1 includes a display panel 10, a controller 11, a detection controller 11A, a gate driver 12, a source driver 13, a first driver 14A, a second driver 14B, and a detector 40. The display panel 10 includes a display portion 20 and a touch sensor 30. The display portion 20 displays an image. The touch sensor 30 is a detection device that detects touch input.

The display panel 10 is a display device in which the display portion 20 and the touch sensor 30 are integrated. Specifically, in the display panel 10, part of members, such as electrodes and substrates, of the display portion 20 are also used as electrodes and substrates of the touch sensor 30.

The display portion 20 includes liquid crystal display elements serving as display elements. The display portion 20 includes a plurality of pixels having the display elements and has a display surface facing the pixels. The display portion 20 receives video signals Vdisp to display an image composed of the pixels on the display surface. The display panel 10 may be a device in which the touch sensor 30 is mounted on the display portion 20. The display portion may be an organic electroluminescence (EL) display panel, for example.

The controller 11 supplies control signals to the gate driver 12, the source driver 13, the first driver 14A, the detection controller 11A, and the detector 40 based on the video signals Vdisp supplied from the outside. The controller 11 is a circuit that mainly controls a display operation performed by the display device 1. The detection controller 11A supplies control signals to the first driver 14A and the second driver 14B based on the control signals supplied from the controller 11. The detection controller 11A is a circuit that mainly controls a detection operation performed by the display device 1.

The gate driver 12 supplies scanning signals Vscan to one horizontal line to be a target of display drive in the display panel 10 based on the control signals supplied from the controller 11. As a result, one horizontal line to be a target of display drive is sequentially or simultaneously selected.

The source driver 13 is a circuit that supplies pixel signals Vpix to respective sub-pixels SPix (refer to FIG. 10) of the display portion 20. Part of the functions of the source driver 13 may be provided to the display panel 10. In this case, the controller 11 may generate the pixel signals Vpix and supply them to the source driver 13.

The first driver 14A is a circuit that supplies display drive signals Vcomdc to first electrodes COML of the display panel 10. The first driver 14A supplies detection drive signals Vcom1 to the first electrodes COML or supplies detection drive signals Vcom2 to second electrodes 53A and 53B in mutual capacitance touch detection. The second driver 14B supplies drive signals VcomA to the first electrodes COML or supplies drive signals VcomB to detection electrodes TDL in self-capacitance touch detection. The second driver 14B may supply drive signals to the second electrodes 53A and 53B to perform self-capacitance touch detection.

The controller 11 according to the present embodiment performs, in a time-division manner, a display operation of causing the display portion 20 to perform display and a detection operation of causing the touch sensor 30 to detect an object to be detected. The first driver 14A supplies the drive signals Vcom1 and Vcom2 to the first electrodes COML and the second electrodes 53A and 53B, respectively, based on the control signals supplied from the controller 11. The second driver 14B supplies the drive signals VcomA and VcomB to the first electrodes COML, the detection electrodes TDL, and the second electrodes 53A and 53B based on the control signals supplied from the detection controller 11A.

The touch sensor 30 performs touch detection based on the basic principle of touch detection by a mutual capacitance method (also referred to as a mutual method). If the touch sensor 30 detects an object to be detected in a contact state, the touch sensor 30 outputs detection signals Vdet1 to the detector 40. The touch sensor 30 can also perform touch detection based on the basic principle of touch detection by a self-capacitance method (also referred to as a self-method). If the touch sensor 30 detects an object to be detected in the contact state by the self-capacitance method, the touch sensor 30 outputs detection signals Vdet2 to the detector 40.

In the present specification, a "contact state" indicates a state where the object to be detected is in contact with the display surface or in proximity to the display surface close enough to consider it in contact therewith. A "non-contact state" indicates a state where the object to be detected is neither in contact with the display surface nor in proximity to the display surface close enough to consider it in contact therewith.

In mutual capacitance touch detection, the detector 40 is a circuit that determines whether a touch is made by an object to be detected on the display surface of the display panel 10 based on the control signals supplied from the controller 11 and on the detection signals Vdet1 output from the display panel 10. In self-capacitance touch detection, the detector 40 determines whether a touch is made by an object to be detected on the display surface of the display panel based on the control signals supplied from the controller 11 and on the detection signals Vdet2 output from the display panel 10. If a touch is detected, the detector 40 calculates the coordinates at which the touch input is made, for example.

The detector 40 includes a detection signal amplifier 42, an analog/digital (A/D) converter 43, a signal processor 44, a coordinate extractor 45, and a detection timing controller 46. The detection timing controller 46 controls the A/D converter 43, the signal processor 44, and the coordinate extractor 45 such that they operate synchronously with one another based on the control signals supplied from the controller 11.

In touch detection, the detection signal amplifier 42 amplifies the detection signals Vdet1 supplied from the display panel 10. The A/D converter 43 samples analog signals output from the detection signal amplifier 42 at a timing synchronized with the drive signals Vcom1 and Vcom2, thereby converting the analog signals into digital signals.

The signal processor 44 is a logic circuit that determines whether a touch is made on the display panel 10 based on the output signals from the A/D converter 43. The signal processor 44 performs processing of extracting a signal (absolute value $|\Delta V|$) of the difference between the detection signals caused by a finger. The signal processor 44 compares the absolute value $|\Delta V|$ with a predetermined threshold voltage. If the absolute value $|\Delta V|$ is lower than the threshold voltage, the signal processor 44 determines that an object to be detected is in the non-present state. By contrast, if the absolute value $|\Delta V|$ is equal to or higher than the threshold voltage, the signal processor 44 determines that an object to be detected is in the contact state or a proximity state. The detector 40 thus can perform touch detection.

The coordinate extractor 45 is a logic circuit that calculates, if the signal processor 44 detects a touch, the touch panel coordinates of the touch. The coordinate extractor 45 outputs the touch panel coordinates as output signals Vout. The coordinate extractor 45 may output the output signals Vout to the controller 11. The controller 11 can perform a predetermined display or detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external control substrate or processor, for example. The coordinate extractor 45, for example, may be provided to an external processor different from the display device 1. In this case, the detector 40 may output the signals processed by the signal processor 44 as the output signals Vout. Alternatively, the signal processor 44 and the coordinate extractor 45 may be provided to an external processor. In this case, the detector 40 may output the digital signals processed by the A/D converter 43 as the output signals Vout.

Figure 2:
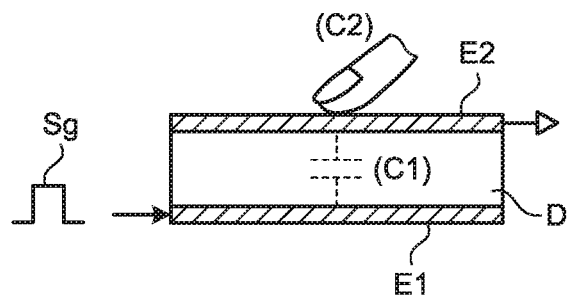
FIG. 2 is a diagram for explaining the basic principle of mutual capacitance touch detection.
Figure 3:
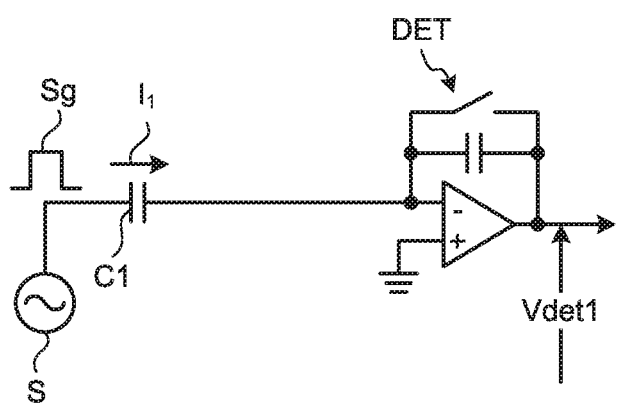
FIG. 3 is a diagram for explaining an example of an equivalent circuit in mutual capacitance touch detection.
Figure 4:
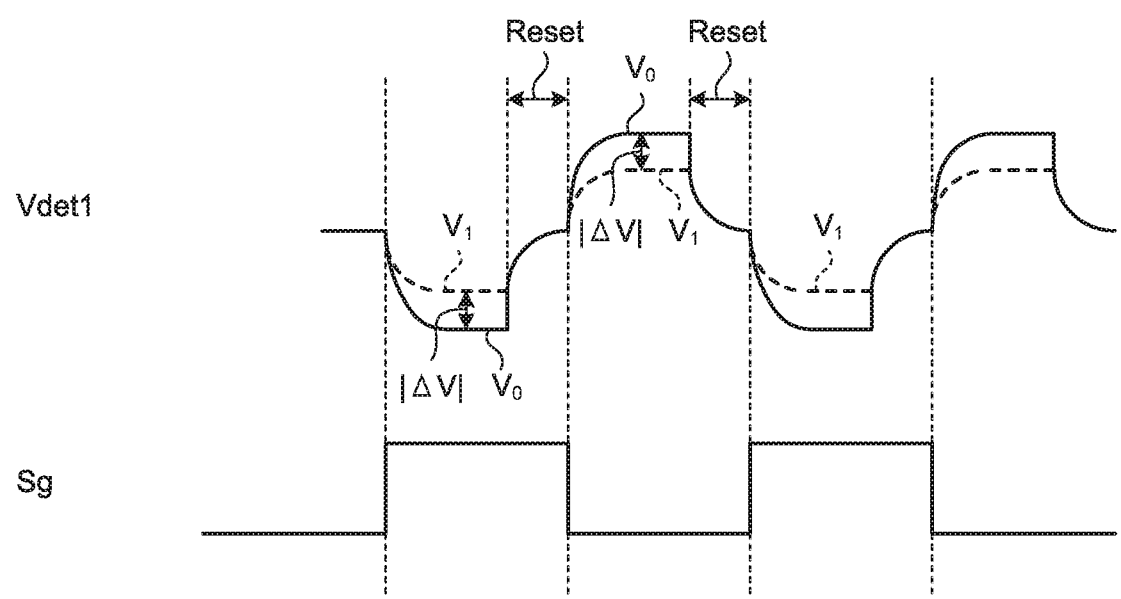
FIG. 4 is a diagram of an example of waveforms of a drive signal and a detection signal in mutual capacitance touch detection.

The following describes the basic principle of mutual capacitance touch detection performed by the display device 1 according to the present embodiment with reference to FIGS. 2 to 4. FIG. 2 is a diagram for explaining the basic principle of mutual capacitance touch detection. FIG. 3 is a diagram for explaining an example of an equivalent circuit in mutual capacitance touch detection. FIG. 4 is a diagram of an example of waveforms of a drive signal and a detection signal in mutual capacitance touch detection. While the following describes a case where a finger is in contact with or in proximity to a detection electrode, the object to be detected is not limited to a finger and may be a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) formed between the facing surfaces of the drive electrode E1 and the detection electrode E2. As illustrated in FIG. 3, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 1, for example.

When the AC signal source S applies an AC rectangular wave Sg at a predetermined frequency (e.g., several kilohertz to several hundred kilohertz) to the drive electrode E1 (first end of the capacitance element C1), an output waveform (detection signal Vdet1) illustrated in FIG. 4 is generated via the voltage detector DET.

In the non-contact state, an electric current depending on the capacitance value of the capacitance element C1 flows. The voltage detector DET illustrated in FIG. 3 converts fluctuations in the electric current depending on the AC rectangular wave Sg into fluctuations in the voltage (waveform $V_0$ indicated by the solid line (refer to FIG. 4)).

In the contact state, as illustrated in FIGS. 2 and 3, capacitance C2 formed by the finger is in contact with the detection electrode E2 or in proximity to the detection electrode E2 close enough to consider it in contact therewith.

The fringe lines of electric force between the drive electrode E1 and the detection electrode E2 are blocked by a conductor (finger). As a result, the capacitance element C1 acts as a capacitance element having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$. Consequently, the absolute value |ΔV| of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detector 40 compares the absolute value |ΔV| with the predetermined threshold voltage, thereby determining whether the external proximity object is in the non-contact state or in the contact or proximity state. The detector 40 thus can perform touch detection based on the basic principle of mutual capacitance touch detection.

Figure 5:
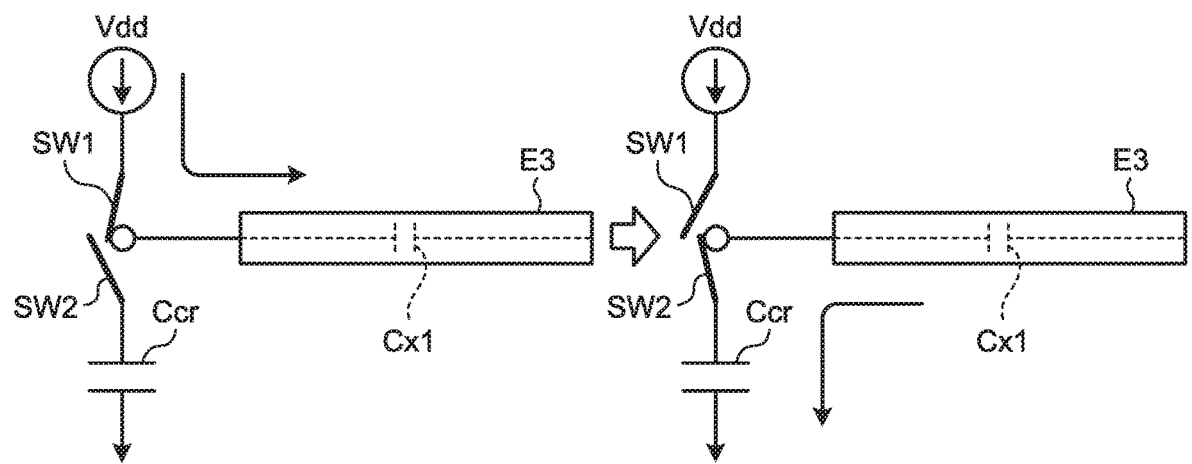
FIG. 5 is a diagram for explaining the basic principle of self-capacitance touch detection and illustrates a non-contact state.
Figure 6:
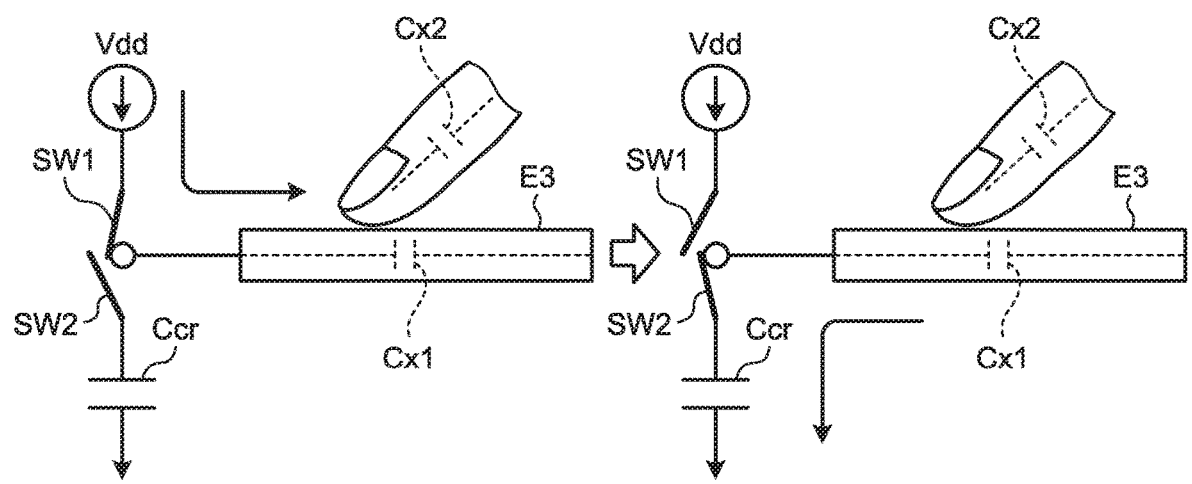
FIG. 6 is a diagram for explaining the basic principle of self-capacitance touch detection and illustrates a contact state.
Figure 7:
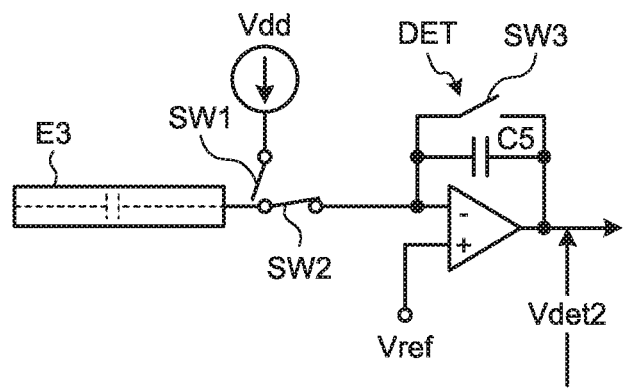
FIG. 7 is a diagram for explaining an example of an equivalent circuit in self-capacitance touch detection.
Figure 8:
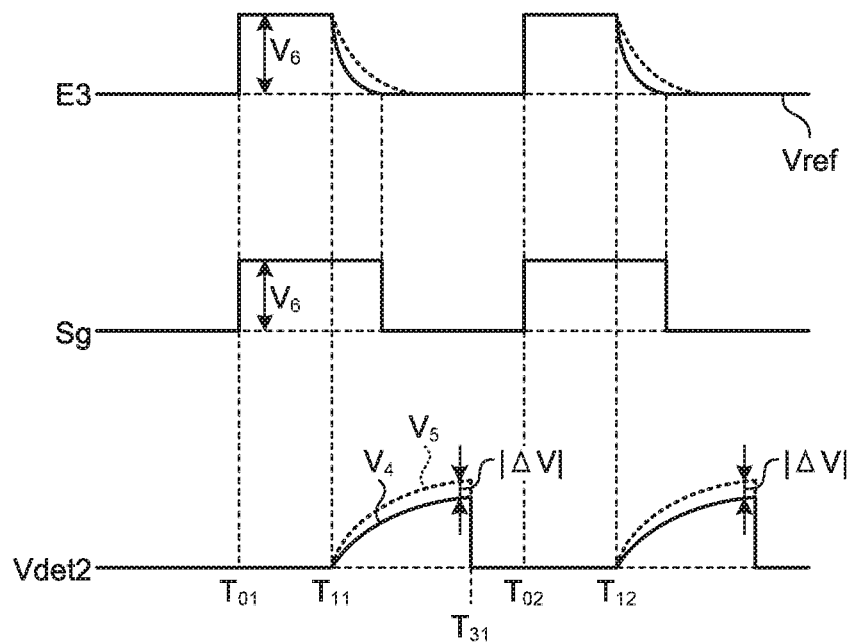
FIG. 8 is a diagram of an example of waveforms of a drive signal and a detection signal in self-capacitance touch detection.

The following describes the basic principle of self-capacitance touch detection with reference to FIGS. 5 to 8. FIG. 5 is a diagram for explaining the basic principle of self-capacitance touch detection and illustrating a non-contact state. FIG. 6 is a diagram for explaining the basic principle of self-capacitance touch detection and illustrating a contact state. FIG. 7 is a diagram for explaining an example of an equivalent circuit in self-capacitance touch detection. FIG. 8 is a diagram of an example of waveforms of a drive signal and a detection signal in self-capacitance touch detection.

The left figure in FIG. 5 illustrates a state where a detection electrode E3 is coupled to a power source Vdd by a switch SW1 but is not coupled to a capacitor Ccr by a switch SW2 in the non-contact state. In this state, capacitance Cx1 in the detection electrode E3 is charged. The right figure in FIG. 5 illustrates a state where coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure in FIG. 6 illustrates a state where the power source Vdd is coupled to the detection electrode E3 by the switch SW1, and the detection electrode E3 is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 6 illustrates a state where the detection electrode E3 is not coupled to the power source Vdd by the switch SW1 but is coupled to the capacitor Ccr by the switch SW2. In this state, an electric charge in the capacitance Cx1 and an electric charge in the capacitance Cx2 are discharged via the capacitor Ccr.

Because of the capacitance Cx2, the voltage change characteristics of the capacitor Ccr in discharging (contact state) illustrated in the right figure in FIG. 6 are clearly different from those of the capacitor Ccr in discharging (non-contact state) illustrated in the right figure in FIG. 5. Consequently, the self-capacitance method determines whether an input operation is performed by a finger or the like using the fact that the voltage change characteristics of the capacitor Ccr vary depending on the presence of the capacitance Cx2.

Specifically, an AC rectangular wave Sg (refer to FIG. 8) at a predetermined frequency (e.g., several kilohertz to several hundred kilohertz) is applied to the detection electrode E3. The voltage detector DET illustrated in FIG. 7 converts fluctuations in the electric current depending on the AC rectangular wave Sg into fluctuations in the voltage (waveforms $V_4$ and $V_5$).

In FIG. 8, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at voltage $V_6$ by the capacitance Cx1 (or Cx1+Cx2, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the detection signal Vdet2 in FIG. 8). In the non-contact state, the output (detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., several kilohertz to several hundred kilohertz). The detector 40 thus can perform touch detection based on the basic principle of self-capacitance touch detection.

Figure 9:
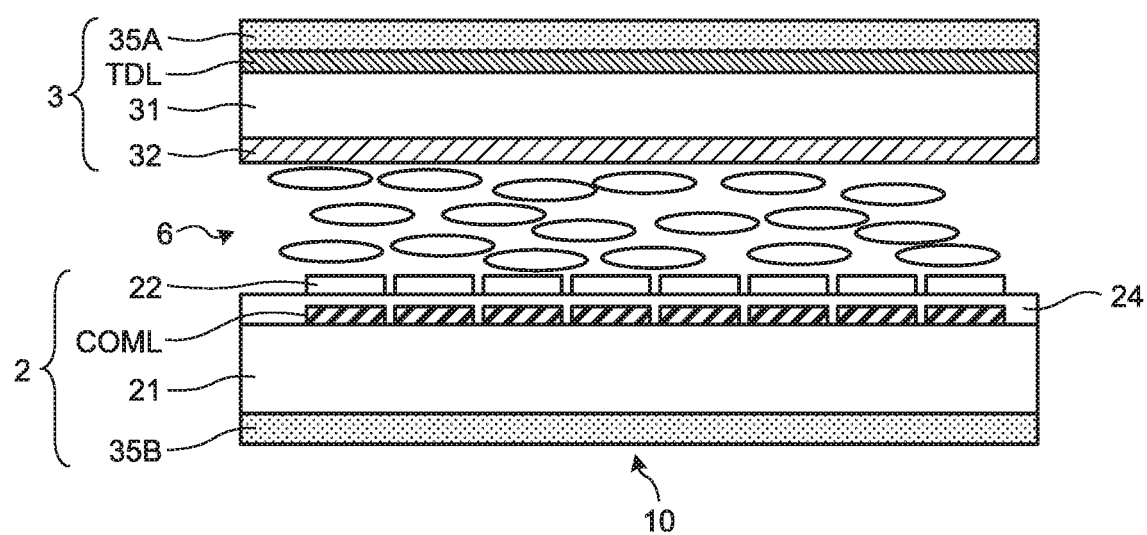
FIG. 9 is a sectional view of a schematic sectional structure of a display panel according to the first embodiment.

The following describes an exemplary configuration of the display device 1 according to the present embodiment in greater detail. FIG. 9 is a sectional view of a schematic sectional structure of the display panel according to the first embodiment. As illustrated in FIG. 9, the display device 1 includes a pixel substrate 2, a counter substrate 3, and a liquid crystal layer 6 serving as a display functional layer. The counter substrate 3 is disposed facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, the first electrodes COML, and a polarizing plate 35B. The first substrate 21 is provided with circuits, such as a gate scanner included in the gate driver 12, switching elements, such as thin film transistors (TFTs), and various kinds of wiring (not illustrated in FIG. 9), such as the gate lines GCL and the signal lines SGL.

The first electrodes COML are provided on the first substrate 21. The pixel electrodes 22 are provided on the first electrodes COML with an insulating layer 24 interposed therebetween. The pixel electrodes 22 are provided to a layer different from that of the first electrodes COML and disposed overlapping the first electrodes COML in planar view.

The pixel electrodes 22 are disposed in a matrix (row-column configuration) in planar view. The polarizing plate 35B is provided under the first substrate 21.

In the present specification, "above" indicates a direction from the first substrate 21 toward a second substrate 31 in the direction perpendicular to the surface of the first substrate 21, and "below" indicates a direction from the second substrate 31 toward the first substrate 21. The "planar view" indicates a view seen in the direction perpendicular to the surface of the first substrate 21.

The pixel electrodes 22 are provided corresponding to the respective sub-pixels SPix constituting each pixel Pix of the display panel 10. The source driver 13 (refer to FIG. 1) supplies the pixel signals Vpix for performing a display operation to the pixel electrodes 22. In the display operation, the display drive signals Vcomdc, which are direct-current (DC) voltage signals, are supplied to the first electrodes COML. As a result, the first electrodes COML serve as common electrodes for a plurality of pixel electrodes 22. The first electrodes COML serve as drive electrodes in mutual capacitance touch detection. The first electrodes COML also serve as detection electrodes in self-capacitance touch detection.

The pixel electrodes 22 and the first electrodes COML according to the present embodiment are made of a translucent conductive material, such as indium tin oxide (ITO).

The counter substrate 3 includes the second substrate 31, a color filter 32, the detection electrodes TDL, and a polarizing plate 35A. The color filter 32 is provided to one surface of the second substrate 31. The detection electrodes TDL are provided to the other surface of the second substrate 31. The detection electrodes TDL are arrayed on the second substrate 31. The detection electrodes TDL serve as detection electrodes in mutual capacitance touch detection and self-capacitance touch detection.

The detection electrodes TDL according to the present embodiment are made of a translucent conductive material, such as ITO. Alternatively, the detection electrodes TDL may be metal thin wires having a mesh-shaped, zigzag-line-shaped, wavy-line-shaped, or linear pattern. In this case, the detection electrodes TDL are metal layers made of one or more of aluminum (Al), copper (Cu), silver (Ag), molybdenum (Mo), chromium (Cr), and tungsten (W).

The color filter 32 faces the liquid crystal layer 6 in the direction perpendicular to the first substrate 21. The color filter 32 may be disposed above the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films (not illustrated in FIG. 9) are provided between the liquid crystal layer 6 and the pixel substrate 2 and between the liquid crystal layer 6 and the counter substrate 3 illustrated in FIG. 9.

An illuminator (backlight), which is not illustrated, is provided under the first substrate 21. The illuminator includes a light source, such as a light-emitting diode (LED) and outputs light from the light source to the first substrate 21. The light from the illuminator passes through the pixel substrate 2 and is modulated depending on the state of the liquid crystals at the corresponding position. The state of transmission to the display surface varies depending on the positions. With this mechanism, an image is displayed on the display surface.

Figure 10:
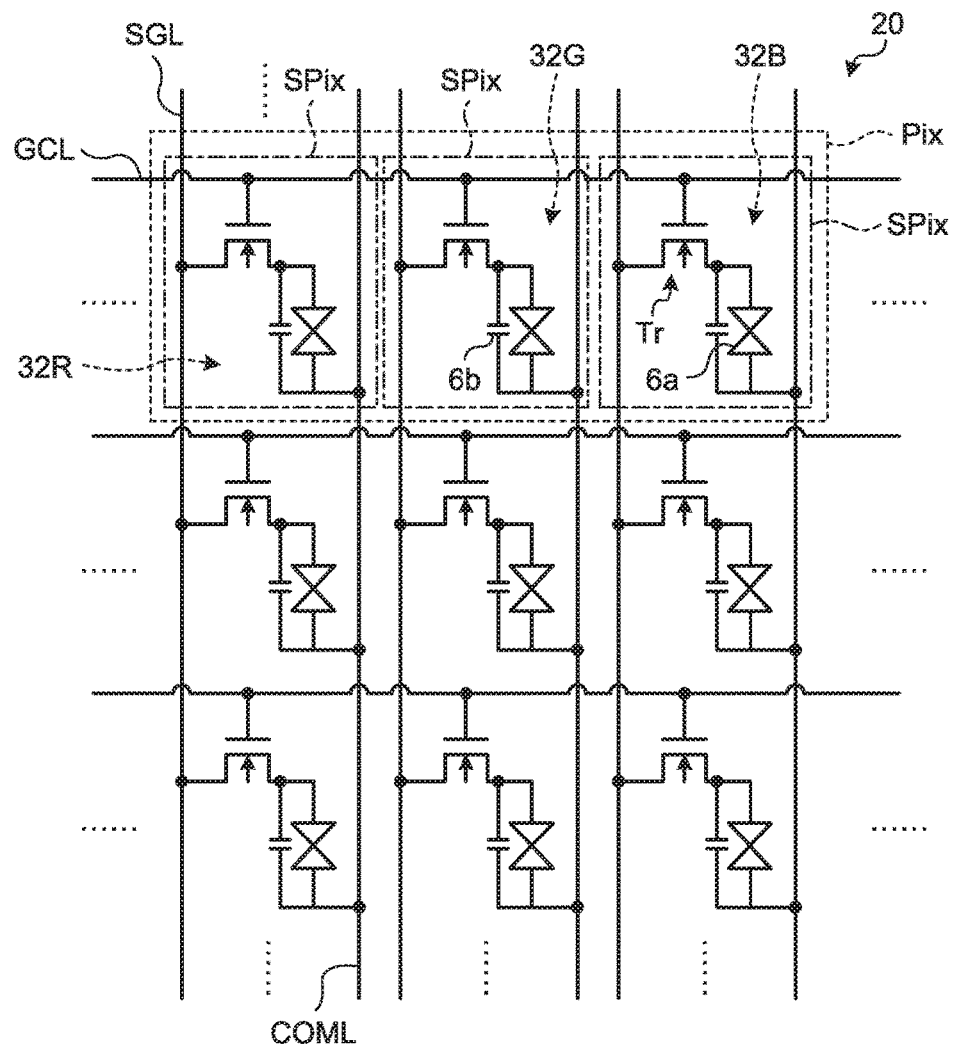
FIG. 10 is a circuit diagram of a pixel array in a display portion.

The following describes a display operation performed by the display panel 10. FIG. 10 is a circuit diagram of a pixel array in the display portion according to the present embodiment. The first substrate 21 (refer to FIG. 9) is provided with switching elements Tr of the respective sub-pixels SPix, the signal lines SGL, the gate lines GCL, and other components as illustrated in FIG. 10. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display portion 20 illustrated in FIG. 10 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form holding capacitance 6b illustrated in FIG. 10.

The gate driver 12 illustrated in FIG. 1 sequentially selects the gate line GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the selected sub-pixels SPix via the signal lines SGL. The sub-pixels SPix perform display in units of one horizontal line based on the supplied pixel signals Vpix.

To perform the display operation, the first driver 14A illustrated in FIG. 1 applies the display drive signals Vcomdc to the first electrodes COML. The display drive signal Vcomdc is a voltage signal serving as a common potential for a plurality of sub-pixels SPix. As a result, the first electrodes COML serve as common electrodes for the pixel electrodes 22 in the display operation. To perform display, the first driver 14A applies the drive signals Vcomdc to all the first electrodes COML in a display region Ad.

The color filter 32 illustrated in FIG. 9 may include periodically arrayed color areas of the color filter 32 in three colors of red (R), green (G), and blue (B), for example. The color areas 32R, 32G, and 32B in the three colors of R, G, and B, respectively, serve as a set and correspond to the respective sub-pixels SPix illustrated in FIG. 10. A set of sub-pixels SPix corresponding to the respective color areas 32R, 32G, and 32B in the three colors constitutes one pixel Pix. The color filter 32 may include color areas in four or more colors.

Figure 11:
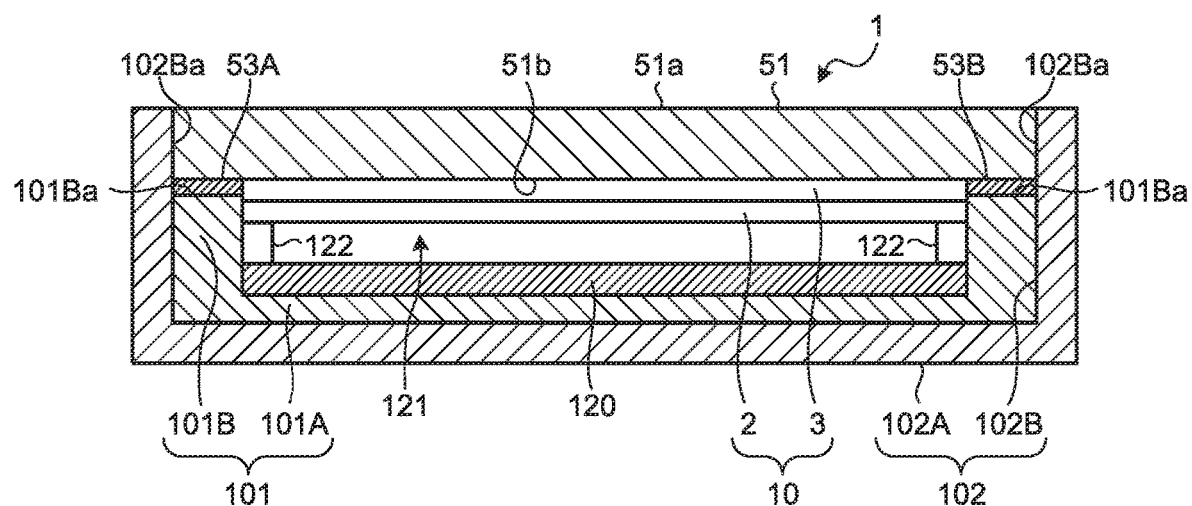
FIG. 11 is a sectional view of a schematic sectional structure of the display device according to the first embodiment.
Figure 13:
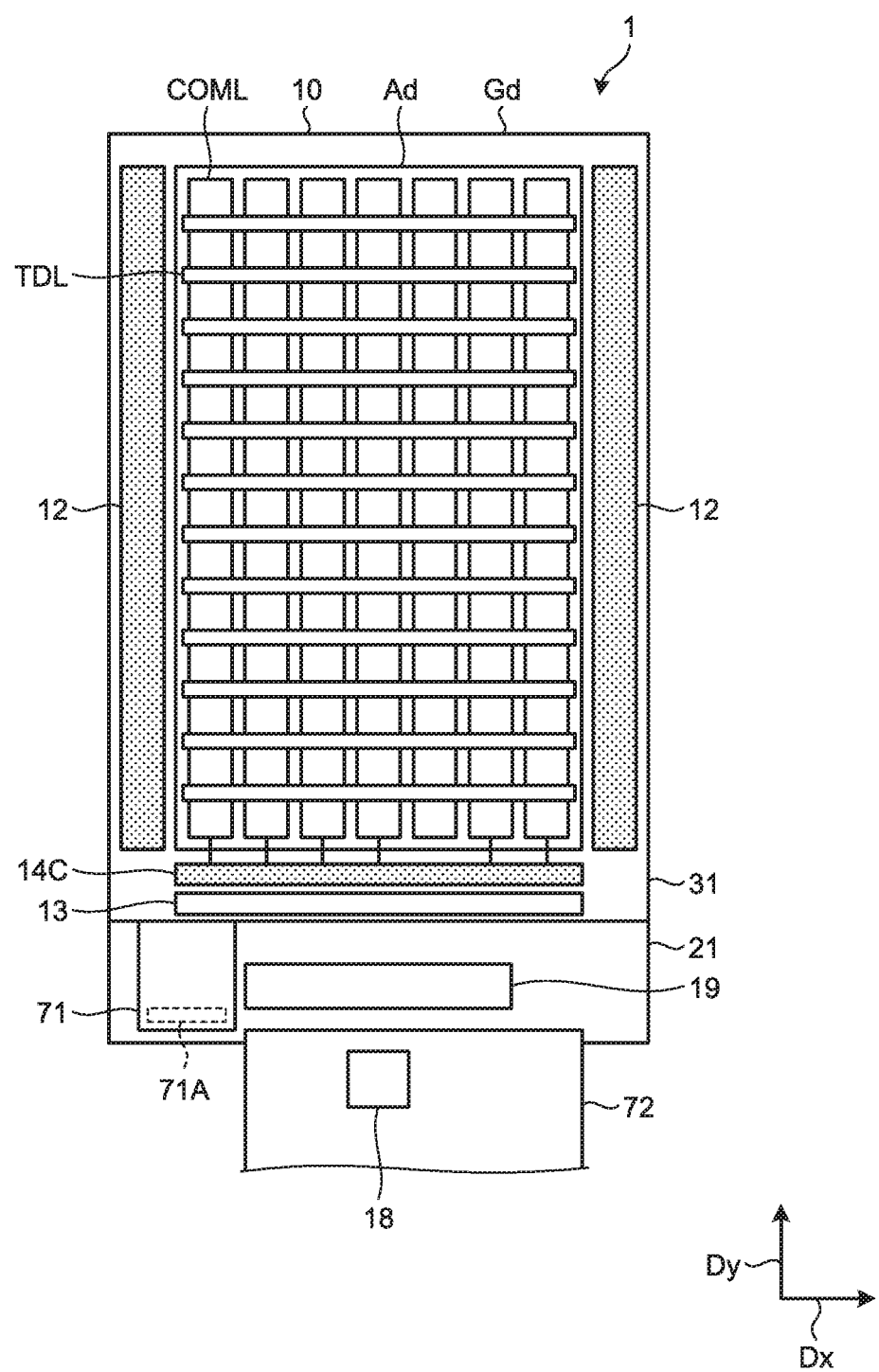
FIG. 13 is a plan view of a first substrate and a second substrate.

The following describes the configuration of the detection electrodes TDL, the first electrodes COML, and the second electrodes 53A and 53B and a touch detection operation. FIG. 11 is a sectional view of a schematic sectional structure of the display device according to the first embodiment. FIG. 12 is a plan view schematically illustrating the display device according to the first embodiment. FIG. 13 is a plan view of the first substrate and the second substrate. FIG. 12 schematically illustrates the positional relation between the detection electrodes TDL, the first electrodes COML, and the second electrodes 53A and 53B.

As illustrated in FIG. 11, the display device 1 includes the display panel 10, a first housing 101, a second housing 102, the second electrodes 53A and 53B, and a cover substrate 51. The first housing 101 has a bottom 101A and at least a pair of walls 101B. The display panel 10, spacers 122, and a backlight 120 are fixed in the space surrounded by the bottom 101A and the walls 101B. The backlight 120 is fixed to the bottom 101A. The display panel 10 is fixed on the backlight 120 with the spacers 122 interposed therebetween. As a result, a gap 121 is formed between the display panel 10 and the backlight 120. The gap 121 may be provided with an elastic body, such as a sponge and an elastic rubber. With this configuration, the display panel 10 is fixed in the first housing 101.

The configuration illustrated in FIG. 11 is given by way of example only, and the fixing structure of the display panel 10 and the backlight 120 may be appropriately modified. The display panel 10, for example, may be provided on the backlight 120 without the spacers 122 interposed therebetween.

The second electrodes 53A and 53B are provided on upper surfaces 101Ba of the walls 101B. The second electrodes 53A and 53B form capacitance between the second electrodes 53A and 53B and the detection electrodes TDL (refer to FIG. 9) of the display panel 10. The second electrodes 53A and 53B serve as drive electrodes in touch detection in a peripheral region Gd.

The second housing 102 has a bottom 102A and walls 102B. The first housing 101, the display panel 10, the second electrodes 53A and 53B, and the cover substrate 51 are fixed in the space surrounded by the bottom 102A and the walls 102B. The bottom 101A of the first housing 101 is fixed on the upper side of the bottom 102A of the second housing 102. The walls 101B of the first housing 101 are fixed on the inner side of the walls 102B of the second housing 102. With this configuration, the first housing 101 is fixed in the second housing 102.

The height of the walls 102B of the second housing 102 is higher than that of the walls 101B of the first housing 101. The upper part of the second housing 102 has an opening 102Ba surrounded by the walls 102B. The cover substrate 51 is provided in the opening 102Ba.

The cover substrate 51 is a protective member that covers and protects the pixel substrate 2 and the counter substrate 3. The cover substrate 51 may be a glass substrate or a film substrate made of a resin material, for example. The cover substrate 51 has a first surface 51a and a second surface 51b opposite to the first surface 51a. The first surface 51a of the cover substrate 51 serves as a display surface on which an image is displayed and as a detection surface with or to which an object to be detected is in contact or in proximity. The second surface 51b of the cover substrate 51 faces the counter substrate 3 and is bonded to the counter substrate 3 with an adhesive layer, which is not illustrated, interposed therebetween.

The cover substrate 51 according to the present embodiment has an outer shape larger than that of the display panel 10 in planar view. The cover substrate 51 faces the display panel and the walls 101B of the first housing 101. The second electrodes 53A and 53B are disposed between the walls 101B and the cover substrate 51 in a direction perpendicular to the upper surfaces 101Ba of the walls 101B.

The first housing 101 according to the present embodiment is made of a metal material, and the second housing 102 is made of a resin material. The materials are not limited thereto, and the first housing 101 may be made of a resin material, and the second housing 102 may be made of a metal material. The first housing 101 and the second housing 102 may be made of the same material.

As illustrated in FIG. 12, the display device 1 has the display region Ad and the peripheral region Gd. In the present specification, the display region Ad is a region for displaying an image and overlapped with a plurality of pixels Pix (sub-pixels SPix). The peripheral region Gd is a region positioned on the inner side than the outer periphery of the second housing 102 and on the outer side than the display region Ad. In a configuration not provided with the second housing 102, the peripheral region Gd is a region positioned on the inner side than the outer periphery of the first housing 101 or the outer periphery of the cover substrate 51 and on the outer side than the display region Ad. The peripheral region Gd may have a frame shape surrounding the display region Ad. In this case, the peripheral region Gd may also be referred to as a frame region.

As illustrated in FIG. 12, the second housing 102 has a frame shape surrounding the cover substrate 51 and the first housing 101 in planar view. The first housing 101 also has a frame shape surrounding the display panel 10. The structure is not limited thereto, and the first housing 101 simply needs to have a pair of walls 101B (refer to FIG. 11) sandwiching the display panel 10.

As illustrated in FIG. 12, the first electrodes COML and the detection electrodes TDL are provided in the display region Ad. The second electrodes 53A and 53B are provided in the peripheral region Gd. As illustrated in FIGS. 12 and 13, the first electrodes COML extend in a second direction Dy and are arrayed in a first direction Dx. In other words, the first electrodes COML extend along the long side of the display region Ad and are arrayed in the short side thereof. The first electrodes COML have a rectangular shape with their long sides extending in the second direction Dy.

The first direction Dx according to the present embodiment extends along one side of the display region Ad. The second direction Dy is orthogonal to the first direction Dx. The configuration is not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21 (refer to FIG. 9).

The detection electrodes TDL extend in the first direction Dx and are arrayed in the second direction Dy. The detection electrodes TDL intersect the first electrodes COML in planar view. Capacitance is formed at the intersections of the first electrodes COML and the detection electrodes TDL.

With this configuration, to perform mutual capacitance touch detection, the first driver 14A sequentially scans the first electrodes COML in a time-division manner and supplies the drive signals Vcom1 thereto. Sensor output signals Vs1 corresponding to changes in capacitance between the first electrodes COML and the detection electrodes TDL are output to the voltage detector DET. The display device 1 thus performs touch detection in the display region Ad.

As illustrated in FIG. 13, a flexible substrate 72 is provided in the peripheral region Gd of the first substrate 21. A scanner 14C, the source driver 13, and a display integrated circuit (IC) 19 are provided in the peripheral region Gd between the ends of the first electrodes COML and the flexible substrate 72. The scanner 14C is a scanner circuit that sequentially selects the first electrodes COML to be driven. The gate drivers 12 are provided in the peripheral region Gd along the extending direction of the first electrodes COML, that is, on the long sides of the peripheral region Gd of the first substrate 21. The flexible substrate 72 is provided with a detection IC 18.

A flexible substrate 71 is provided in the peripheral region Gd of the second substrate 31. The flexible substrate 71 is electrically coupled to the display IC 19 or the flexible substrate 72 of the first substrate 21 via a coupling terminal 71A. The detection electrodes TDL are electrically coupled to the detection IC 18 via the flexible substrate 71.

The display IC 19 serves as the controller 11 illustrated in FIG. 1. Part of the functions of the detector 40 may be included in the detection IC 18 or provided as functions of an external micro-processing unit (MPU). The configuration of the display IC 19 or the detection IC 18 is not limited thereto, and the display IC 19 or the detection IC 18 may be provided to an external control substrate outside the module, for example. The first driver 14A illustrated in FIG. 1 is included in the display IC 19. The second driver 14B is included in the detection IC 18. The configuration is not limited thereto, and the first driver 14A and the second driver 14B may be provided to the first substrate 21 or an external control substrate.

In the display device 1 according to the present embodiment, the first electrodes COML extend in a direction intersecting the gate lines GCL (refer to FIG. 10) in planar view. With this configuration, wiring (not illustrated) coupled to the first electrodes COML and circuits, such as the scanner 14C, can be provided in the peripheral region Gd at a position different from the positions of the gate drivers 12. Specifically, as illustrated in FIG. 12, the gate drivers 12 are provided on the long sides of the peripheral region Gd, and circuits, such as the scanner 14C, and the display IC 19 are provided on the short side thereof, for example. Consequently, the display device 1 according to the present embodiment can make the peripheral region Gd along the first electrodes COML narrower. The configuration is not limited thereto, and the first electrodes COML may extend in a direction intersecting the signal lines SGL (refer to FIG. 10), that is, in the first direction Dx. In this case, the detection electrodes TDL extend in the second direction Dy so as to intersect the first electrodes COML.

As illustrated in FIG. 12, the second electrodes 53A and 53B are disposed on the outer side than the display region Ad in planar view. Specifically, the second electrode 53A is disposed on one of the sides of the peripheral region Gd facing each other in the first direction Dx, and the second electrode 53B is disposed on the other thereof. The second electrodes 53A and 53B extend in the second direction Dy and are disposed facing each other in the first direction Dx. The first electrodes COML and the detection electrodes TDL are disposed between the second electrodes 53A and 53B in planar view. In other words, the second electrodes 53A and 53B are provided not overlapping the first electrodes COML or the detection electrodes TDL. The second electrodes 53A and 53B extend in a direction parallel to the first electrodes COML in planar view. The second electrode 53A is disposed facing one of two outermost first electrodes COML out of the first electrodes COML arrayed in the first direction Dx, and the second electrode 53B is disposed facing the other thereof. The second electrodes 53A and 53B are disposed facing the ends of the detection electrodes TDL.

The length of the second electrodes 53A and 53B in the second direction Dy is preferably substantially equal to or longer than that of the display region Ad in the second direction Dy. The length of the second electrodes 53A and 53B in the second direction Dy may be shorter than that of the display region Ad in the second direction Dy. The second electrodes 53A and 53B each preferably continuously extend without being electrically separated in a portion along at least one side of the display region Ad.

As illustrated in FIG. 12, the second electrodes 53A and 53B are provided in the peripheral region Gd of the first housing 101. The peripheral region Gd of the cover substrate 51 is provided with a colored layer, which is not illustrated. The colored layer is a decorative layer made of a resin material or a metal material colored to suppress transmission of light, for example.

The second electrodes 53A and 53B are prevented from being visually recognized from the outside because they are disposed overlapping the colored layer. With this configuration, the second electrodes 53A and 53B may be made of a metal material having high conductivity. The second electrodes 53A and 53B are a metal layer made of one or more of aluminum (Al), copper (Cu), silver (Ag), molybdenum (Mo), chromium (Cr), and tungsten (W), for example. Alternatively, the second electrodes 53A and 53B may be made of an alloy including one or more of these metal materials or a multilayered body including a plurality of conductive layers made of these materials.

With the second electrodes 53A and 53B having the configuration described above, the display device 1 can detect touch input performed on the peripheral region Gd based on changes in capacitance between the second electrodes 53A and 53B and the detection electrodes TDL provided in the display region Ad.

As illustrated in FIG. 11, the second electrodes 53A and 53B are provided on the walls 101B of the first housing 101. This configuration can make the frames of the first substrate 21, the second substrate 31, or the cover substrate 51 narrower than in a configuration where the second electrodes 53A and 53B are provided in the peripheral region Gd of the first substrate 21, the second substrate 31, or the cover substrate 51. Furthermore, this configuration has less restriction in the positions of various kinds of wiring, circuits, and other components provided to the first substrate 21 or the second substrate 31.

Figure 14:
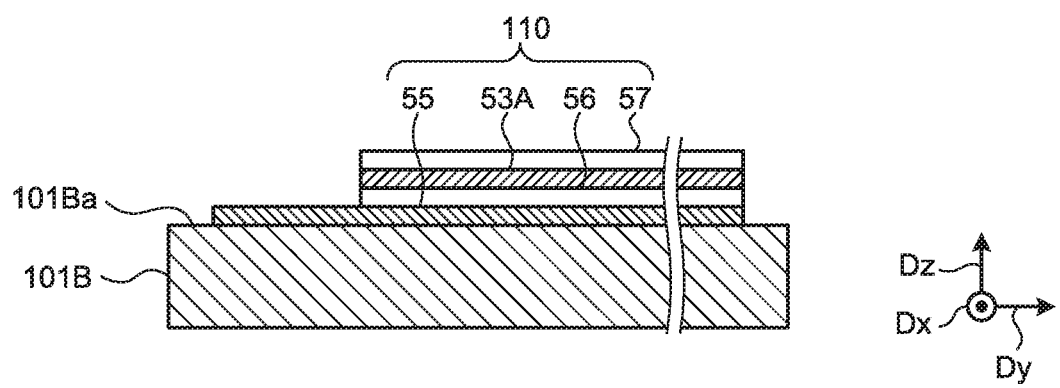
FIG. 14 is a sectional view schematically illustrating a film sensor according to the first embodiment.

If the first housing 101 is made of a metal, the second electrodes 53A and 53B need to be electrically insulated from the first housing 101. FIG. 14 is a sectional view schematically illustrating a film sensor according to the first embodiment. FIG. 14 is a sectional view along line A1-A2 in FIG. 12.

In the example illustrated in FIG. 14, a film sensor 110 is provided on the upper surface 101Ba of the wall 101B. The film sensor 110 includes a base 55, a protective layer 56, the second electrode 53A, and a protective layer 57. The base 55 is provided on the upper surface 101Ba of the wall 101B. The protective layer 56, the second electrode 53A, and the protective layer 57 are disposed in this order on the base 55. The base 55 is a film base made of a resin material, such as polyethylene terephthalate (PET). In this case, the second electrode 53A is formed by a thin-film forming method, such as sputtering. The protective layers 56 and 57 are made of an insulating material, such as an oxide and a nitride, and provided to protect the second electrode 53A.

As described above, the second electrode 53A is provided on the base 55 with the protective layer 56 interposed therebetween. The base 55 is disposed on the first housing 101. The second electrode 53A is electrically insulated from the first housing 101 by the protective layer 56 and the base 55. If the first housing 101 is made of a metal, the second electrode 53A can satisfactorily detect touch input performed on the peripheral region Gd based on changes in capacitance between the second electrode 53A and the detection electrodes TDL.

Figure 15:
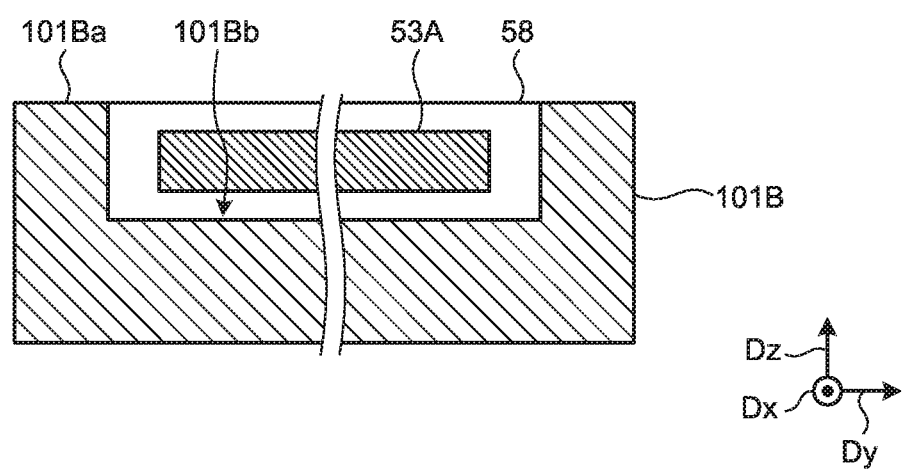
FIG. 15 is a sectional view schematically illustrating another example of a configuration in which a second electrode is disposed on a housing according to the first embodiment.

While FIG. 14 illustrates the second electrode 53A, the second electrode 53B can also be included in the film sensor 110 and disposed on the wall 101B in the same manner. The method for disposing the second electrodes 53A and 53B on the first housing 101 is not limited to the example illustrated in FIG. 14. FIG. 15 is a sectional view schematically illustrating another example of a configuration in which the second electrode is disposed on the housing according to the first embodiment. FIG. 15 is a sectional view along line A1-A2 in FIG. 12.

As illustrated in FIG. 15, a protective layer 58 is provided around the second electrode 53A. The protective layer 58 covers the upper surface, the lower surface, and the side surfaces of the second electrode 53A. The second electrode 53A is disposed on the first housing 101 with the protective layer 58 interposed therebetween. The protective layer 58 is made of a resin material, for example. The second electrode 53A has higher corrosion resistance and abrasion resistance because it is coated with the protective layer 58.

A groove 101Bb is formed on the upper surface 101Ba of the wall 101B. The groove 101Bb extends in the longitudinal direction of the wall 101B. The second electrode 53A and the protective layer 58 are provided in the groove 101Bb. If the cover substrate 51, the second housing 102, and other components come into contact with the upper surface 101Ba in the assembly process of the display device 1, for example, this structure prevents the second electrode 53A from coming into contact with these members. Consequently, the second electrode 53A has higher corrosion resistance and abrasion resistance. The upper surface 101Ba of the wall 101B and the upper surface of the protective layer 58 are preferably at the same position in a third direction Dz. The structure is not limited thereto, and the upper surface of the protective layer 58 may be positioned below or above the upper surface 101Ba of the wall 101B.

With this configuration, the second electrode 53A is electrically insulated from the first housing 101 by the protective layer 58. If the first housing 101 is made of a metal, the second electrode 53A can satisfactorily detect touch input performed on the peripheral region Gd based on changes in capacitance between the second electrode 53A and the detection electrodes TDL.

Figure 16:
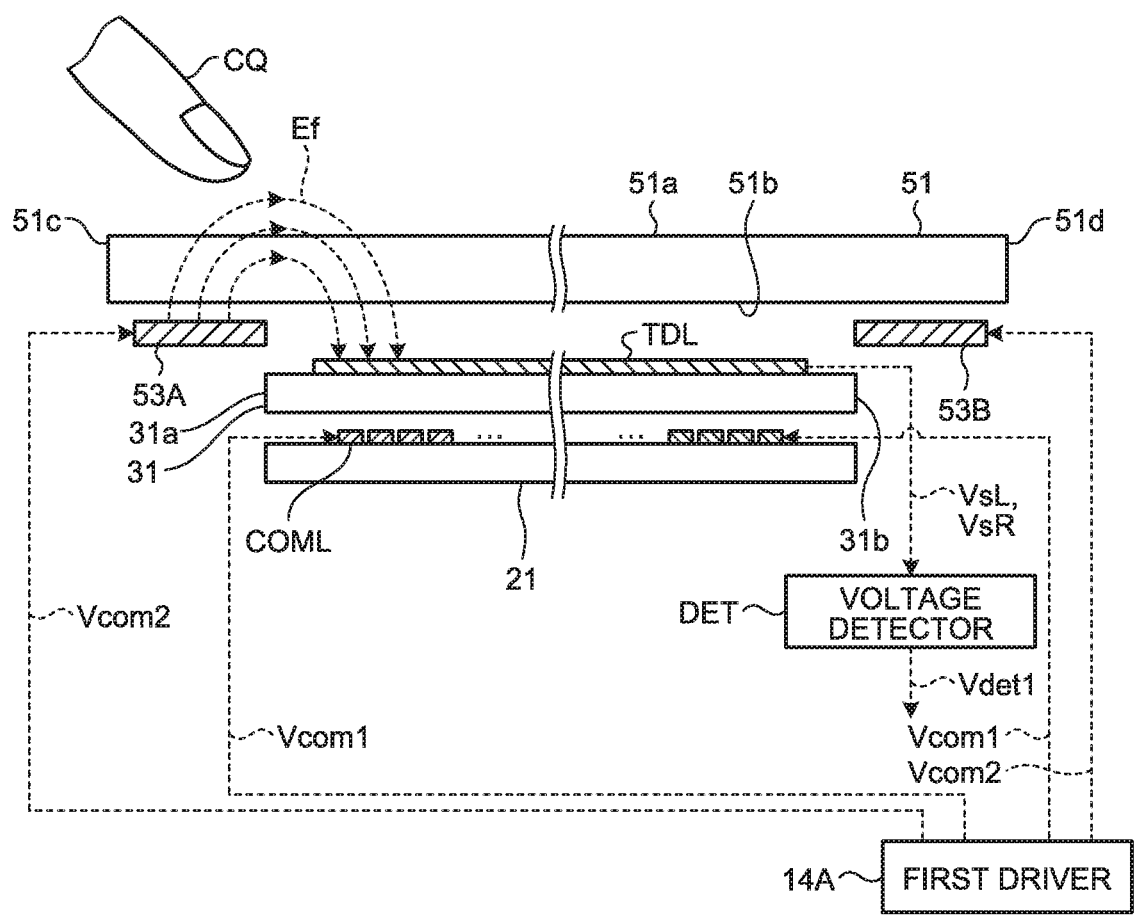
FIG. 16 is a diagram for schematically explaining an exemplary operation in a second detection mode.

The following describes the detection operation performed by the display device 1 according to the present embodiment in greater detail. FIG. 16 is a diagram for schematically explaining an exemplary operation in a second detection mode.

The display device 1 according to the present embodiment has three detection modes, that is, a first detection mode, a second detection mode, and a third detection mode. In the first detection mode, the display device 1 mainly detects an object to be detected in the display region Ad by the mutual capacitance method. In the second detection mode, the display device 1 mainly detects an object to be detected in the peripheral region Gd by the mutual capacitance method. In the third detection mode, the display device 1 detects an object to be detected in the display region Ad and the peripheral region Gd by the self-capacitance method.

In the first detection mode, the scanner 14C (refer to FIG. 13) sequentially selects the first electrode COML as a target to be driven in a time-division manner. The scanner 14C couples the first electrode COML selected as a target to be driven to the first driver 14A. The first driver 14A supplies the drive signals Vcom1 to the first electrode COML to be driven. The detection electrodes TDL output, to the voltage detector DET, the sensor output signals Vs corresponding to changes in capacitance between the first electrode COML and the detection electrodes TDL. The display device 1 thus can detect an object to be detected in the display region Ad. The scanner 14C may select a plurality of first electrodes COML simultaneously as a target to be driven and perform detection in units of a drive electrode block including the first electrodes COML.

As illustrated in FIG. 16, in the second detection mode, the scanner 14C (refer to FIG. 13) sequentially selects the second electrodes 53A and 53B as a target to be driven in a time-division manner. The first driver 14A supplies the drive signals Vcom2 to the second electrodes 53A and 53B. As a result, fringe lines of electric force Ef are generated between the second electrodes 53A and 53B and the detection electrodes TDL. FIG. 16 illustrates only the lines of electric force Ef on the second electrode 53A side.

The lines of electric force Ef extend from the second electrode 53A in the peripheral region Gd to the upper side than the first surface 51a of the cover substrate 51 and then extend toward the detection electrodes TDL in the display region Ad. If an object to be detected CQ is in contact with or in proximity to the peripheral region Gd of the first surface 51a, the lines of electric force Ef are blocked by the object to be detected CQ. As a result, capacitance between the second electrodes 53A and 53B and the detection electrodes TDL change. The detection electrodes TDL output, to the voltage detector DET, sensor output signals VsL and VsR corresponding to changes in capacitance between the second electrodes 53A and 53B and the detection electrodes TDL. The display device 1 thus performs touch detection on the peripheral region Gd provided with the second electrode 53A.

As illustrated in FIG. 11, the second electrodes 53A and 53B according to the present embodiment are provided on the upper surfaces 101Ba of the walls 101B. This structure prevents the lines of electric force Ef generated from the second electrodes 53A and 53B from being blocked by the first housing 101 made of a metal. Consequently, the present embodiment can satisfactorily perform touch detection on the peripheral region Gd.

As illustrated in FIG. 16, the second electrodes 53A and 53B are preferably disposed on the outer side than ends 31a and 31b, respectively, of the second substrate 31 in planar view. This configuration can reduce stray capacitance formed between the various kinds of wiring provided in the peripheral region Gd of the second substrate 31 and the second electrodes 53A and 53B. Consequently, the display device 1 can increase the touch detection sensitivity in the peripheral region Gd.

While the second electrodes 53A and 53B are disposed at a position overlapping the cover substrate 51 as illustrated in FIG. 16, the configuration is not limited thereto. The second electrodes 53A and 53B, for example, may be disposed on the outer side than ends 51c and 51d, respectively, of the cover substrate 51.

In the third detection mode, the display device 1 detects an object to be detected based on capacitance changes in the first electrodes COML, the detection electrodes TDL, and the second electrodes 53A and 53B. Specifically, the second driver 14B (refer to FIG. 1) simultaneously or sequentially supplies the drive signals VcomA to the first electrodes COML and the second electrodes 53A and 53B. The second driver 14B simultaneously or sequentially supplies the drive signals VcomB to the detection electrodes TDL. Sensor output signals Vs2 corresponding to capacitance changes in the first electrodes COML, the detection electrodes TDL, and the second electrodes 53A and 53B are output to the voltage detector DET.

Figure 17:
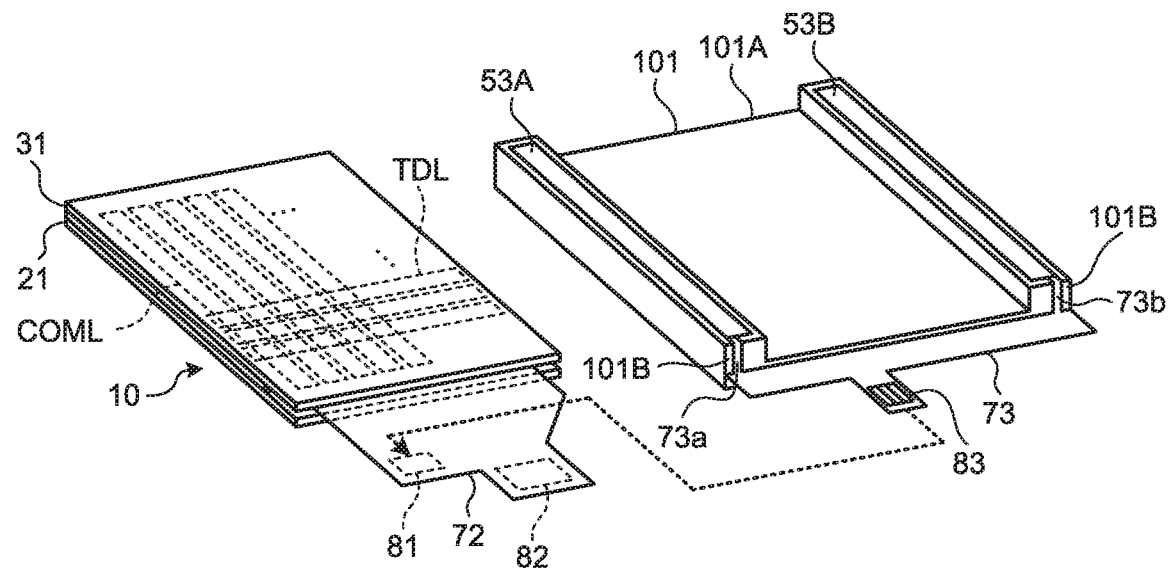
FIG. 17 is a view for explaining a coupling configuration of the display panel and the second electrodes.

FIG. 17 is a view for explaining a coupling configuration of the display panel and the second electrodes. As described above, the operations of the second electrodes 53A and 53B are controlled by the controller 11 and the detection controller 11A. The second electrodes 53A and 53B need to be electrically coupled to at least one of the display IC 19 and the detection IC 18 illustrated in FIG. 13.

As illustrated in FIG. 17, the first housing 101 has the bottom 101A and two walls 101B. The two walls 101B are provided along two facing sides of the bottom 101A. The display panel 10 is embedded between the pair of walls 101B facing each other with a space interposed therebetween. The structure is not limited to the example illustrated in FIG. 17, and the first housing 101 may have four walls 101B extending along four sides of the bottom 101A.

As illustrated in FIG. 17, a flexible substrate 73 is coupled to the first housing 101. The flexible substrate 73 is provided on the side surface of the first housing 101. The flexible substrate 73 is provided along a side not provided with the walls 101B out of the sides of the bottom 101A and is coupled to the two walls 101B facing each other. One end of the flexible substrate 73 is coupled to a coupling substrate 73a, and the other end thereof is coupled to a coupling substrate 73b. The coupling substrate 73a extends upward from the flexible substrate 73 along the wall 101B and is coupled to the second electrode 53A. Similarly, the coupling substrate 73b extends upward from the flexible substrate 73 along the wall 101B and is coupled to the second electrode 53B.

When the display panel 10 is embedded in the first housing 101, the flexible substrate 73 is positioned under the flexible substrate 72 of the display panel 10 in planar view. A terminal 83 of the flexible substrate 73 is electrically coupled to a terminal 81 of the flexible substrate 72. With this configuration, the second electrodes 53A and 53B are electrically coupled to the display panel 10 in the first housing 101 via the flexible substrates 73 and 72. A terminal 82 of the flexible substrate 72 couples the display device 1 to a main substrate 74 (refer to FIG. 18).

Figure 18:
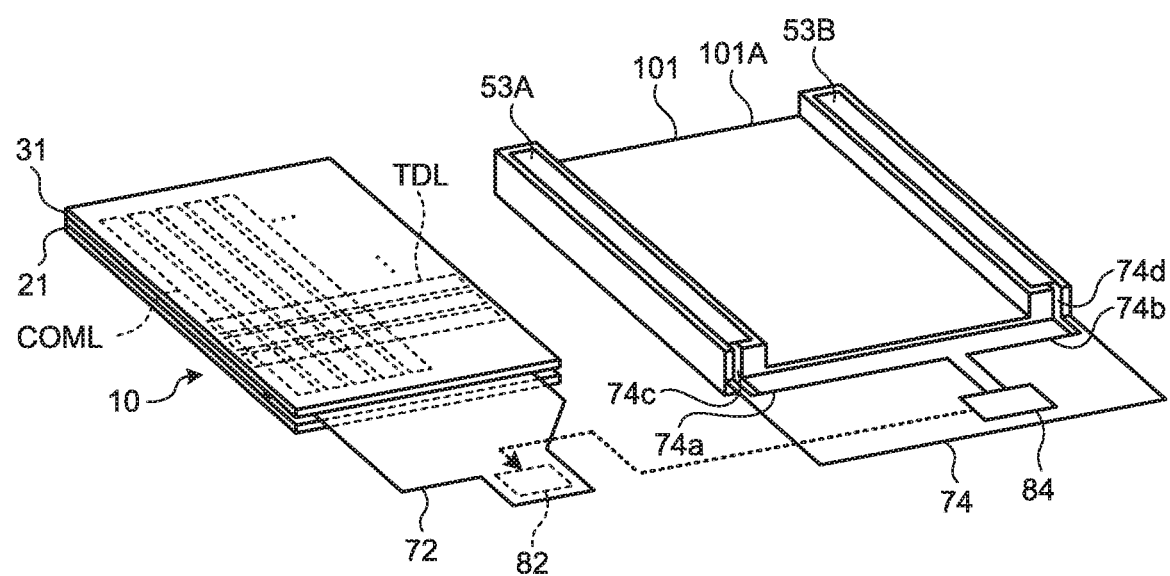
FIG. 18 is a view for explaining another example of the coupling configuration of the display panel and the second electrodes.

FIG. 18 is a view for explaining another example of the coupling configuration of the display panel and the second electrodes. In the present modification, the main substrate 74 is coupled to the first housing 101. The main substrate 74 is provided with a host IC and a power source, for example. The main substrate 74 is provided on the side surface of the first housing 101. The main substrate 74 is provided along a side not provided with the walls 101B out of the sides of the bottom 101A and is coupled to the two walls 101B facing each other. One end of the main substrate 74 is coupled to a coupling substrate 74c, and the other end thereof is coupled to a coupling substrate 74d. The coupling substrates 74c and 74d are flexible substrates, for example.

The coupling substrate 74c extends upward from the main substrate 74 along the wall 101B and is coupled to the second electrode 53A. The coupling substrate 74c is coupled to a terminal 84 via a wire 74a provided to the main substrate 74. Similarly, the coupling substrate 74d extends upward from the main substrate 74 along the wall 101B and is coupled to the second electrode 53B. The coupling substrate 74d is coupled to the terminal 84 via a wire 74b provided to the main substrate 74.

When the display panel 10 is embedded in the first housing 101, the main substrate 74 is positioned under the flexible substrate 72 of the display panel 10 in planar view. The terminal 84 of the main substrate 74 is electrically coupled to the terminal 82 of the flexible substrate 72. With this configuration, the second electrodes 53A and 53B are electrically coupled to the display panel 10 in the first housing 101 via the coupling substrates 74c and 74d, the main substrate 74, and the flexible substrate 72.

Figure 19:
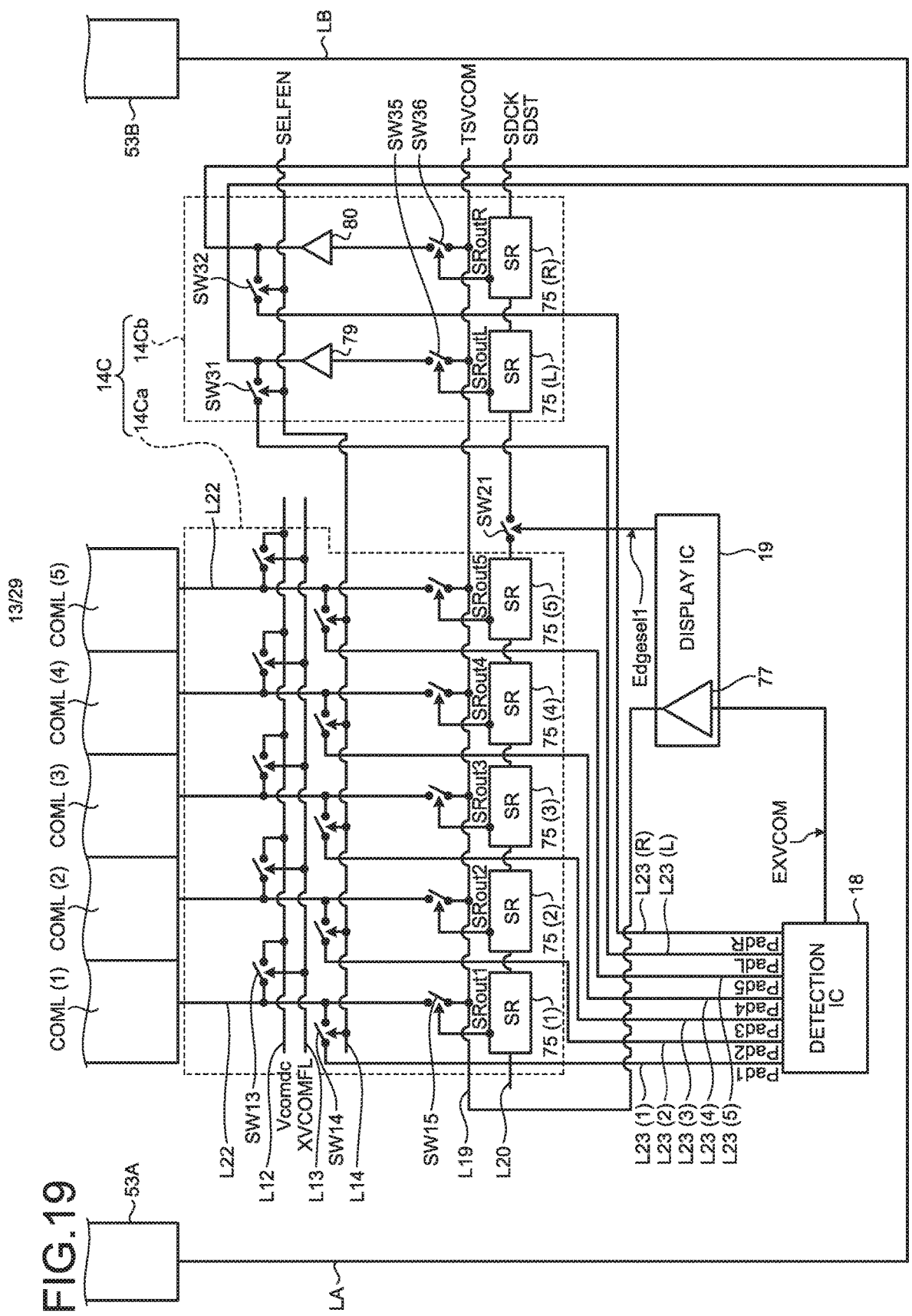
FIG. 19 is a circuit diagram of a drive circuit according to the first embodiment.

The following describes an example of a drive circuit according to the present embodiment. FIG. 19 is a circuit diagram of the drive circuit according to the first embodiment. As illustrated in FIG. 19, the second electrodes 53A and 53B and first electrodes COML(1), COML(2), COML(3), COML(4), and COML(5) are coupled to the scanner 14C. In the explanation, the first electrodes COML(1), COML(2), COML(3), COML(4), and COML(5) are referred to as the first electrodes COML when they need not be distinguished from one another. While FIG. 19 illustrates five first electrodes COML to simplify the explanation, the configuration is not limited thereto. Six or more first electrodes COML may be provided.

The scanner 14C sequentially or simultaneously selects the first electrodes COML and the second electrodes 53A and 53B to be driven based on the various control signals output from the display IC 19. The first electrodes COML and the second electrodes 53A and 53B selected as a target to be driven are coupled to the display IC 19 or the detection IC 18 via the scanner 14C. The functions of the first driver 14A (refer to FIG. 1) according to the present embodiment are included in the display IC 19. The functions of the second driver 14B (refer to FIG. 1) are included in the detection IC 18.

The scanner 14C includes a first scanner 14Ca and a second scanner 14Cb. The first scanner 14Ca is a circuit that sequentially scans the first electrodes COML. The second scanner 14Cb is a circuit that sequentially scans the second electrodes 53A and 53B.

As illustrated in FIG. 19, the first electrodes COML are each coupled to the display IC 19 via a wire L22, a switch SW15, and a wire L19. A plurality of switches SW15 and a plurality of wires L22 are coupled to one wire L19. The first electrodes COML are supplied with drive signals TSVCOM via the common wire L19. The first electrodes COML are each coupled to the detection IC 18 via the wire L22, a switch SW14, and a wire L23. Wires L23(1), L23(2), L23(3), L23(4), and L23(5) are provided corresponding to the first electrodes COML(1), COML(2), COML(3), COML(4), and COML(5), respectively.

The second electrode 53A is coupled to the second scanner 14Cb via the wire LA. The second electrode 53A is coupled to the display IC 19 via the wire LA, an amplifier 79, a switch SW35, and the wire L19. The second electrode 53A is also coupled to the detection IC 18 via the wire LA, a switch SW31, and a wire L23(L).

Similarly, the second electrode 53B is coupled to the second scanner 14Cb via the wire LB. The second electrode 53B is coupled to the display IC 19 via the wire LB, an amplifier 80, a switch SW36, and the wire L19. The second electrode 53B is also coupled to the detection IC 18 via the wire LB, a switch SW32, and a wire L23(R).

The display IC 19 supplies control signals XVCOMFL to switches SW13 via a wire L13. The control signal XVCOMFL is a control signal for switching between the display operation and the detection operation. The control signal XVCOMFL is a high-level voltage signal in the display operation and is a low-level voltage signal in the detection operation. The control signal XVCOMFL is a voltage signal obtained by inverting the voltage level of a control signal VCOMFL (refer to FIG. 20).

In the display operation, the control signal XVCOMFL is at a high level. As a result, the switches SW13 are turned on. The display IC 19 supplies the display drive signals Vcomdc to all the first electrodes COML via a wire L12, the respective switches SW13, and the respective wires L22.

The display IC 19 supplies control signals SELFEN to the switches SW14, the switch SW31, and the switch SW32 via a wire L14. Based on the control signals SELFEN, the switches SW14, the switch SW31, and the switch SW32 are turned on and off. The control signal SELFEN is a signal for switching between the mutual capacitance detection mode and the self-capacitance detection mode. In the third detection mode, the control signal SELFEN is a high-level voltage signal. By contrast, in the detection modes other than the third detection mode and in the display operation, the control signal SELFEN is a low-level voltage signal.

In the third detection mode, the control signal SELFEN is at a high level, whereby the switches SW14, the switch SW31, and the switch SW32 are turned on. As a result, the first electrodes COML are each coupled to the detection IC 18 via the wire L22, the switch SW14, and the wire L23. Wires L23(1), L23(2), L23(3), L23(4), and L23(5) are coupled to output terminals Pad1, Pad2, Pad3, Pad4, and Pad5, respectively, of the detection IC 18. The second driver 14B (not illustrated) included in the detection IC 18 supplies the drive signals VcomA to the first electrodes COML simultaneously or in a time-division manner. The sensor output signals Vs2 corresponding to capacitance changes in the first electrodes COML are supplied to the voltage detector DET of the detection IC 18. The display device 1 thus performs the self-capacitance touch detection described above.

The second electrode 53A is coupled to the detection IC 18 via the wire LA, the switch SW31, and the wire L23(L). The wire L23(L) is coupled to an output terminal PadL of the detection IC 18. Similarly, the second electrode 53B is coupled to the detection IC 18 via the wire LB, the switch SW32, and the wire L23(R). The wire L23(R) is coupled to an output terminal PadR of the detection IC 18. The second driver 14B (not illustrated) supplies the drive signals VcomA to the second electrodes 53A and 53B simultaneously or in a time-division manner. The sensor output signals Vs2 corresponding to capacitance changes in the second electrodes 53A and 53B are supplied to the voltage detector DET of the detection IC 18. The display device 1 thus performs the self-capacitance touch detection described above.

If the control signal SELFEN is a low-level voltage signal, the switches SW14, the switch SW31, and the switch SW32 are turned off. As a result, the first electrodes COML and the second electrodes 53A and 53B are not electrically coupled to the detection IC 18.

In the first detection mode and the second detection mode, the first scanner 14Ca and the second scanner 14Cb select the first electrodes COML and the second electrodes 53A and 53B to be driven based on the control signals from the display IC 19. Specifically, the first scanner 14Ca includes shift registers 75(1), 75(2), 75(3), 75(4), and 75(5). The shift registers 75(1), 75(2), 75(3), 75(4), and 75(5) are provided corresponding to the first electrodes COML(1), COML(2), COML(3), COML(4), and COML(5), respectively. The second scanner 14Cb includes shift registers 75(L) and 75(R). The shift registers 75(L) and 75(R) are provided corresponding to the second electrodes 53A and 53B, respectively.

In the following description, the shift registers 75(1), 75(2), 75(3), 75(4), 75(5), 75(L), and 75(R) are referred to as the shift registers 75 when they need not be distinguished from one another.

As illustrated in FIG. 19, the shift registers 75 are disposed in the order of the shift registers 75(1), 75(2), 75(3), 75(4), 75(5), 75(L), and 75(R). A switch SW21 is provided between the shift register 75(5) and the shift register 75(L). The switch SW21 is turned on and off based on selection signals Edgesel1 supplied from the display IC 19. The selection signal Edgesel1 according to the present embodiment is a voltage signal fixed at a high level. As a result, the shift registers 75 of the first scanner 14Ca and the shift registers 75 of the second scanner 14Cb are electrically coupled in series. With this configuration, the shift registers 75 sequentially supply scanning signals SRout to the first electrodes COML and the second electrodes 53A and 53B.

Specifically, the display IC 19 supplies scanning start signals SDST and clock signals SDCK to the shift registers 75 via a wire L20. The shift registers 75 start scanning using the scanning start signals SDST as a trigger. The shift registers 75 sequentially output scanning signals SRout1, SRout2, SRout3, SRout4, SRout5, SRoutL, and SRoutR synchronized with the clock signals SDCK to the switches SW15, SW35, and SW36.

In the first detection mode, the shift registers 75 sequentially supply the scanning signals SRout1, SRout2, SRout3, SRout4, and SRout5 to the respective switches SW15. The switch SW15 is provided between the wire L22 and the wire L19. If the switch SW15 receives the scanning signal SRout and is turned on, the first electrode COML to be driven is electrically coupled to the display IC 19 via the wire L22, the switch SW15, and the wire L19. As a result, the first electrode COML to be driven is selected by the corresponding shift register 75. The display IC 19 sequentially supplies drive signals TSVCOM to the first electrodes COML to be driven. The display device 1 thus performs touch detection in the display region Ad by the mutual capacitance method.

The detection IC 18 supplies input logic signals EXVCOM to the display IC 19. An amplifier 77 included in the display IC 19 amplifies the input logic signals EXVCOM. The display IC 19 supplies the signals resulting from amplification to the first electrode COML to be driven as the drive signals TSVCOM. The drive signal TSVCOM corresponds to the drive signal Vcom1 (refer to FIGS. 1 and 16). The method for generating the drive signals TSVCOM is not limited thereto, and they may be generated in any desired method. The drive signals TSVCOM, for example, may be generated by alternately switching between a high-level DC voltage signal and a low-level DC voltage signal.

In the second detection mode, the shift registers 75(L) and 75(R) sequentially supply the scanning signals SRoutL and SRoutR to the switches SW35 and SW36, respectively. The switch SW35 is provided between the wire LA and the wire L19. If the switch SW35 is turned on, the second electrode 53A to be driven is electrically coupled to the display IC 19. The display IC 19 supplies the drive signals TSVCOM to the amplifier 79 via the wire L19 and the switch SW35. The drive signals Vcom2 resulting from amplification performed by the amplifier 79 are supplied to the second electrode 53A via the wire LA. The display device 1 thus performs touch detection in the peripheral region Gd by the mutual capacitance method.

Similarly, the switch SW36 is provided between the wire LB and the wire L19. If the switch SW36 is turned on, the second electrode 53B to be driven is electrically coupled to the display IC 19. The display IC 19 supplies the drive signals TSVCOM to the amplifier 80 via the wire L19 and the switch SW36. The drive signals Vcom2 resulting from amplification performed by the amplifier 80 are supplied to the second electrode 53B via the wire LB. The display device 1 thus performs touch detection in the peripheral region Gd by the mutual capacitance method.

The second electrodes 53A and 53B according to the present embodiment are supplied with the drive signals Vcom2 resulting from amplification performed by the amplifiers 79 and 80, respectively. Consequently, the display device 1 can increase the touch detection sensitivity in the peripheral region Gd.

The shift registers 75(L) and 75(R) according to the present embodiment can be coupled to or decoupled from the shift registers 75(1), 75(2), 75(3), 75(4), and 75(5) by the switch SW21. With this configuration, the first scanner 14Ca can be provided without significantly changing a drive circuit having the conventional configuration that drives the first electrodes COML in a time-division manner. If touch detection is not performed in the peripheral region Gd, the display IC 19 can change the drive of the scanner 14C by supplying the selection signal Edgesel1 to the switch SW21.

The circuit configuration illustrated in FIG. 19 is given by way of example only and may be appropriately modified. The shift registers 75, for example, may be disposed in the order of the shift registers 75(L), 75(R), 75(1), 75(2), 75(3), 75(4), and 75(5).

The following describes an example of the operation performed by the display device 1 according to the present embodiment. FIG. 20 is a timing waveform chart of an exemplary operation performed by the display device 1 according to the first embodiment.

The display device 1 performs a touch detection operation (detection period) and a display operation (display period) in a time-division manner. The display device 1 may perform the touch detection operation and the display operation in any division manner. The following describes a method of performing touch detection and display in a time-division manner in one frame period 1DF of the display panel 10, that is, in a time required to display video information of one screen, for example.

As illustrated in FIG. 20, a plurality of display periods Pd and a plurality of detection periods Pm, Pe1, Pe2, Ps1, and Ps2 are alternately arranged. The display periods Pd and the detection periods Pm, Pe1, Pe2, Ps1, and Ps2 are switched based on the control signals VCOMFL and SELFEN supplied from the controller 11 (refer to FIG. 1).

If the control signal VCOMFL is at a low-level, the display operation described above is performed in the display period Pd. As illustrated in FIG. 20, the first driver 14A included in the display IC 19 supplies the drive signals Vcomdc serving as a common potential for display drive to all the first electrodes COML in the display region Ad in the display period Pd. The detection electrodes TDL are supplied with no voltage signal, thereby being brought into a floating state where their electric potential is not fixed.

In the detection periods Pm, Pe1, and Pe2, the control signal VCOMFL is at a high level, whereby the detection operations in the first detection mode and the second detection mode are performed. The operations in the detection periods Pm, Pe1, and Pe2 are sequentially performed based on the scanning signals SRout. In the detection period Pm, the display device 1 detects an object to be detected in the display region Ad by performing touch detection in the first detection mode. In the detection periods Pe1 and Pe2, the display device 1 detects an object to be detected in the peripheral region Gd by performing touch detection in the second detection mode.

The selection signal Edgesel1 is fixed at a high level H in one frame period 1DF. As a result, the shift registers 75 of the first scanner 14Ca illustrated in FIG. 19 are electrically coupled to the shift registers 75 of the second scanner 14Cb in series. Consequently, the display device 1 can sequentially perform the detection operations in the detection periods Pm, Pe1, and Pe2 in a time-division manner in one frame period 1DF.

In the detection periods Ps1 and Ps2, the control signal SELFEN is at a high level. In this case, the display device 1 performs the detection operation in the third detection mode. As illustrated in FIG. 20, the detection periods are arranged in the order of Pm, Pe1, Pe2, Ps1, and Ps2 in one frame period 1DF. The display device 1 performs the detection operations in the order of the first direction mode, the second direction mode, and the third detection mode.

In the first detection mode, the scanner 14C (refer to FIG. 19) selects one first electrode COML as a target to be driven in each detection period Pm. Specifically, the scanner 14C sequentially outputs the scanning signals SRout1, SRout2, SRout3, SRout4, and SRout5, thereby selecting the first electrodes COML to be driven. The display IC 19 sequentially supplies the drive signals TSVCOM (drive signals Vcom1) to the first electrodes COML to be driven. The detection electrodes TDL output, to the voltage detector DET (refer to FIG. 3), the sensor output signals Vs1 corresponding to changes in capacitance between the first electrodes COML and the detection electrodes TDL. The display device 1 thus detects a touch made by an object to be detected in the display region Ad.

In the second detection mode, the scanner 14C (refer to FIG. 19) outputs the scanning signal SRoutL in the detection period Pe1. As a result, the second electrode 53A to be driven is selected. The display IC 19 supplies the drive signals Vcom2 to the second electrode 53A. The drive signal Vcom2 is a voltage signal obtained by amplifying the drive signal TSVCOM and has an amplitude of substantially three times the amplitude of the drive signal Vcom1, for example. The detection electrodes TDL output, to the voltage detector DET (refer to FIG. 3), the sensor output signals VsL corresponding to changes in capacitance between the detection electrodes TDL and the second electrode 53A. The display device 1 thus detects a touch made by an object to be detected in the peripheral region Gd.

Similarly, the scanner 14C outputs the scanning signal SRoutR in the detection period Pe2. As a result, the second electrode 53B to be driven is selected. The detection electrodes TDL output, to the voltage detector DET (refer to FIG. 3), the sensor output signals VsR corresponding to changes in capacitance between the detection electrodes TDL and the second electrode 53B. The display device 1 thus detects a touch made by an object to be detected in the peripheral region Gd.

In the detection periods Ps1 and Ps2, the detection controller 11A (refer to FIG. 1) included in the detection IC 18 mainly performs self-capacitance touch detection. In the detection period Ps1, the detection IC 18 supplies the drive signals VcomA to the detection electrodes TDL. The detection electrodes TDL output the sensor output signals Vs2 corresponding to capacitance changes in the detection electrodes TDL to the voltage detector DET. In the detection period Ps1, the display device 1 calculates the position of an object to be detected in the array direction of the detection electrodes TDL, that is, in the second direction Dy (refer to FIG. 13).

In the detection period Ps1, the detection IC 18 supplies the guard signals Vgd to all the first electrodes COML and the second electrodes 53A and 53B. The guard signal Vgd is a voltage signal synchronized with the drive signal VcomA and having the same electric potential as that of the drive signal VcomA. As a result, the first electrodes COML and the second electrodes 53A and 53B are driven at the same electric potential as that of the detection electrodes TDL. This mechanism can reduce stray capacitance generated between the switching elements Tr and the various kinds of wiring provided to the first substrate 21 and the detection electrodes TDL.

In the detection period Ps2, the detection IC 18 supplies the drive signals VcomB to the first electrodes COML and the second electrodes 53A and 53B. The first electrodes COML and the second electrodes 53A and 53B output the sensor output signals Vs2 corresponding to capacitance changes to the voltage detector DET. In the detection period Ps2, the display device 1 calculates the position of an object to be detected in the array direction of the first electrodes COML and the second electrodes 53A and 53B, that is, in the first direction Dx (refer to FIG. 12). As described above, the first electrodes COML and the second electrodes 53A and 53B serve as detection electrodes in self-capacitance touch detection.

In the detection period Ps2, the detection IC 18 may supply the guard signals Vgd to the second electrodes 53A and 53B. The guard signal Vgd is a voltage signal synchronized with the drive signal VcomB and having the same electric potential as that of the drive signal VcomB. As a result, the second electrodes 53A and 53B are driven at the same electric potential as that of the first electrodes COML. In this case, the first electrodes COML serve as detection electrodes, and the second electrodes 53A and 53B serve as guard electrodes. This mechanism can reduce stray capacitance in the first electrodes COML. The detection IC 18 may supply no voltage signal to the detection electrodes TDL, thereby bringing them into a floating state. Alternatively, the detection IC 18 may supply voltage signals having a fixed potential to the detection electrodes TDL.

The exemplary operation illustrated in FIG. 20 is given by way of example only and may be appropriately modified. The lengths (widths) of the display period Pd and the detection periods Pm, Pe1, Pe2, Ps1, and Ps2, for example, are schematic ones and may be equal to or different from one another. The order of the detection periods Pm, Pe1, Pe2, Ps1, and Ps2 may be appropriately modified. While the display device 1 performs the detection operation for one detection surface in one frame period 1DF, it may perform the detection operation for one detection surface during a plurality of frame periods 1DF.

First Modification of the First Embodiment

FIG. 21 is a sectional view of a schematic sectional structure of the display device according to a first modification of the first embodiment. As illustrated in FIG. 21, a display device 1A according to the present modification does not include the second housing 102 (refer to FIG. 11). Similarly to the configuration illustrated in FIG. 11, the display panel 10 according to the present modification is fixed to the first housing 101. The first housing 101 includes the two walls 101B facing each other. The second electrodes 53A and 53B are provided on the upper surfaces 101Ba of the walls 101B.

The cover substrate 51 is provided facing the display panel 10 and the walls 101B. The second electrodes 53A and 53B are disposed between the cover substrate 51 and the walls 101B in the direction perpendicular to the upper surfaces 101Ba. The present modification has no member, such as a housing, on the outer side than the outer periphery of the cover substrate 51. The outer periphery of the cover substrate 51 has a curved surface in sectional view. The present modification does not include the second housing 102 (refer to FIG. 11). With this configuration, the display device 1A has a smaller size and a narrower frame. Furthermore, the display device 1A has a simpler configuration and can be manufactured at a lower cost.

Second Modification of the First Embodiment

FIG. 22 is a sectional view of a schematic sectional structure of the display device according to a second modification of the first embodiment. As illustrated in FIG. 22, a display device 1B according to the present modification also does not include the second housing 102 (refer to FIG. 11). The second electrodes 53A and 53B according to the present modification are also provided on the upper surfaces 101Ba of the walls 101B.

The cover substrate 51 is bonded on the display panel 10 with an adhesive layer, which is not illustrated, interposed therebetween. The cover substrate 51 has substantially the same width as that of the display panel 10 and is not provided at positions facing the walls 101B. The present modification does not include the second housing 102 (refer to FIG. 11). The cover substrate 51 has an outer shape smaller than that of the first housing 101 in planar view. With this configuration, the cover substrate 51 has a narrower frame, whereby the display device 1B has a smaller size and a narrower frame. Furthermore, the display device 1B has a simpler configuration and can be manufactured at a lower cost.

The second electrodes 53A and 53B are provided on the outer side than the cover substrate 51 in planar view. In other words, the present modification has no member, such as the cover substrate 51 and the first housing 101, at the positions overlapping the second electrodes 53A and 53B. This configuration reduces the distance between the object to be detected CQ in the peripheral region Gd and the second electrodes 53A and 53B. Consequently, the present modification can increase the detection sensitivity in touch detection in the peripheral region Gd.

Second Embodiment

Figure 23:
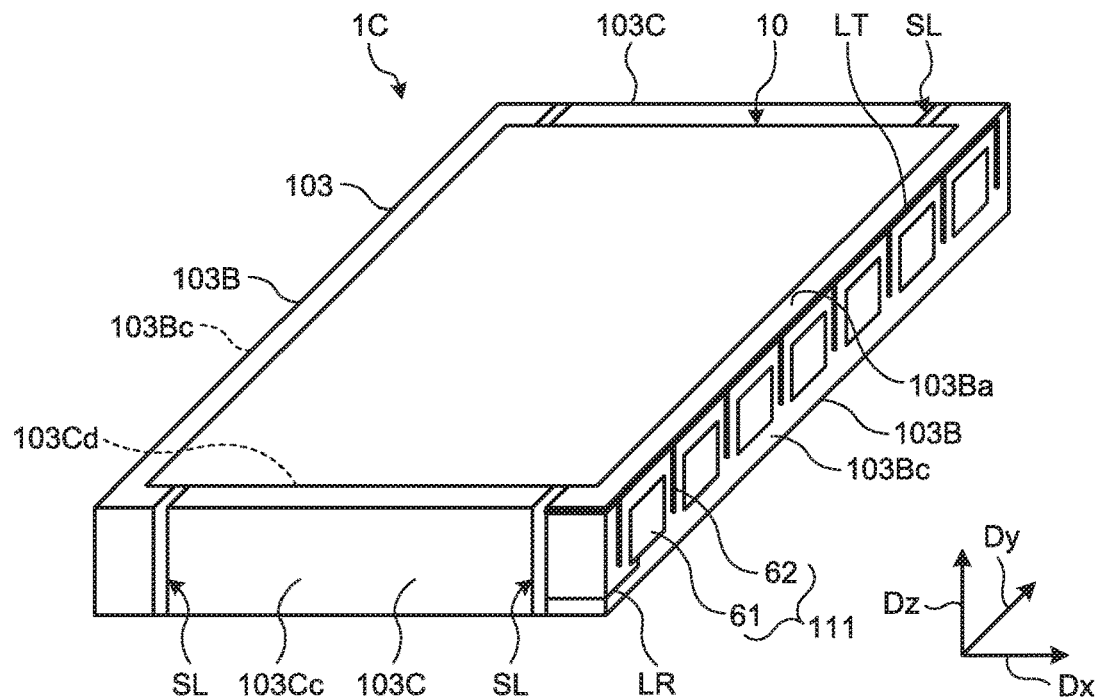
FIG. 23 is a perspective view of the display device according to a second embodiment of the present disclosure.
Figure 24:
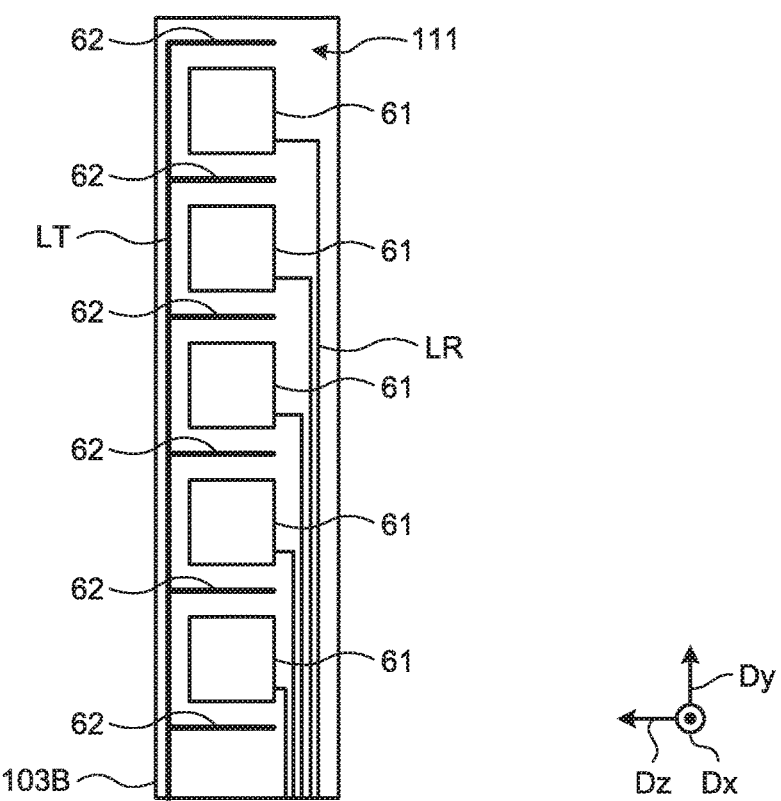
FIG. 24 is a plan view schematically illustrating drive electrodes and detection electrodes according to the second embodiment.

FIG. 23 is a perspective view of the display device according to a second embodiment of the present disclosure. FIG. 24 is a plan view schematically illustrating drive electrodes and detection electrodes according to the second embodiment. As illustrated in FIG. 23, the display panel 10 of a display device 1C according to the present embodiment is fixed in a first housing 103. The first housing 103 has two first walls 103B and two second walls 103C. The two first walls 103B extend in the second direction Dy and face each other in the first direction Dx. The two second walls 103C extend in the first direction Dx and face each other in the second direction Dy. The two first walls 103B and the two second walls 103C are coupled, whereby the first housing 103 has a frame shape in planar view.

The second walls 103C have slits SL. The slit SL causes an outer side surface 103Cc of the second wall 103C to communicate with an inner surface 103Cd opposite to the side surface 103Cc. The slit SL extends in the third direction Dz continuously from the upper surface to the lower surface of the second wall 103C. The structure is not limited thereto, and the slit SL may be formed in part of the second wall 103C in the third direction Dz. The second walls 103C each have two slits SL, that is, four slits SL in total. The structure is not limited thereto, and the second walls 103C may have at least one slit SL. The slit SL may be a slot into which a subscriber identity module (SIM) card is inserted, for example.

The present embodiment includes a sensor 111 on a side surface 103Bc of the first wall 103B. The sensor 111 includes second electrodes 62 and third electrodes 61. As illustrated in FIG. 24, a plurality of second electrodes 62 are arrayed in the second direction Dy. A plurality of third electrodes 61 are each disposed between two second electrodes 62 facing each other in the second direction Dy. In other words, the third electrodes 61 and the second electrodes 62 are alternately arrayed in the second direction Dy. The third electrode 61 has a quadrangular shape. The second electrode 62 has a strip shape the long side of which extends in the third direction Dz. The structure is not limited thereto, and the shapes of the third electrode 61 and the second electrode 62 may be appropriately modified.

A wire LT is coupled to the second electrodes 62. The wire LT extends in the second direction Dy and is coupled to first ends of the respective second electrodes 62. A plurality of wires LR are provided on the opposite side of the wire LT across the third electrodes 61. The wires LR are coupled to the respective third electrodes 61 in a one-to-one correspondence.

As illustrated in FIG. 23, the wire LT and the wires LR extend from the side surface 103Bc of the first wall 103B to the side surface 103Cc of the second wall 103C. The wire LT and the wires LR extend to the inner side of the first housing 103 through the slit SL and are coupled to the display IC 19 (not illustrated in FIG. 23) of the display panel 10. In the configuration according to the present embodiment, the third electrodes 61 and the second electrodes 62 are provided on the side surface 103Bc, and the slit SL is formed in the side surface 103Cc different from the side surface 103Bc. The wire LT and the wires LR are provided continuously on the side surface 103Bc and the side surface 103Cc. With this configuration, the second electrodes 62 and the third electrodes 61 are electrically coupled to the display panel 10 in the first housing 103 through the slit SL.

Capacitance is formed between the second electrodes 62 and the third electrodes 61 disposed side by side. The first driver 14A (refer to FIG. 1) supplies the drive signals Vcom2 to the second electrodes 62 via the wire LT. The third electrodes 61 supply the sensor output signals VsR corresponding to changes in capacitance between the third electrodes 61 and the second electrodes 62 to the voltage detector DET via the respective wires LR. The display device 1C thus can detect the object to be detected CQ in contact with or in proximity to the side surface 103Bc. Because a plurality of third electrodes 61 are arrayed, the display device 1C can detect the position of the object to be detected CQ in the second direction Dy based on the sensor output signals VsR output from the respective third electrodes 61. The display device 1 may assign a function of operations of a camera, for example, to each of the third electrodes 61, thereby using the third electrodes 61 as input buttons. With the sensor 111 provided on the side surface 103Bc, the display device 1C can receive various input operations.

As illustrated in FIG. 23, the wire LT is disposed near the coupling portion between the side surface 103Bc and an upper surface 103Ba of the first wall 103B. With this configuration, capacitance is formed between the wire LT and the detection electrodes TDL. The wire LT may serve as a drive electrode similarly to the second electrode 53A according to the first embodiment. The display device 1C thus can detect the object to be detected CQ in the peripheral region Gd based on changes in capacitance between the wire LT and the detection electrodes TDL.

In FIG. 23, the second electrodes 62 and the third electrodes 61 are provided on one of the two first walls 103B facing each other. The configuration is not limited thereto, and the second electrodes 62 and the third electrodes 61 may be provided on each of the two first walls 103B.

The method for disposing the second electrodes 62 and the third electrodes 61 is not particularly limited. If the first housing 103 is made of a metal, a film sensor including the second electrodes 62 and the third electrodes 61 may be provided similarly to the example illustrated in FIG. 14. In this case, the second electrodes 62 and the third electrodes 61 are provided on the base 55 (refer to FIG. 14) with the protective layer 56 interposed therebetween. The second electrodes 62 and the third electrodes 61 may be provided to the same layer or different layers. A film sensor bonded to the side surface 103Bc can secure insulation of the second electrodes 62 and the third electrodes 61 with respect to the first housing 103.

Alternatively, the second electrodes 62 and the third electrodes 61 may be coated with the protective layer 58 similarly to the example illustrated in FIG. 15. In this case, a groove may be formed on the side surface 103Bc, and the second electrodes 62 and the third electrodes 61 may be embedded in the groove.

First Modification of the Second Embodiment

Figure 25:
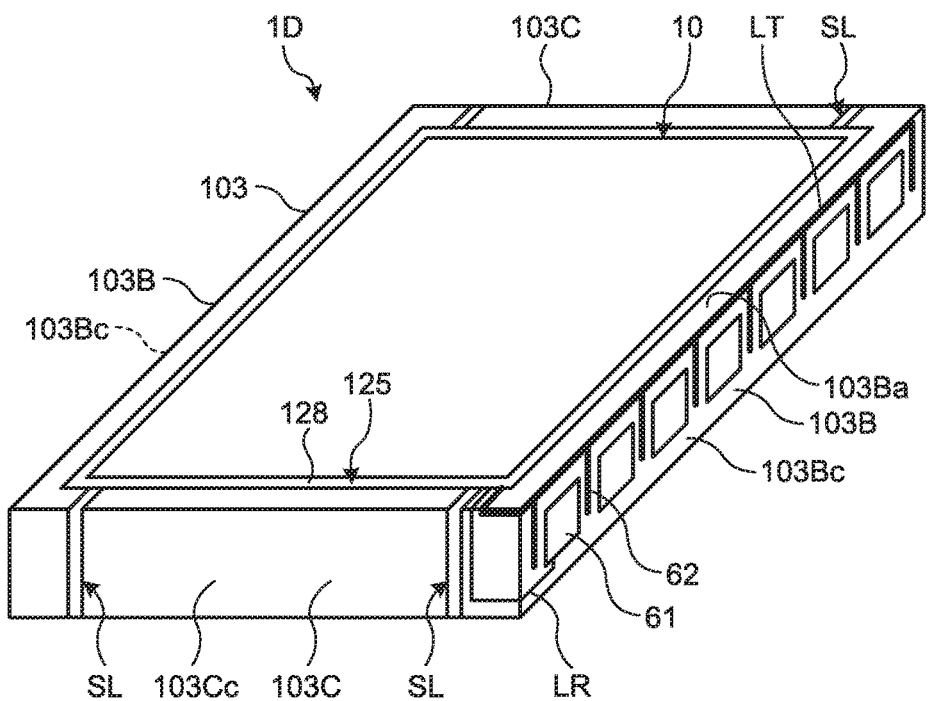
FIG. 25 is a perspective view of the display device according to a first modification of the second embodiment.

FIG. 25 is a perspective view of the display device according to a first modification of the second embodiment. The positions of the second electrodes 62 and the third electrodes 61 and the detection operation performed by them are the same as those in the display device 1C illustrated in FIG. 23.

In the present modification, a gap is formed between the outer periphery of the display panel 10 and the first housing 103. In other words, a gap 125 is formed between the outer periphery of the display panel 10 and the second walls 103C. The gap 125 is also formed between the outer periphery of the display panel 10 and the first walls 103B. The display panel is fixed to the first housing 103 with an adhesive layer 128 in the gap 125 interposed therebetween.

The wire LT and the wires LR extend from the side surface 103Bc of the first wall 103B to the side surface 103Cc of the second wall 103C. The wire LT and the wires LR extend to the inner side of the first housing 103 through the gap 125 and are coupled to the display IC 19 (not illustrated in FIG. 23) of the display panel 10. With this configuration, the second electrodes 62 and the third electrodes 61 are electrically coupled to the display panel 10 in the first housing 103 through the gap 125 between the first housing 103 and the display panel 10. While the gap 125 according to the present modification is formed surrounding the outer periphery of the display panel 10, the structure is not limited thereto. The gap 125 simply needs to be formed along at least one side of the display panel 10.

Second Modification of the Second Embodiment

Figure 26:
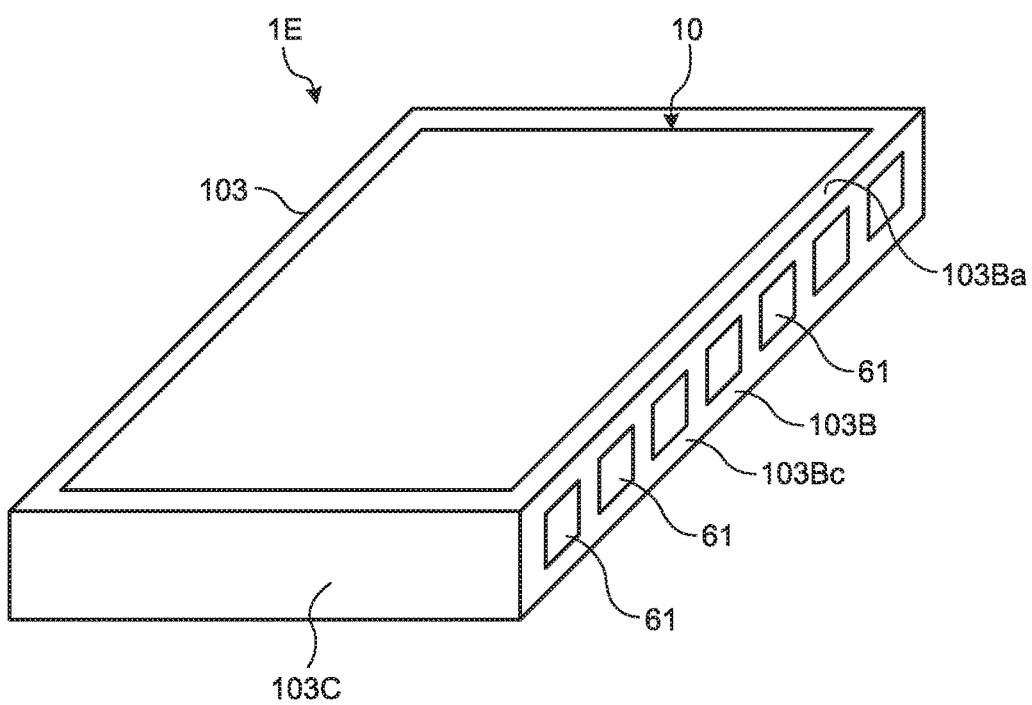
FIG. 26 is a perspective view of the display device according to a second modification of the second embodiment.

FIG. 26 is a perspective view of the display device according to a second modification of the second embodiment. In a display device 1E according to the present modification, a plurality of third electrodes 61 are arrayed on the side surface 103Bc of the first wall 103B. The present modification does not include the second electrodes 62.

The display device 1E can detect the object to be detected CQ in contact with or in proximity to the side surface 103Bc based on capacitance changes in the third electrodes 61. Specifically, the second driver 14B (refer to FIG. 1) supplies the drive signals VcomA to the third electrodes 61. The third electrodes 61 supply the sensor output signals Vs2 corresponding to capacitance changes in the third electrodes 61 to the detector via the respective wires LR (refer to FIG. 24). The display device 1E thus can detect the object to be detected CQ in contact with or in proximity to the side surface 103Bc.

Also in the present modification, the third electrodes 61 may be coupled to the display IC 19 of the display panel 10 through the slit SL similarly to the example illustrated in FIG. 23. Alternatively, the third electrodes 61 may be coupled to the display IC 19 of the display panel 10 through the gap 125 similarly to the example illustrated in FIG. 25.

Third Modification of the Second Embodiment

Figure 27:
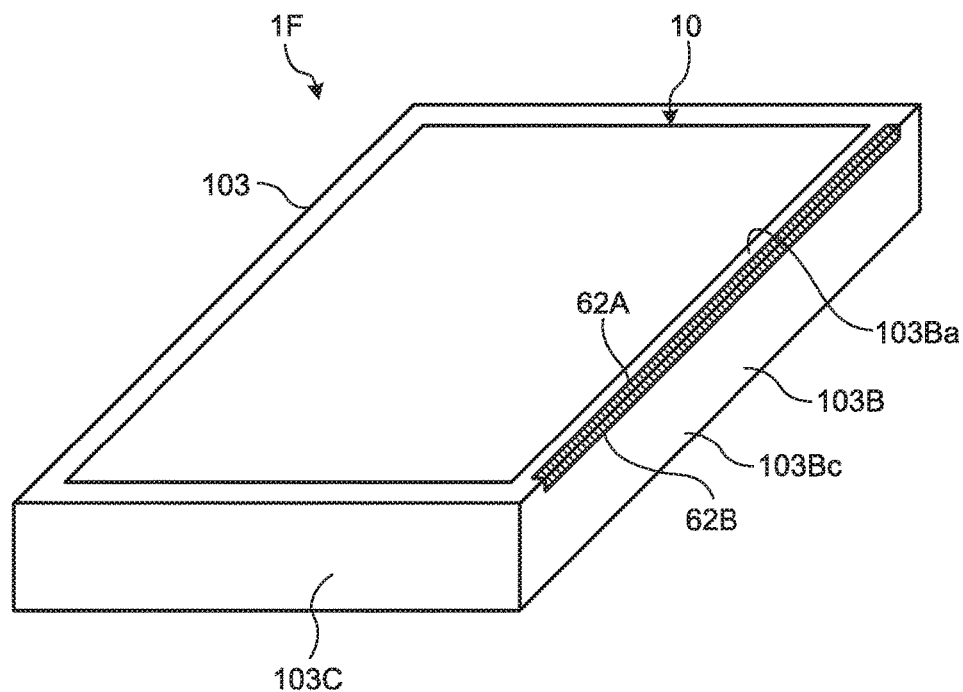
FIG. 27 is a perspective view of the display device according to a third modification of the second embodiment.

FIG. 27 is a perspective view of the display device according to a third modification of the second embodiment. In a display device 1F according to the present modification, a second electrode 62A is provided on the upper surface 103Ba of the first wall 103B, and a second electrode 62B is provided on the side surface 103Bc. The second electrode 62A extends in the longitudinal direction of the upper surface 103Ba. The second electrode 62B extends in the longitudinal direction of the side surface 103Bc. The second electrode 62A and the second electrode 62B are coupled at the coupling portion between the side surface 103Bc and the upper surface 103Ba of the first wall 103B. With this configuration, the second electrodes 62A and 62B are provided continuously on the upper surface 103Ba and the side surface 103Bc to serve as one drive electrode. The present modification does not include the third electrodes 61.

Capacitance is formed between the second electrodes 62A and 62B and the detection electrodes TDL of the display panel 10. The second electrodes 62A and 62B may serve as drive electrodes similarly to the second electrode 53A according to the first embodiment. The display device 1F thus can detect the object to be detected CQ in the peripheral region Gd based on changes in capacitance between the second electrodes 62A and 62B and the detection electrodes TDL.

Also in the present modification, the second electrodes 62A and 62B may be coupled to the display IC 19 of the display panel 10 through the slit SL similarly to the example illustrated in FIG. 23. Alternatively, the second electrodes 62A and 62B may be coupled to the display IC 19 of the display panel 10 through the gap 125 similarly to the example illustrated in FIG. 25.

Fourth Modification of the Second Embodiment

Figure 28:
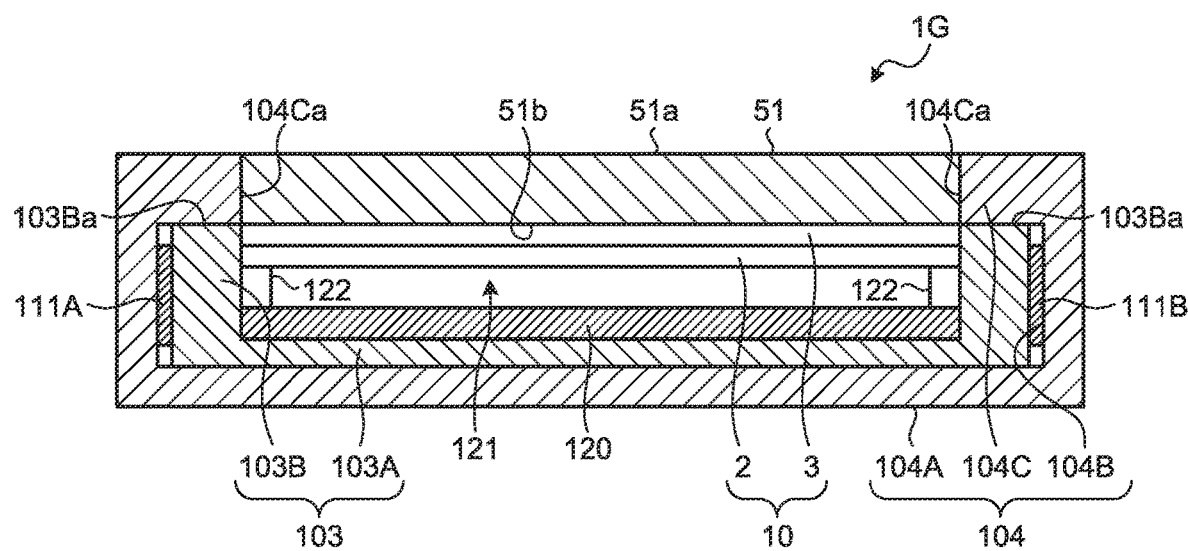
FIG. 28 is a sectional view of a schematic sectional structure of the display device according to a fourth modification of the second embodiment.

FIG. 28 is a sectional view of a schematic sectional structure of the display device according to a fourth modification of the second embodiment. A display device 1G according to the present modification includes a second housing 104 to which the first housing 103 is fixed. As illustrated in FIG. 28, the second housing 104 has a bottom 104A, walls 104B, and protrusions 104C. A bottom 103A of the first housing 103 is fixed on the upper side of the bottom 104A. The walls 104B are provided on the outer periphery of the bottom 104A and on the outer side than the first walls 103B of the first housing 103. The second housing 104 has at least two walls 104B, and the first housing 103 is disposed between the walls 104B. Alternatively, the second housing 104 may have four walls 104B surrounding the first housing 103 in planar view.

The protrusion 104C protrudes from the upper part of the wall 104B toward the inner side of the second housing 104. The protrusion 104C faces the upper surface 103Ba of the first wall 103B. The first wall 103B is disposed between the protrusion 104C and the bottom 104A. The protrusion 104C has an opening 104Ca. The cover substrate 51 is fixed to the opening 104Ca.

With this configuration, the first housing 103, the display panel 10, sensors 111A and 111B, and the cover substrate 51 are fixed in the space surrounded by the bottom 104A, the walls 104B, and the protrusions 104C. The first housing 103 is made of a metal, and the second housing 104 is made of a resin, for example.

In the display device 1G according to the present modification, the sensors 111A and 111B are provided between the first walls 103B of the first housing 103 and the walls 104B of the second housing 104. Consequently, the sensors 111A and 111B have higher corrosion resistance and abrasion resistance. The sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26. With this configuration, the display device 1G can detect the object to be detected CQ in contact with or in proximity to the side surface.

Fifth Modification of the Second Embodiment

Figure 29:
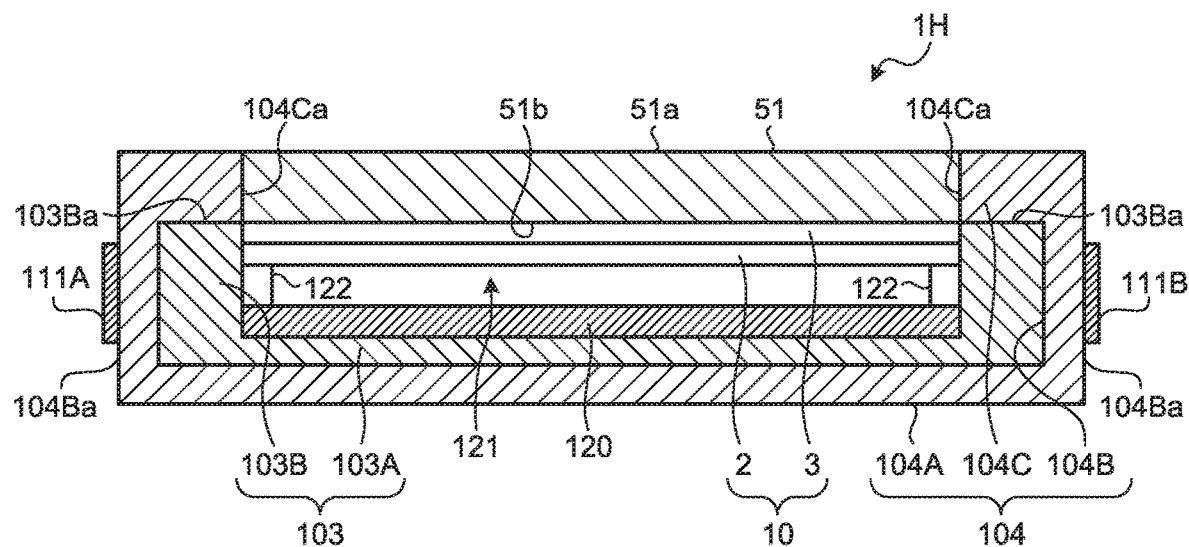
FIG. 29 is a sectional view of a schematic sectional structure of the display device according to a fifth modification of the second embodiment.

FIG. 29 is a sectional view of a schematic sectional structure of the display device according to a fifth modification of the second embodiment. A display device 1H according to the present modification includes the first housing 103 and the second housing 104 similarly to the display device 1G illustrated in FIG. 28. The sensors 111A and 111B are provided on side surfaces 104Ba of the walls 104B of the second housing 104. The side surfaces 104Ba of the walls 104B are the outermost surfaces of the display device 1H. A hand and a finger of an operator come into contact with the side surfaces 104Ba. This configuration reduces the distance between the sensors 111A and 111B and the object to be detected CQ, thereby increasing the detection sensitivity in touch detection on the side surfaces 104Ba.

In the present modification, the sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26.

Sixth Modification of the Second Embodiment

Figure 30:
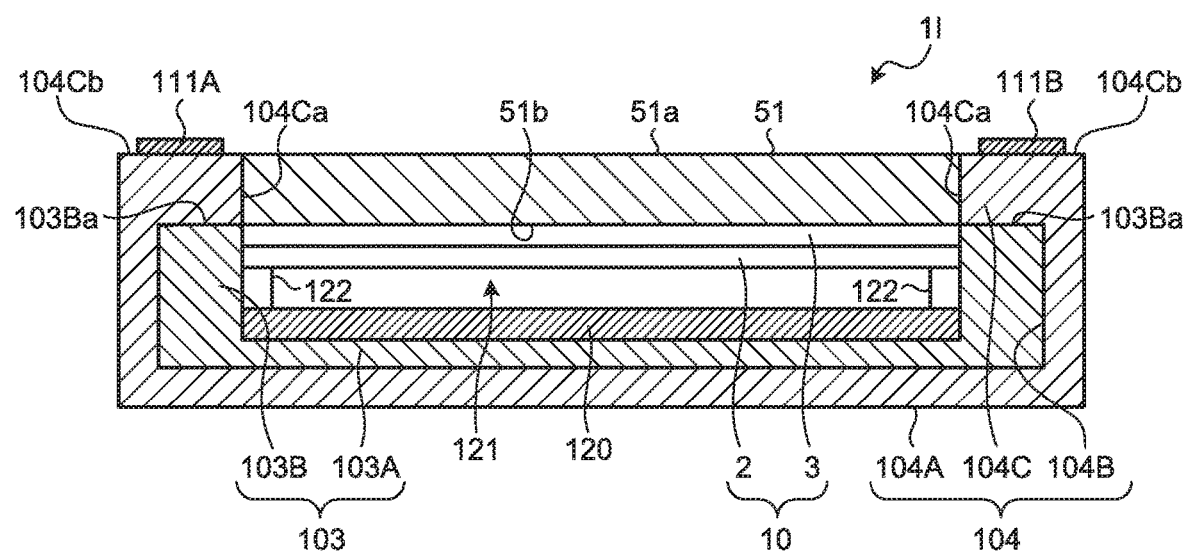
FIG. 30 is a sectional view of a schematic sectional structure of the display device according to a sixth modification of the second embodiment.

FIG. 30 is a sectional view of a schematic sectional structure of the display device according to a sixth modification of the second embodiment. A display device 1I according to the present modification includes the first housing 103 and the second housing 104 similarly to the display devices 1G and 1H illustrated in FIGS. 28 and 29. The sensors 111A and 111B are provided on upper surfaces 104Cb of the protrusions 104C of the second housing 104. The sensors 111A and 111B are provided on the outer side than the opening 104Ca of the protrusions 104C, that is, on the outer side than the cover substrate 51 in planar view.

In the present modification, the sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26. Still alternatively, the sensors 111A and 111B may include the second electrodes 53A and 53B (refer to FIG. 12) according to the first embodiment. With this configuration, the display device 1I can satisfactorily detect the object to be detected CQ in contact with or in proximity to the peripheral region Gd if the first housing 103 is made of a metal, for example. The cover substrate 51 according to the present modification has a narrower frame.

Seventh Modification of the Second Embodiment

Figure 31:
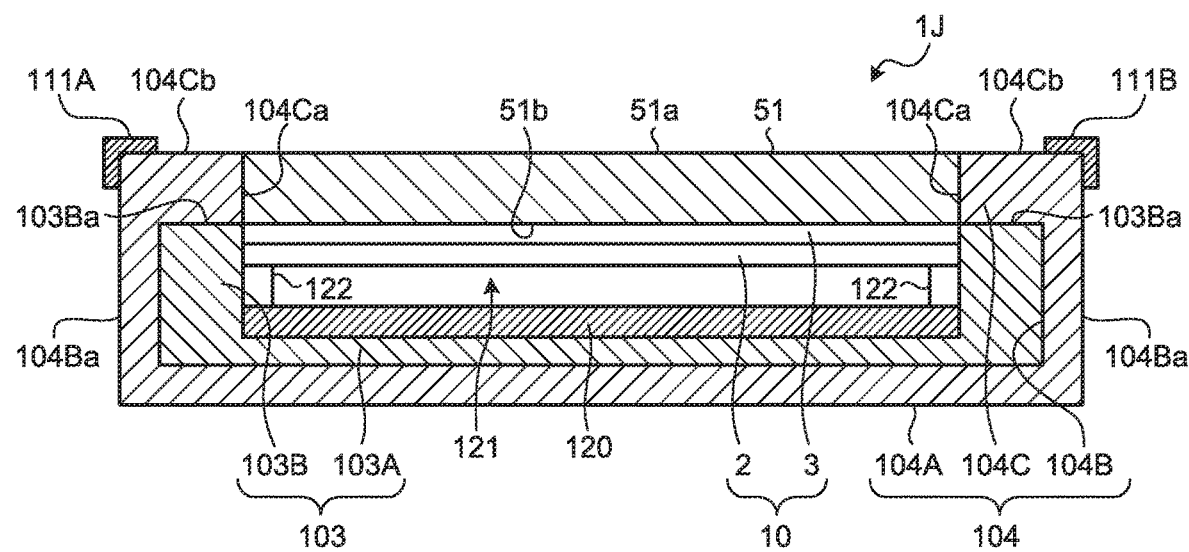
FIG. 31 is a sectional view of a schematic sectional structure of the display device according to a seventh modification of the second embodiment.

FIG. 31 is a sectional view of a schematic sectional structure of the display device according to a seventh modification of the second embodiment. A display device 1J according to the present modification includes the first housing 103 and the second housing 104 similarly to the display devices 1G to 1I illustrated in FIGS. 28 to 30. The sensors 111A and 111B are provided to the coupling portions between the upper surfaces 104Cb and the side surfaces 104Ba. In other words, the sensors 111A and 111B are provided continuously on both of the upper surfaces 104Cb and the side surfaces 104Ba.

In the present modification, the sensors 111A and 111B may include the second electrodes 62A and 62B illustrated in FIG. 27. With this configuration, the display device 1J can detect the object to be detected CQ in contact with or in proximity to the upper surfaces 104Cb and the object to be detected CQ in contact with or in proximity to the side surfaces 104Ba. The display device 1J can expand the detection range on the outer side than the side surfaces 104Ba compared with the display device 1I illustrated in FIG. 30.

Eighth Modification of the Second Embodiment

Figure 32:
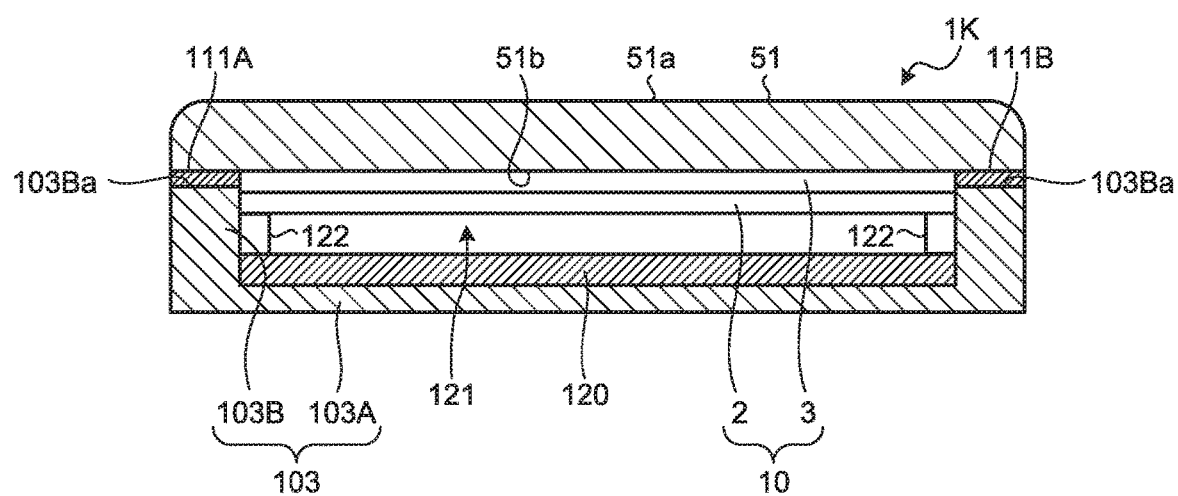
FIG. 32 is a sectional view of a schematic sectional structure of the display device according to an eighth modification of the second embodiment.

FIG. 32 is a sectional view of a schematic sectional structure of the display device according to an eighth modification of the second embodiment. A display device 1K according to the present modification includes the first housing 103 but does not include the second housing 104. The sensors 111A and 111B are provided on the upper surfaces 103Ba of the first walls 103B of the first housing 103. The cover substrate 51 is disposed facing the display panel and the first walls 103B. The sensors 111A and 111B are disposed between the cover substrate 51 and the first walls 103B. More specifically, the sensors 111A and 111B are disposed between the second surface 51b of the cover substrate 51 and the upper surfaces 103Ba of the first walls 103B. Consequently, the sensors 111A and 111B have higher corrosion resistance and abrasion resistance.

In the present modification, the sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26. Still alternatively, the sensors 111A and 111B may include the second electrodes 53A and 53B (refer to FIG. 12) according to the first embodiment. With this configuration, the display device 1K can satisfactorily detect the object to be detected CQ in the peripheral region Gd. Consequently, the display device 1K according to the present modification has a smaller size and a narrower frame than those of the display devices 1G to 1J illustrated in FIGS. 28 to 31.

Ninth Modification of the Second Embodiment

Figure 33:
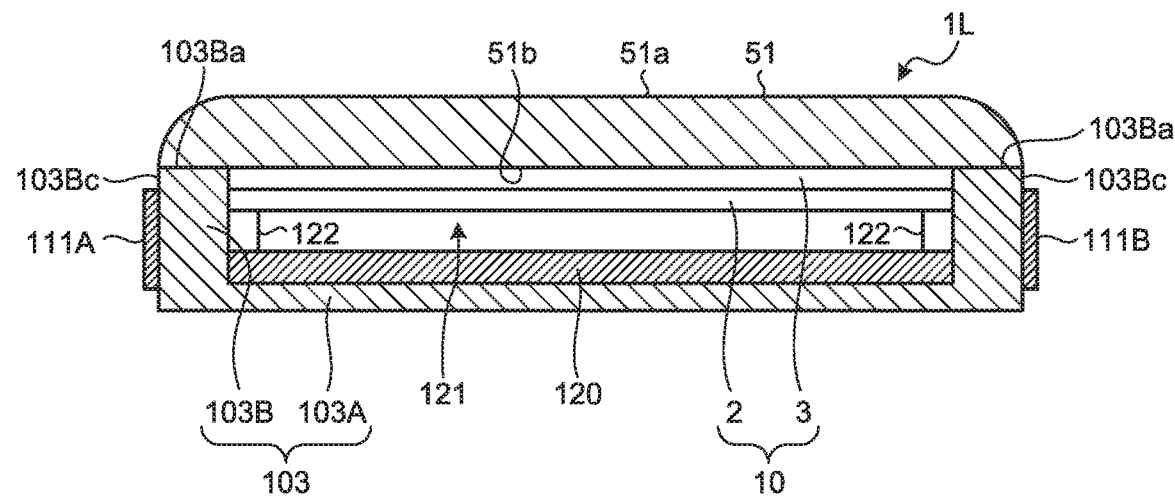
FIG. 33 is a sectional view of a schematic sectional structure of the display device according to a ninth modification of the second embodiment.

FIG. 33 is a sectional view of a schematic sectional structure of the display device according to a ninth modification of the second embodiment. A display device 1L according to the present modification includes the first housing 103 but does not include the second housing 104 similarly to the example illustrated in FIG. 32. The sensors 111A and 111B are provided on the side surfaces 103Bc of the first walls 103B. The cover substrate 51 is disposed facing the display panel 10 and the first walls 103B. In the example illustrated in FIG. 33, the sensors 111A and 111B are disposed on the outer side than the cover substrate 51 in planar view. The side surfaces 103Bc are the outermost surfaces of the display device 1L. A hand and a finger of an operator come into contact with the side surfaces 103Bc.

In the present modification, the sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26. This configuration reduces the distance between the sensors 111A and 111B and the object to be detected CQ, thereby increasing the detection sensitivity in touch detection on the side surfaces 103Bc.

Tenth Modification of the Second Embodiment

Figure 34:
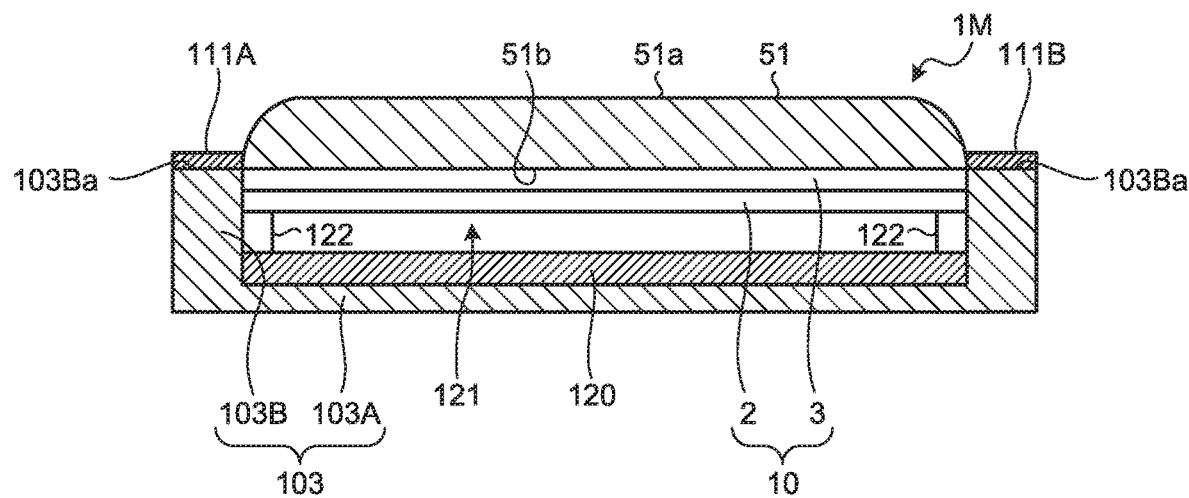
FIG. 34 is a sectional view of a schematic sectional structure of the display device according to a tenth modification of the second embodiment.

FIG. 34 is a sectional view of a schematic sectional structure of the display device according to a tenth modification of the second embodiment. A display device 1M according to the present modification includes the first housing 103 but does not include the second housing 104. The sensors 111A and 111B are provided on the upper surfaces 103Ba of the first walls 103B of the first housing 103. The cover substrate 51 has substantially the same width as that of the display panel 10 and is not provided at positions overlapping the upper surfaces 103Ba of the first walls 103B. In other words, the sensors 111A and 111B are disposed on the outer side than the cover substrate 51 in planar view.

In the present modification, the sensors 111A and 111B may include the second electrodes 62 and the third electrodes 61 similarly to the sensor 111 illustrated in FIG. 24. Alternatively, the sensors 111A and 111B may include a plurality of third electrodes 61 similarly to the example illustrated in FIG. 26. Still alternatively, the sensors 111A and 111B may include the second electrodes 53A and 53B (refer to FIG. 12) according to the first embodiment. With this configuration, the display device 1M can satisfactorily detect the object to be detected CQ in the peripheral region Gd. In the display device 1M, the cover substrate 51 is not provided on the sensors 111A and 111B. This configuration reduces the distance between the sensors 111A and 111B and the object to be detected CQ, thereby increasing the detection sensitivity in touch detection in the peripheral region Gd. The cover substrate 51 of the display device 1M according to the present modification has a smaller size and a narrower frame than the cover substrate 51 of the display device 1L illustrated in FIG. 33.

Third Embodiment

Figure 35:
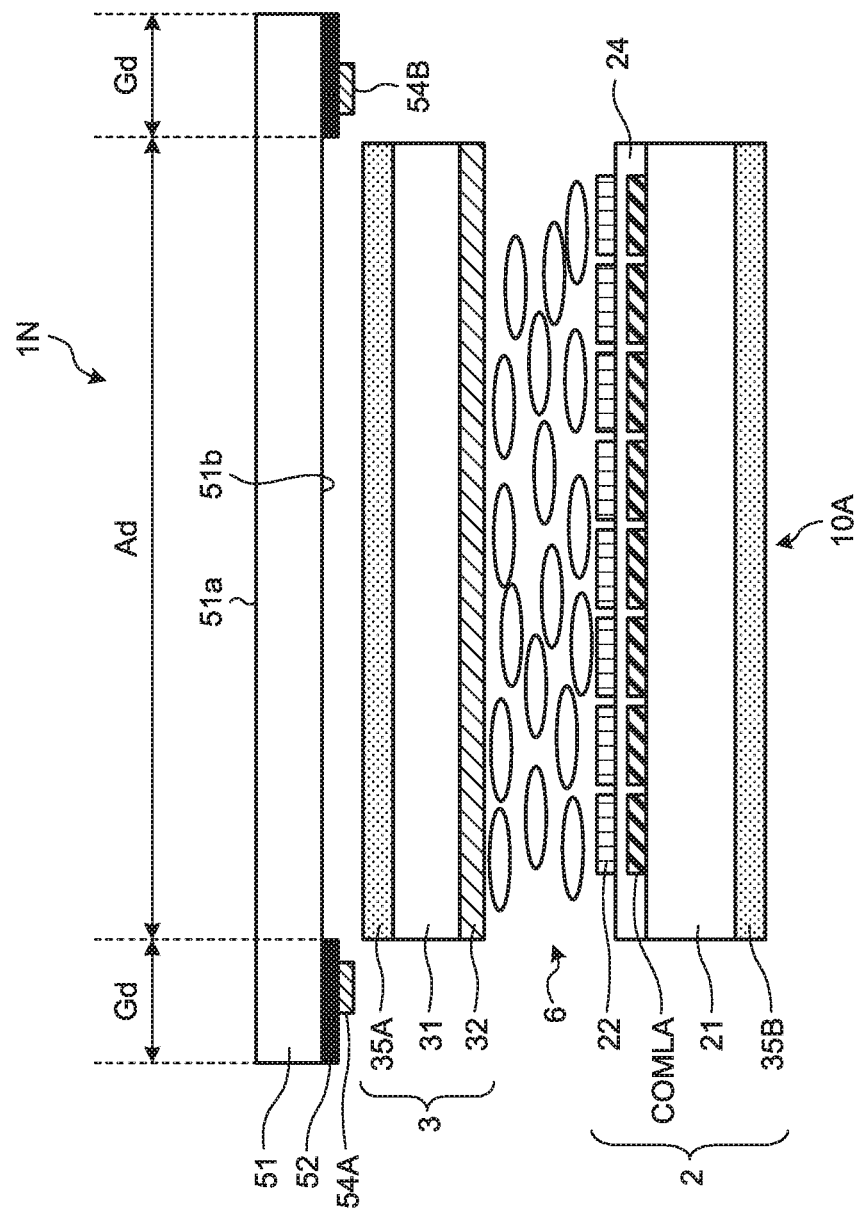
FIG. 35 is a sectional view of a schematic sectional structure of the display device according to a third embodiment of the present disclosure.

FIG. 35 is a sectional view of a schematic sectional structure of the display device according to a third embodiment of the present disclosure. FIG. 36 is a plan view schematically illustrating the display device according to the third embodiment. The same components as those described in the first and the second embodiments are denoted by like reference numerals, and repetitive explanation thereof is omitted.

As illustrated in FIG. 35, in a display device 1N according to the present embodiment, the pixel substrate 2 includes the first substrate 21, the pixel electrodes 22, first electrodes COMLA, and the polarizing plate 35B. The counter substrate 3 includes the second substrate 31, the color filter 32, and the polarizing plate 35A. The color filter 32 is provided on one surface of the second substrate 31. The polarizing plate 35A is provided on the other surface of the second substrate 31. In other words, the second substrate 31 according to the present embodiment does not include the detection electrodes TDL (refer to FIG. 9).

The peripheral region Gd of the cover substrate 51 is provided with a colored layer 52 and second electrodes 54A and 54B. The colored layer 52 is made of a resin material or a metal material colored to suppress transmission of light, for example. The second electrodes 54A and 54B are provided under the colored layer 52. The second electrodes 54A and 54B serve as drive electrodes in touch detection in the peripheral region Gd. The second electrodes 54A and 54B may be provided on the upper surfaces 101Ba of the walls 101B, which are not illustrated in FIG. 35, and disposed between the walls 101B and the cover substrate 51 similarly to the example illustrated in FIG. 11.

As illustrated in FIG. 36, a plurality of first electrodes COMLA are disposed in a matrix (row-column configuration) in the display region Ad of the first substrate 21. In other words, the first electrodes COMLA are arrayed in the first direction Dx and the second direction Dy. While part of the first electrodes COMLA are not illustrated in FIG. 36, the first electrodes COMLA are arrayed in the whole display region Ad. The first electrodes COMLA are electrically coupled to the display IC 19 and the detection IC 18 via respective wires 27 (refer to FIG. 40).

The second electrodes 54A and 54B are disposed on the outer side than the display region Ad in planar view. Specifically, the second electrode 54A is disposed on one of the sides of the peripheral region Gd facing each other in the first direction Dx, and the second electrode 54B is disposed on the other thereof. The second electrodes 54A and 54B extend in the second direction Dy and are disposed facing each other in the first direction Dx. The first electrodes COMLA are arrayed between the second electrodes 54A and 54B in planar view. In other words, the second electrodes 54A and 54B are provided not overlapping the first electrodes COMLA. The position and the number of the second electrodes 54A and 54B may be appropriately modified. The second electrodes 54A and 54B simply need to be provided outside the display region Ad along at least one side of the display region Ad in planar view.

Figure 37:
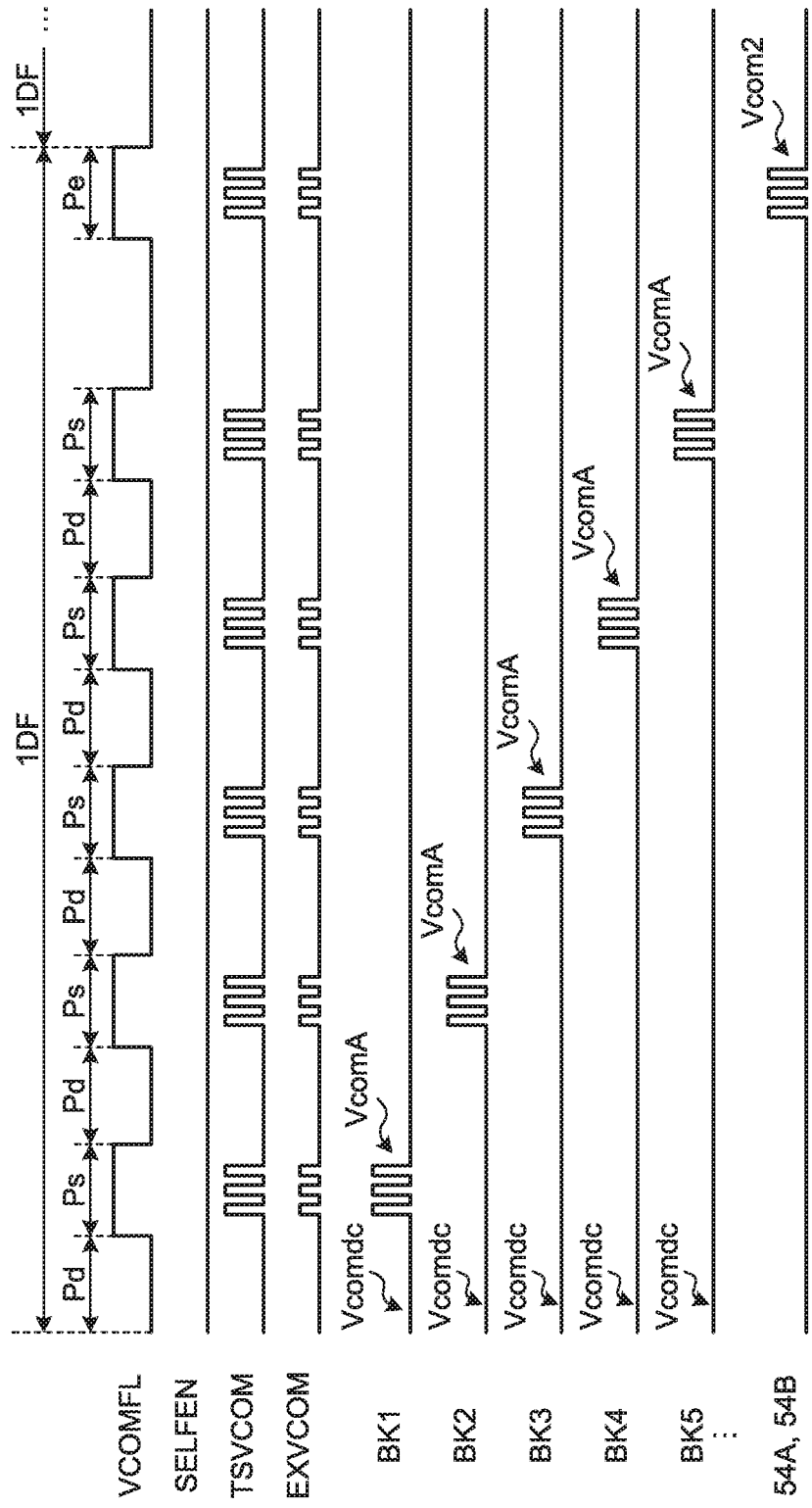
FIG. 37 is a timing waveform chart of an exemplary operation performed by the display device according to the third embodiment.
Figure 38:
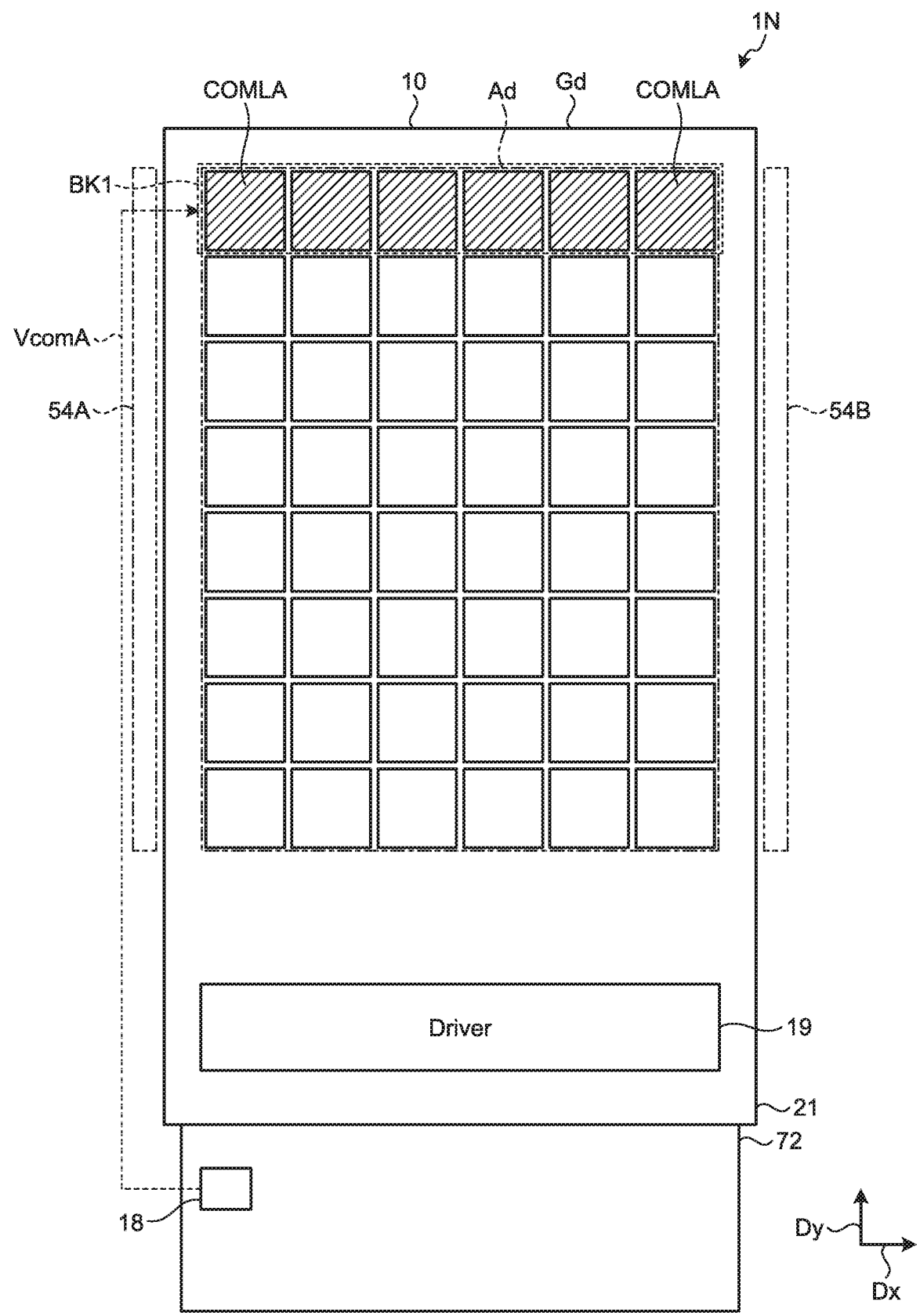
FIG. 38 is a diagram for explaining an exemplary operation in touch detection in a third detection mode performed by the display device according to the third embodiment.
Figure 39:
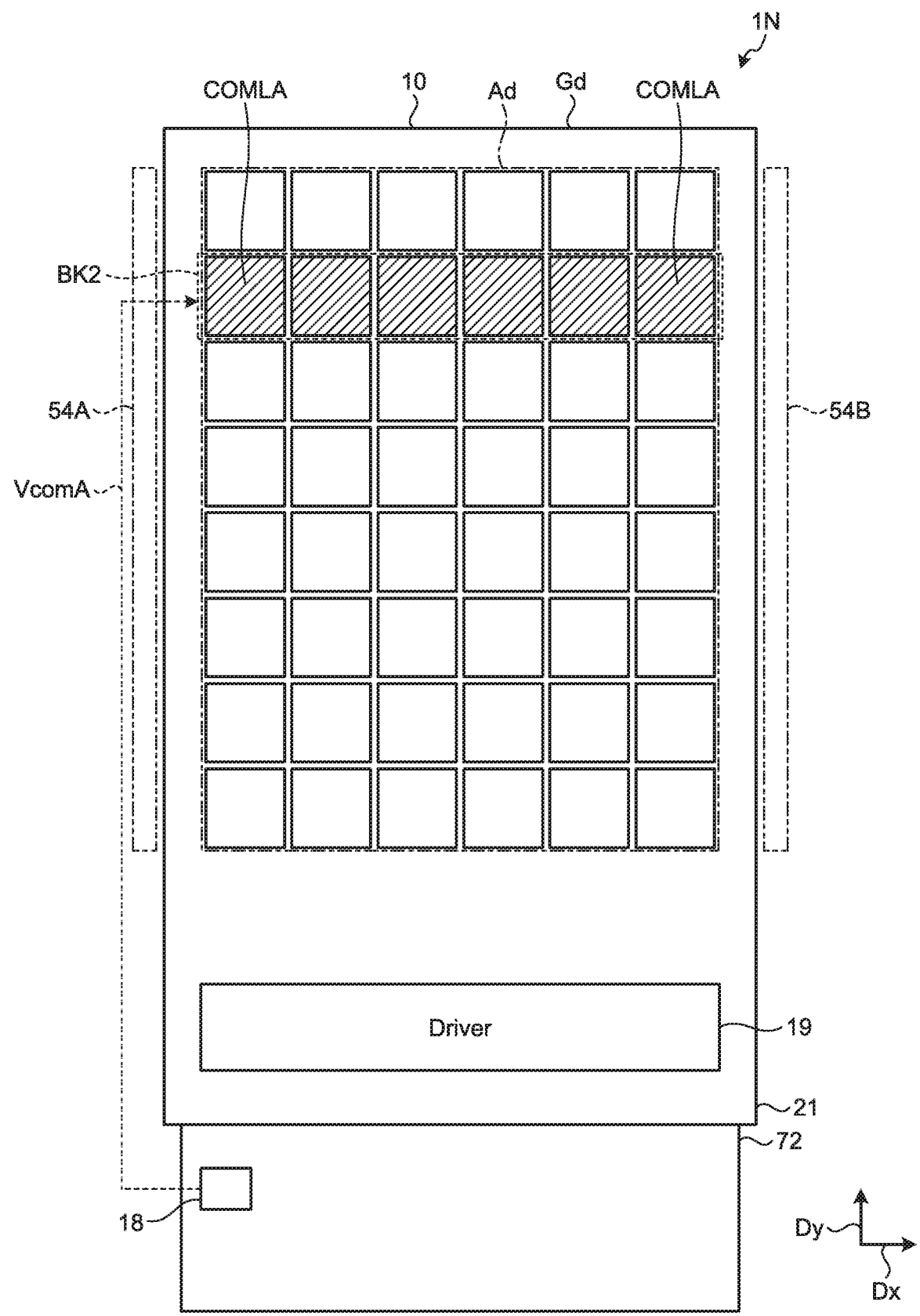
FIG. 39 is a diagram for explaining an exemplary operation in touch detection in the third detection mode performed by the display device according to the third embodiment.
Figure 40:
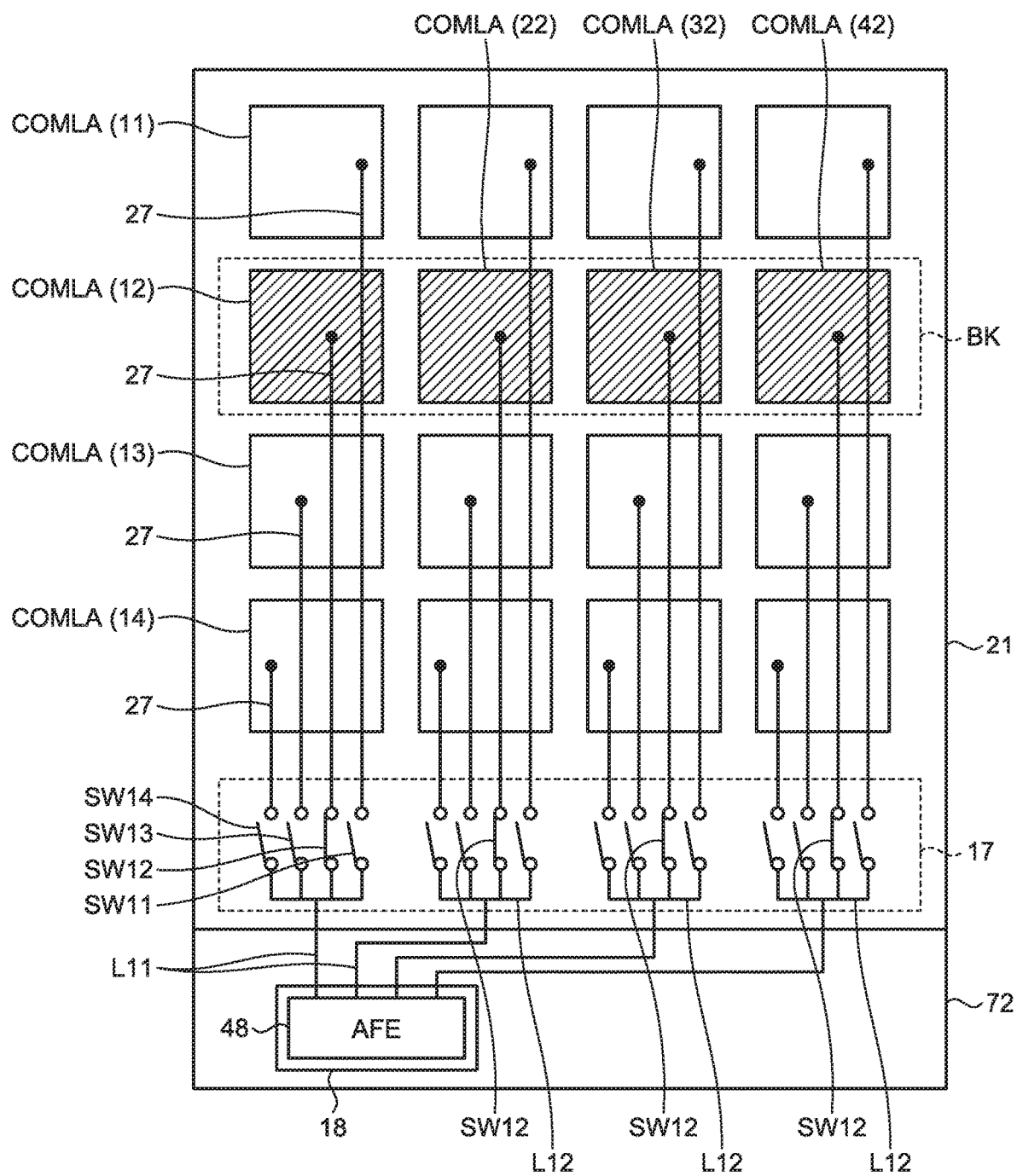
FIG. 40 is a circuit diagram of an example of a coupling circuit according to the third embodiment.
Figure 41:
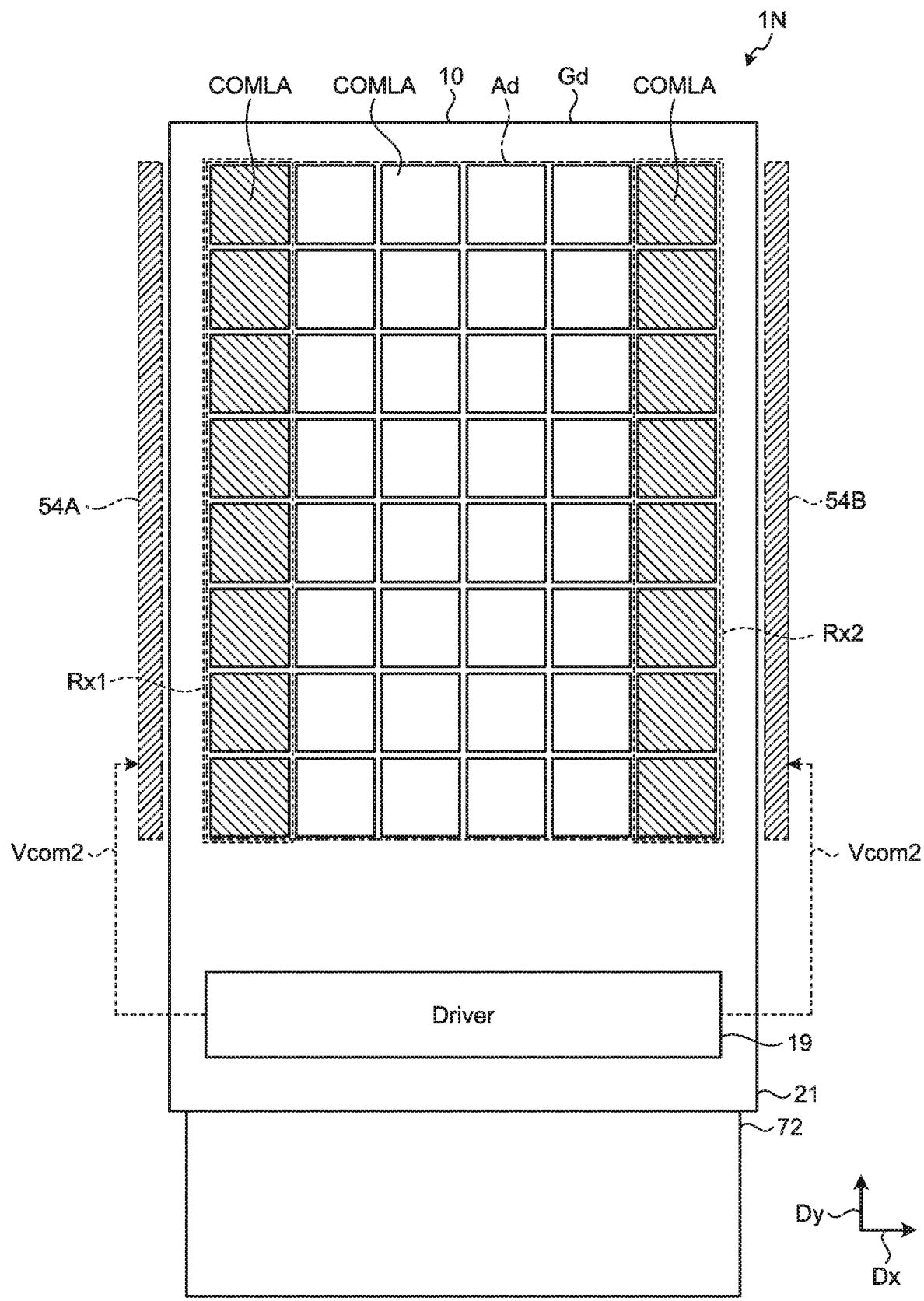
FIG. 41 is a diagram for explaining an exemplary operation in touch detection in the second detection mode performed by the display device according to the third embodiment.

The following describes an operation performed by the display device 1N with reference to FIGS. 37 to 41. FIG. 37 is a timing waveform chart of an exemplary operation performed by the display device according to the third embodiment. FIG. 38 is a diagram for explaining an exemplary operation in touch detection in the third detection mode performed by the display device according to the third embodiment. FIG. 39 is a diagram for explaining an exemplary operation in touch detection in the third detection mode performed by the display device according to the third embodiment. FIG. 40 is a circuit diagram of an example of a coupling circuit according to the third embodiment. FIG. 41 is a diagram for explaining an exemplary operation in touch detection in the second detection mode performed by the display device according to the third embodiment. The second electrodes 54A and 54B are indicated by the alternate long and two short dashes lines in FIGS. 38, 39, and 41.

As illustrated in FIG. 37, a plurality of display periods Pd and a plurality of detection periods Ps are alternately arranged. One detection period Pe is arranged in one frame period 1DF. Alternatively, a plurality of detection periods Pe may be arranged in one frame period 1DF. The display periods Pd and the detection periods Ps and Pe are switched based on the control signals VCOMFL and SELFEN supplied from the controller 11 (refer to FIG. 1).

As illustrated in FIG. 37, in the display periods Pd, the first driver 14A (refer to FIG. 1) supplies the drive signals Vcomdc serving as a common electrode for display drive to first electrode blocks BK1, BK2, . . . , BK5, . . . each including a plurality of first electrodes COMLA in the display region Ad.

In the detection periods Ps, the display device 1N performs touch detection in the third detection mode. In other words, the display device 1N detects an object to be detected in the display region Ad by the self-capacitance method. Specifically, the second driver 14B (refer to FIG. 1) sequentially supplies the drive signals VcomA to the first electrode blocks BK1, BK2, . . . , BK5, . . . each including a plurality of first electrodes COMLA.

As illustrated in FIG. 38, in one detection period Ps, the detection IC 18 selects the first electrode block BK1. The first electrode block BK1 includes a plurality of first electrodes COMLA arrayed in the first direction Dx. The second driver 14B supplies the drive signals VcomA simultaneously to the first electrodes COMLA included in the first electrode block BK1. The first electrodes COMLA included in the first electrode block BK1 output the sensor output signals corresponding to respective self-capacitance changes in the first electrodes COMLA to an analog front end (AFE) 48 (refer to FIG. 40). The display device 1N thus performs touch detection on a portion of the display region Ad overlapping the first electrode block BK1.

In the next detection period Ps, as illustrated in FIG. 39, the detection IC 18 selects the first electrode block BK2. The first electrode block BK2 includes a plurality of first electrodes COMLA arrayed in the first direction Dx and is disposed side by side with the first electrode block BK1 in the second direction Dy. Similarly to the example illustrated in FIG. 38, the second driver 14B supplies the drive signals VcomA simultaneously to the first electrodes COMLA included in the first electrode block BK2. The first electrodes COMLA included in the first electrode block BK2 output the sensor output signals corresponding to respective self-capacitance changes in the first electrodes COMLA to the AFE 48 (refer to FIG. 40). The display device 1N thus performs touch detection on a portion of the display region Ad overlapping the first electrode block BK2.

The second driver 14B sequentially scans the first electrode blocks BK in the respective detection periods Ps. The display device 1N thus performs touch detection on one detection screen. The second driver 14B may supply guard signals to the non-selected first electrode blocks BK. The guard signal is a voltage signal synchronized with the drive signal VcomA and having the same electric potential as that of the drive signal VcomA. As a result, the selected first electrode block BK and the non-selected first electrode blocks BK are driven at the same electric potential. This mechanism can suppress stray capacitance in the first electrode blocks BK.

The second driver 14B may select the first electrodes COMLA of two or more lines as the first electrode block BK in one detection period Ps. The number of simultaneously driven electrodes may be appropriately modified depending on the number of channels of the AFE 48.

As illustrated in FIG. 40, the first electrodes COMLA are coupled to the AFE 48 via the respective wires 27 and a coupling circuit 17. The AFE 48 includes the detection signal amplifier 42 and the A/D converter 43 illustrated in FIG. 1. The AFE 48 is an analog signal processing circuit that convers the detection signals Vdet1 and Vdet2 into digital signals and outputs them to the signal processor 44. In the example illustrated in FIG. 40, the wires 27 are coupled to the respective first electrodes COMLA in a one-to-one correspondence. The wires 27 extend in the second direction Dy and are arrayed in the first direction Dx with a space interposed therebetween. FIG. 40 does not illustrate the second electrodes 54A and 54B, the display IC 19, or other components.

As illustrated in FIG. 40, for example, first electrodes COMLA(11), COMLA(12), COMLA(13), and COMLA (14) are arrayed in the second direction Dy. The first electrodes COMLA(11), COMLA(12), COMLA(13), and COMLA(14) are disposed closer to the AFE 48 in this order.

First electrodes COMLA(12), COMLA(22), COMLA(32), and COMLA(42) are arrayed in the first direction Dx. In the following description, the first electrodes COMLA(11), COMLA(12), COMLA(13), COMLA(14), COMLA(22), COMLA(32), and COMLA(42) are referred to as the first electrodes COMLA when they need not be distinguished from one another.

The coupling circuit 17 is a multiplexer, for example, and can switch coupling and decoupling between the first electrodes COMLA and the AFE 48. The coupling circuit 17 includes switches SW11, SW12, SW13, and SW14 and wires L12. The switches SW11, SW12, SW13, and SW14 are provided corresponding to the first electrodes COMLA (11), COMLA(12), COMLA(13), and COMLA(14), respectively, arrayed in the second direction Dy. The switches SW11, SW12, SW13, and SW14 are coupled to one wire L11 via the common wire L12. The sets of the switches SW11, SW12, SW13, and SW14 and the wire L12 are provided corresponding to the respective first electrodes COMLA arrayed in the first direction Dx.

The operations of the switches SW11, SW12, SW13, and SW14 are controlled based on the control signals supplied from the detection IC 18. In the example illustrated in FIG. 40, the switches SW12 are turned on, and the switches SW11, SW13, and SW14 are turned off. The first electrodes COMLA(12), COMLA(22), COMLA(32), and COMLA (42) arrayed in the first direction Dx are coupled to the AFE 48 via the respective wires L11. As a result, one first electrode block BK is selected. The switches SW11 to SW14 operate based on the control signals supplied from the detection IC 18, thereby sequentially selecting the first electrode block BK.

With the coupling circuit 17, the number of wires L11 coupled to the AFE 48 is equal to the number of first electrodes COMLA included in one first electrode block BK. In other words, this configuration requires a smaller number of wires L11 than the number of wires 27 coupled to the respective first electrodes COMLA. The configuration of the coupling circuit 17 illustrated in FIG. 40 is given by way of example only, and the configuration is not limited thereto. The coupling circuit 17, for example, may simultaneously select a plurality of first electrodes COMLA arrayed in the second direction Dy.

In the detection period Pe illustrated in FIG. 37, the display device 1N performs touch detection in the second detection mode. In other words, the display device 1N performs touch detection on the peripheral region Gd based on changes in capacitance between the second electrodes 54A and 54B and the first electrodes COMLA by the mutual capacitance method.

Specifically, as illustrated in FIG. 41, the first driver 14A (refer to FIG. 1) included in the display IC 19 supplies the drive signals Vcom2 to the second electrodes 54A and 54B. The controller 11 (refer to FIG. 1) selects a plurality of first electrodes COMLA disposed side by side with the second electrode 54A out of the first electrodes COMLA as a detection target. The first electrodes COMLA disposed side by side with the second electrode 54A and arrayed in the second direction Dy are referred to as a first detection electrode block Rx1. In other words, the first electrodes COMLA in the first detection electrode block Rx1 are disposed side by side with the second electrode 54A and arrayed in the longitudinal direction of the second electrode 54A.

The controller 11 (refer to FIG. 1) selects a plurality of first electrodes COMLA disposed side by side with the second electrode 54B out of the first electrodes COMLA as a detection target. The first electrodes COMLA disposed side by side with the second electrode 54B and arrayed in the second direction Dy are referred to as a second detection electrode block Rx2. In other words, the first electrodes COMLA in the second detection electrode block Rx2 are disposed side by side with the second electrode 54B and arrayed in the longitudinal direction of the second electrode 54B.

When the drive signals Vcom2 are supplied to the second electrodes 54A and 54B, the first electrodes COMLA in the first detection electrode block Rx1 output, to the AFE 48 (refer to FIG. 40), the sensor output signals corresponding to changes in capacitance between the first electrodes COMLA and the second electrode 54A. Simultaneously, the first electrodes COMLA in the second detection electrode block Rx2 output, to the AFE 48, the sensor output signals corresponding to changes in capacitance between the first electrodes COMLA and the second electrode 54B. As described above, the first electrodes COMLA in the first detection electrode block Rx1 and the second detection electrode block Rx2 serve as detection electrodes. If the second electrodes 54A and 54B have a long shape, the display device 1N can detect the position of an object to be detected in an area along one side of the peripheral region Gd. As described above, the display device 1N can perform touch detection on the peripheral region Gd provided with the second electrode 54A and the peripheral region Gd provided with the second electrode 54B by the mutual capacitance method.

The number of first electrodes COMLA included in the first detection electrode block Rx1 and the second detection electrode block Rx2 is determined depending on the number of channels of the AFE 48. In the example illustrated in FIG. 41, 16 first electrodes COMLA are simultaneously coupled to the AFE 48 in one detection period. The number of first electrodes COMLA is not limited thereto, and 15 or less or 17 or more first electrodes COMLA may be coupled to the AFE 48. The first detection electrode block Rx1 and the second detection electrode block Rx2 do not necessarily include part of the first electrodes COMLA arrayed in the second direction Dy. While the first detection electrode block Rx1 and the second detection electrode block Rx2 include the first electrodes COMLA positioned closest to the outer periphery of the display region Ad, the configuration is not limited thereto. The first detection electrode block Rx1 and the second detection electrode block Rx2 may include the first electrodes COMLA disposed on the inner side of the display region Ad. The first driver 14A may supply the drive signals Vcom2 to the second electrodes 54A and 54B in respective different periods.

First Modification of the Third Embodiment

Figure 42:
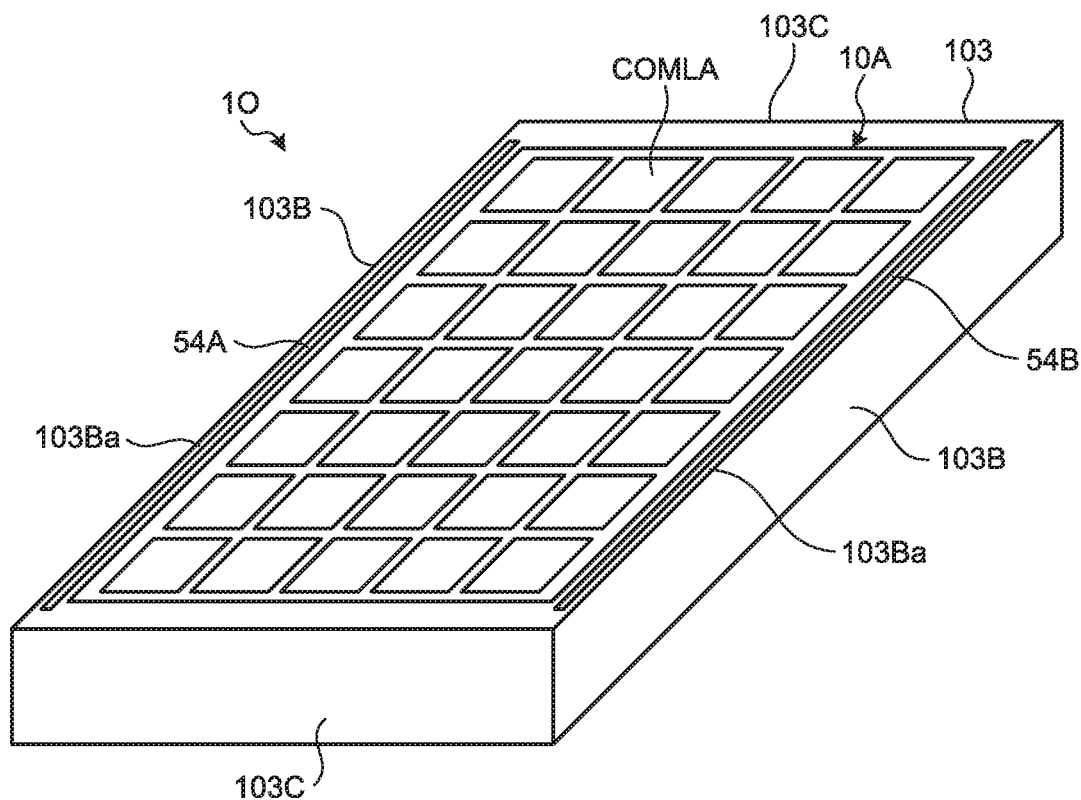
FIG. 42 is a perspective view of the display device according to a first modification of the third embodiment.

FIG. 42 is a perspective view of the display device according to a first modification of the third embodiment. As illustrated in FIG. 42, a display device 1O according to the present modification includes a display panel 10A and the first housing 103. The display panel 10A is fixed in the first housing 103. The first housing 103 is the same as that illustrated in FIG. 23 and other figures and has two first walls 103B and two second walls 103C.

The second electrodes 54A and 54B are provided on the upper surfaces 103Ba of the first walls 103B. The second electrodes 54A and 54B may be coupled to the display panel 10A in the same manner as that in the configurations according to the embodiments and the modifications described above. Similarly to the display device 1C illustrated in FIG. 23, for example, the second electrodes 54A and 54B can be coupled to the display panel 10A through the slits SL formed in the second walls 103C. Alternatively, similarly to a display device 1D illustrated in FIG. 25, the second electrodes 54A and 54B can be coupled to the display panel 10A through the gap 125 formed between the outer periphery of the display panel 10A and the second walls 103C.

The positions of the second electrodes 54A and 54B and the configurations of the cover substrate 51 and the housings may be the same as those in the configurations according to the embodiments and the modifications illustrated in FIGS. 21 to 34, for example.

Second Modification of the Third Embodiment

Figure 43:
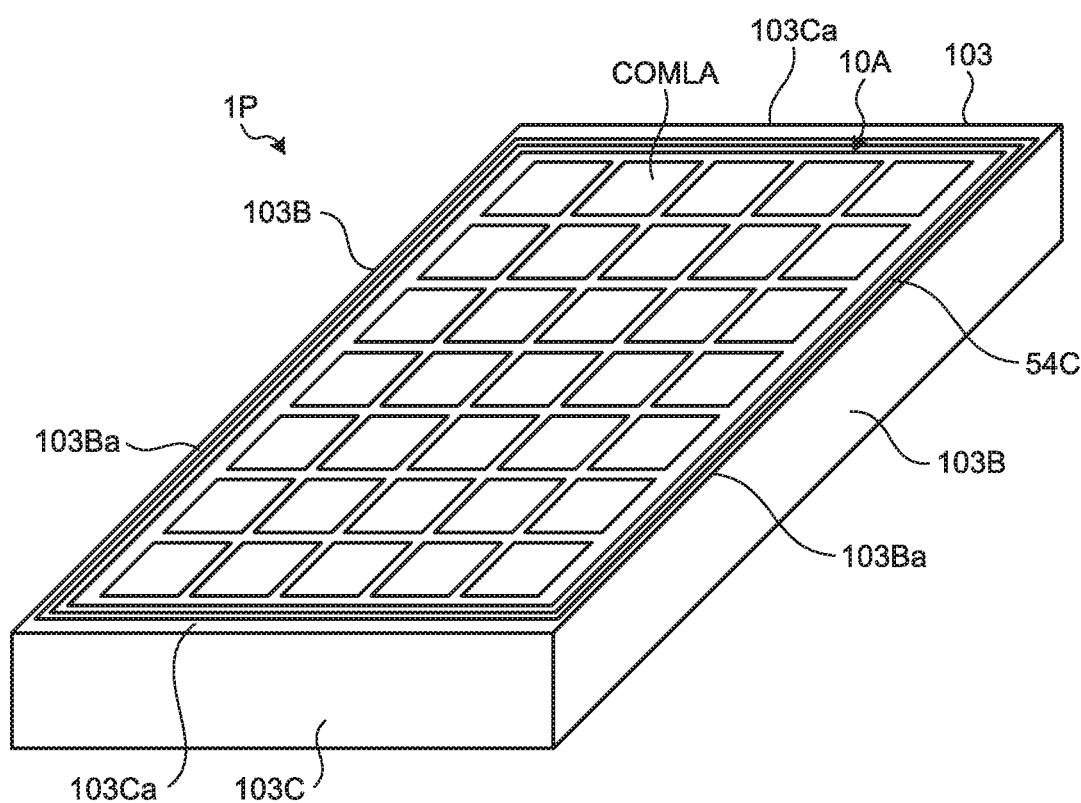
FIG. 43 is a perspective view of the display device according to a second modification of the third embodiment.

FIG. 43 is a perspective view of the display device according to a second modification of the third embodiment. As illustrated in FIG. 43, in a display device 1P according to the present modification, a second electrode 54C is provided on the upper surfaces 103Ba of the first walls 103B and upper surfaces 103Ca of the second walls 103C. The second electrode 54C has a frame shape surrounding the first electrodes COMLA in planar view. In other words, the first electrodes COMLA are disposed in the area surrounded by the second electrode 54C in planar view. The second electrode 54C does not necessarily have one continuous shape and may be divided into a plurality of parts.

Similarly to the example illustrated in FIG. 41, the display device 1P according to the present modification can perform touch detection on the peripheral region Gd by the mutual capacitance method. The display device 1P can perform touch detection on the peripheral region Gd near the second walls 103C because the second electrode 54C is disposed surrounding the first electrodes COMLA.

While exemplary embodiments according to the present disclosure have been described, the embodiments are not intended to limit the disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

The sensors 111A and 111B according to the modifications illustrated in FIGS. 28 to 34, for example, may include the third electrodes 61 and the second electrodes 62 as illustrated in FIG. 23, the third electrodes 61 alone as illustrated in FIG. 26, or the drive electrodes alone as illustrated in FIG. 27. The configurations of the first housing 103, the second housing 104, and the sensors 111A and 111B illustrated in FIGS. 30 and 31 may be combined with the electrode configuration according to the first embodiment. The configurations of the first housing 103 and the sensors 111A and 111B illustrated in FIGS. 32 and 34 may be combined with the electrode configuration according to the first embodiment.

The display device according to the present aspect may have the following aspects, for example.

The display device according to the present aspect may also have the following aspects.

(1) A display device comprising:
a display panel including a substrate and a plurality of first electrodes arrayed in a display region of the substrate;
a housing having at least a pair of walls facing each other in planar view and provided with the display panel between the pair of walls;
a second electrode provided to the housing, positioned on an outer side than the display region in planar view, and configured to form capacitance between the second electrode and the first electrodes; and
a driver configured to supply a drive signal to the second electrode.

(2) The display device according to (1), wherein the second electrode is provided on an upper surface of the walls.

(3) The display device according to (1), wherein the second electrode is provided on a side surface of the walls.

(4) The display device according to (1), wherein the second electrode is provided continuously on an upper surface and a side surface of the walls.

(5) The display device according to (1), wherein the second electrode is electrically coupled to the display panel in the housing via a coupling member coupled to the housing.

(6) The display device according to (1), further comprising:
a cover substrate facing the substrate in a direction perpendicular to a surface of the substrate, wherein
the second electrode is provided on an outer side than the cover substrate in planar view.

(7) The display device according to (1), wherein
the housing has an opening at a position overlapping the substrate,
the display panel is fixed to the opening, and
the second electrode is electrically coupled to the display panel in the housing through a gap between the housing and the display panel.

(8) The display device according to (1), wherein the second electrode is electrically coupled to the display panel in the housing through a slit formed in the housing.

(9) The display device according to (2), further comprising:
a cover substrate facing the substrate and the walls, wherein
the second electrode is provided between the cover substrate and the walls in a direction perpendicular to the upper surface of the walls.

(10) The display device according to (1), wherein the second electrode is provided on a film base with a protective layer interposed between the second electrode and the film base, and the film base is disposed on the housing.

(11) The display device according to (1), wherein a protective layer is provided covering a surface of the second electrode, and the second electrode is disposed on the housing with the protective layer interposed between the second electrode and the housing.

(12) The display device according to (11), wherein
the housing has a groove, and
the second electrode and the protective layer are provided in the groove.

(13) The display device according to (1), wherein
the first electrodes extend in a first direction and are arrayed in a second direction intersecting the first direction in planar view, and
the second electrode is disposed facing ends of the first electrodes.

(14) The display device according to (1), wherein
the housing is further provided with a plurality of third electrodes configured to form capacitance between the third electrodes and the second electrode, and
the third electrodes are arrayed in a longitudinal direction of the walls.

(15) The display device according to (1), wherein
the first electrodes are arrayed in a matrix in the display region of the substrate, and
the second electrode is provided outside the display region along at least one side of the display region in planar view.

(16) The display device according to (15), wherein the second electrode has a frame shape surrounding the first electrodes in planar view.

(17) The display device according to (1), wherein
the housing includes a first housing to which the substrate is fixed and a second housing provided on an outer side than the first housing and to which the first housing is fixed, and
the second electrode is provided on the first housing.

(18) The display device according to (1), wherein
the housing includes a first housing to which the substrate is fixed and a second housing provided on an outer side than the first housing and to which the first housing is fixed, and
the second electrode is provided on the second housing.

(19) A display device comprising:
a display panel including a substrate and a plurality of first electrodes arrayed in a display region of the substrate;
a housing having at least a pair of walls facing each other in planar view and provided with the display panel between the pair of walls;
a cover substrate facing the display panel and the walls; and
a second electrode provided between an upper surface of the walls and the cover substrate, positioned on an outer side than the display region in planar view, and configured to form capacitance between the second electrode and the first electrodes.

(20) A display device comprising:
a display panel including a substrate and a plurality of first electrodes arrayed in a display region of the substrate;
a housing having at least a pair of walls facing each other in planar view and provided with the display panel between the pair of walls;
a cover substrate facing the display panel and having an outer shape smaller than an outer shape of the housing; and
a second electrode provided on an upper surface of the walls on an outer side than the cover substrate and configured to form capacitance between the second electrode and the first electrodes.

(21) A display device comprising:
a display panel including a substrate and a plurality of first electrodes arrayed in a display region of the substrate;
a housing having at least a pair of walls facing each other in planar view and provided with the display panel between the pair of walls;
a second electrode provided on a side surface of the housing; and
a plurality of third electrodes provided on the side surface of the housing and configured to form capacitance between the third electrodes and the second electrode, wherein
the second electrode and the third electrodes are electrically coupled to the display panel through a slit formed in the housing.

(22) A display device comprising:
a display panel including a substrate and a plurality of first electrodes arrayed in a display region of the substrate;
a housing having at least a pair of walls facing each other in planar view and provided with the display panel between the pair of walls;
a second electrode provided on a side surface of the housing; and
a plurality of third electrodes provided on the side surface of the housing and configured to form capacitance between the third electrodes and the second electrode, wherein
the housing has an opening at a position overlapping the substrate,
the display panel is fixed to the opening, and
the second electrode and the third electrodes are electrically coupled to the display panel through a gap between the housing and the display panel.

(23) A display device comprising:
a display panel including a substrate and a plurality of first electrodes arrayed in a display region of the substrate;
a housing having at least a pair of walls facing each other in planar view and provided with the display panel between the pair of walls; and
a plurality of detection electrodes provided on a side surface of the housing and configured to output a signal corresponding to a capacitance change in the detection electrodes.

(24) A display device comprising:
a display panel including a substrate and a plurality of first electrodes arrayed in a display region of the substrate;
a housing having at least a pair of walls facing each other in planar view and provided with the display panel between the pair of walls; and
a second electrode provided continuously on an upper surface and a side surface of the walls, positioned on an outer side than the display region in planar view, and configured to form capacitance between the second electrode and the first electrodes.

(25) A display device comprising:
a display panel including a substrate and a plurality of first electrodes arrayed in a display region of the substrate;
a first housing having at least a pair of walls facing each other in planar view and provided with the display panel between the pair of walls;
a second housing having at least a pair of outer walls facing each other in planar view and provided with the first housing between the pair of outer walls; and
a sensor provided between the walls and the outer walls.

(26) A display device comprising:
a display panel including a substrate and a plurality of first electrodes arrayed in a display region of the substrate;
a first housing having at least a pair of walls facing each other in planar view and provided with the display panel between the pair of walls;
a second housing having at least a pair of outer walls facing each other in planar view and provided with the first housing between the pair of outer walls; and
a sensor provided on an outer side surface of the outer walls.

(27) A display device comprising:
a display panel including a substrate and a plurality of first electrodes arrayed in a display region of the substrate;
a first housing having at least a pair of walls facing each other in planar view and provided with the display panel between the pair of walls;
a second housing having at least a pair of outer walls facing each other in planar view and a protrusion protruding from an upper part of the outer walls to an inner side and facing an upper surface of the walls and provided with the first housing between the pair of outer walls; and
a sensor provided on an upper surface of the protrusion.

(28) A display device comprising:
a display panel including a substrate and a plurality of first electrodes arrayed in a display region of the substrate;
a first housing having at least a pair of walls facing each other in planar view and provided with the display panel between the pair of walls;
a second housing having at least a pair of outer walls facing each other in planar view and a protrusion protruding from an upper part of the outer walls to an inner side and facing an upper surface of the walls and provided with the first housing between the pair of outer walls; and
a sensor provided continuously on an upper surface of the protrusion and an outer side surface of the outer walls.

(29) A display device comprising:
a display panel including a substrate and a plurality of first electrodes arrayed in a display region of the substrate;
a housing having at least a pair of walls facing each other in planar view and provided with the display panel between the pair of walls;
a cover substrate facing the display panel and the walls; and
a sensor provided between an upper surface of the walls and the cover substrate.

(30) A display device comprising:
a display panel including a substrate and a plurality of first electrodes arrayed in a display region of the substrate;
a housing having at least a pair of walls facing each other in planar view and provided with the display panel between the pair of walls;
a cover substrate facing the display panel and the walls; and
a sensor provided on a side surface of the walls.

(31) A display device comprising:
a display panel including a substrate and a plurality of first electrodes arrayed in a display region of the substrate;
a housing having at least a pair of walls facing each other in planar view and provided with the display panel between the pair of walls;
a cover substrate facing the display panel and having an outer shape smaller than an outer shape of the housing; and
a sensor provided on an upper surface of the walls on an outer side than the cover substrate.

What is claimed is:
1. A display device comprising:
a display panel including a substrate and a plurality of first electrodes arrayed in a display region of the substrate;
a housing having at least a pair of walls facing each other in planar view and provided with the display panel between the pair of walls;
a second electrode provided to the housing, positioned on an outer side than the display region in planar view, and configured to form capacitance between the second electrode and the first electrodes; and
a driver configured to supply a drive signal to the second electrode,
wherein the second electrode is provided on a film base with a protective layer interposed between the second electrode and the film base, and the film base is disposed on the housing.

2. The display device according to claim 1, wherein the second electrode is provided on an upper surface of the walls.

3. The display device according to claim 2, further comprising:
a cover substrate facing the substrate and the walls, wherein
the second electrode is provided between the cover substrate and the walls in a direction perpendicular to the upper surface of the walls.

4. The display device according to claim 1, wherein the second electrode is provided on a side surface of the walls.

5. The display device according to claim 1, wherein the second electrode is provided continuously on an upper surface and a side surface of the walls.

6. The display device according to claim 1, wherein the second electrode is electrically coupled to the display panel in the housing via a coupling member coupled to the housing.

7. The display device according to claim 1, further comprising:
a cover substrate facing the substrate in a direction perpendicular to a surface of the substrate, wherein
the second electrode is provided on an outer side than the cover substrate in planar view.

8. The display device according to claim 1, wherein
the housing has an opening at a position overlapping the substrate,
the display panel is fixed to the opening, and
the second electrode is electrically coupled to the display panel in the housing through a gap between the housing and the display panel.

9. The display device according to claim 1, wherein the second electrode is electrically coupled to the display panel in the housing through a slit formed in the housing.

10. The display device according to claim 1, wherein
the first electrodes extend in a first direction and are arrayed in a second direction intersecting the first direction in planar view, and
the second electrode is disposed facing ends of the first electrodes.

11. The display device according to claim 1, wherein
the first electrodes are arrayed in a matrix in the display region of the substrate, and
the second electrode is provided outside the display region along at least one side of the display region in planar view.

12. The display device according to claim 11, wherein the second electrode has a frame shape surrounding the first electrodes in planar view.

13. The display device according to claim 1, wherein
the housing includes a first housing to which the substrate is fixed and a second housing provided on an outer side than the first housing and to which the first housing is fixed, and
the second electrode is provided on the first housing.

14. The display device according to claim 1, wherein
the housing includes a first housing to which the substrate is fixed and a second housing provided on an outer side than the first housing and to which the first housing is fixed, and
the second electrode is provided on the second housing.

15. A display device comprising:
a display panel including a substrate and a plurality of first electrodes arrayed in a display region of the substrate;
a housing having at least a pair of walls facing each other in planar view and provided with the display panel between the pair of walls;
a second electrode provided to the housing, positioned on an outer side than the display region in planar view, and configured to form capacitance between the second electrode and the first electrodes; and
a driver configured to supply a drive signal to the second electrode,
wherein a protective layer is provided covering a surface of the second electrode, and the second electrode is disposed on the housing with the protective layer interposed between the second electrode and the housing.

16. The display device according to claim 15, wherein
the housing has a groove, and
the second electrode and the protective layer are provided in the groove.

17. A display device comprising:
a display panel including a substrate and a plurality of first electrodes arrayed in a display region of the substrate;

a housing having at least a pair of walls facing each other in planar view and provided with the display panel between the pair of walls;

a second electrode provided to the housing, positioned on an outer side than the display region in planar view, and configured to form capacitance between the second electrode and the first electrodes; and a driver configured to supply a drive signal to the second electrode, wherein the housing is further provided with a plurality of third electrodes configured to form capacitance between the third electrodes and the second electrode, and the third electrodes are arrayed in a longitudinal direction of the walls.

* * * * *